United States Patent [19]

Akita et al.

[11] Patent Number: 5,969,091
[45] Date of Patent: *Oct. 19, 1999

[54] AROMATIC HETEROCYCLIC COPOLYMERS, MOLECULAR COMPOSITE MATERIALS AND THEIR PRODUCTION

[75] Inventors: Hiroshi Akita; Hiroto Kobayashi, both of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,033

[22] Filed: Jul. 12, 1996

[30] Foreign Application Priority Data

Jul. 13, 1995 [JP] Japan .................................. 7-199242
Dec. 12, 1995 [JP] Japan .................................. 7-346150

[51] Int. Cl.$^6$ .................................................. C08G 73/06
[52] U.S. Cl. ........................... 528/423; 528/492; 528/337; 528/183; 528/503; 525/420; 525/432; 525/436; 428/411.1; 428/473.5; 428/474.4
[58] Field of Search ...................... 528/423, 492, 528/337, 183, 503; 525/420, 432, 436; 428/411.1, 473.5, 474.4

[56] References Cited

U.S. PATENT DOCUMENTS

| | | |
|---|---|---|
| 4,939,235 | 7/1990 | Harvey et al. . |
| 5,011,753 | 4/1991 | Mueller et al. . |
| 5,089,568 | 2/1992 | Harris et al. . |
| 5,098,985 | 3/1992 | Harris et al. . |
| 5,114,610 | 5/1992 | Jenekhe et al. . |
| 5,175,242 | 12/1992 | Harris . |
| 5,194,562 | 3/1993 | Inbasekaran et al. . |
| 5,248,759 | 9/1993 | Akita et al. . |
| 5,350,831 | 9/1994 | Akita et al. . |
| 5,405,661 | 4/1995 | Kim et al. . |

OTHER PUBLICATIONS

Japanese Patent Unexamined Publication No. 1–287167 (Abstract).
Japanese Patent Unexamined Publication No. 62–25158 (Abstract).
Japanese Patent Unexamined Publication No. 64–1760 (Abstract).
Japanese Patent Unexamined Publication No. 64–1761 (Abstract).

*Primary Examiner*—Duc Truong
*Attorney, Agent, or Firm*—Birch, Stewart, Kolasch & Birch, LLP

[57] ABSTRACT

An aromatic heterocyclic compound and an aromatic diamino compound are allowed to separately react with a dicarboxylic acid derivative in an organic solvent, thereby synthesizing two kinds of oligomers, and these two kinds of oligomers are allowed to react with each other in an organic solvent to synthesize a block copolymer precursor, or an aromatic heterocyclic compound, an aromatic diamino compound and a dicarboxylic acid derivative are allowed to react in an organic solvent, thereby synthesizing a random copolymer precursor. The block or random copolymer precursor and a matrix polymer are dissolved in an organic solvent, then, the solvent is removed from the solution, and the resulting coagulum is heated to induce a ring-closing reaction, thereby obtaining a molecular composite material in which the copolymer is dispersed finely and homogeneously in the matrix polymer.

10 Claims, 30 Drawing Sheets

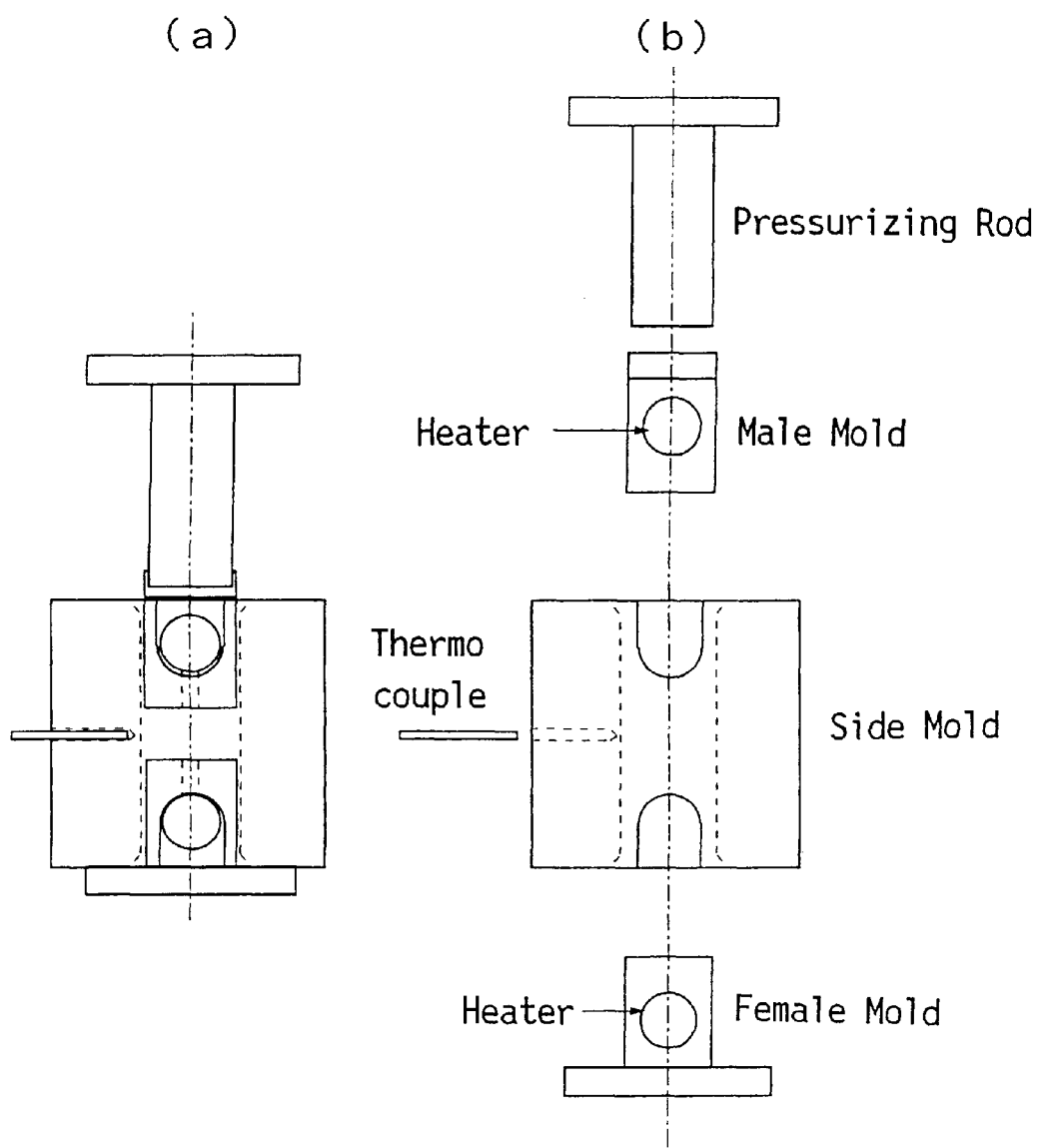

F I G. 5
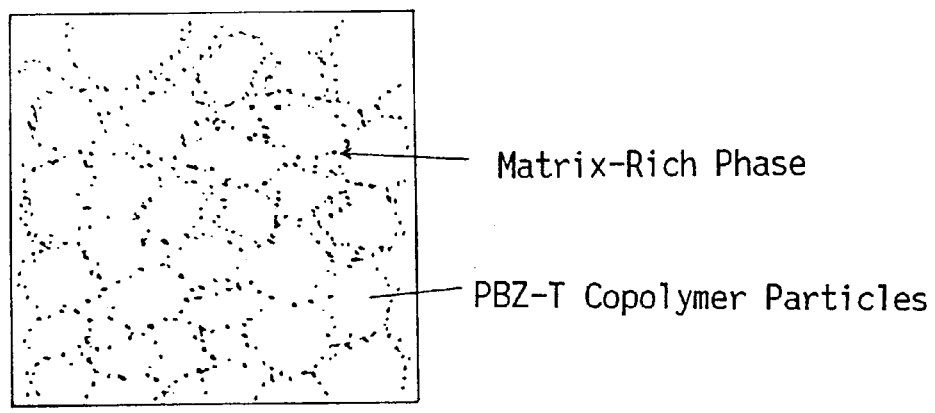
F I G. 6
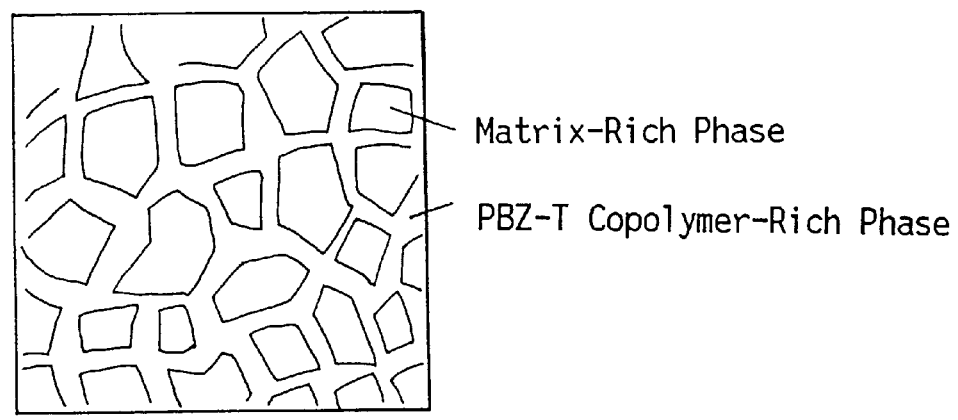

F I G. 1 1
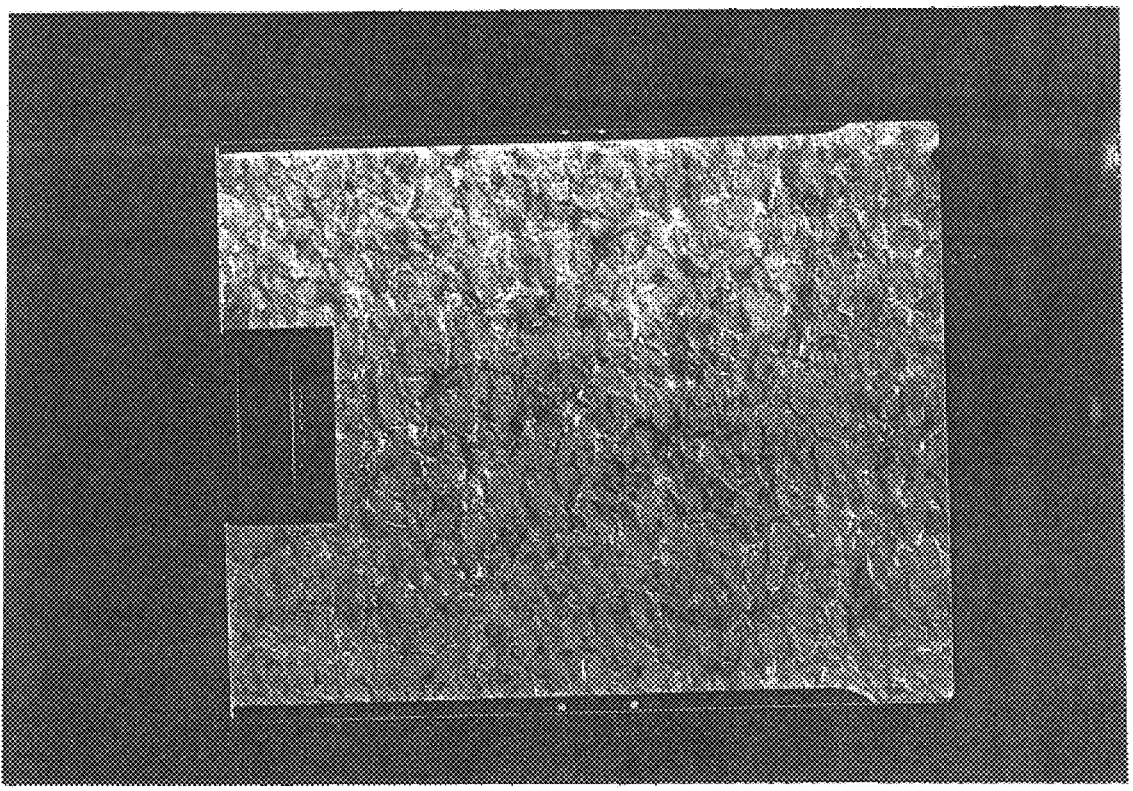
F I G. 1 2
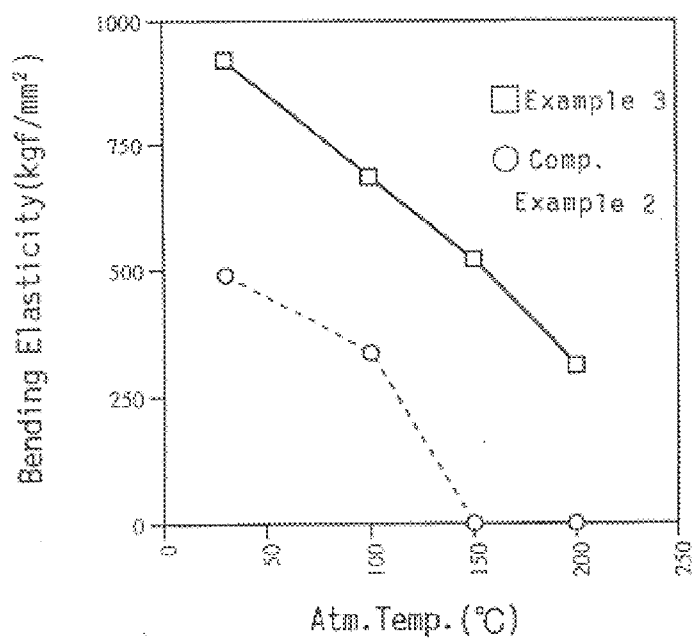

F I G. 1 5
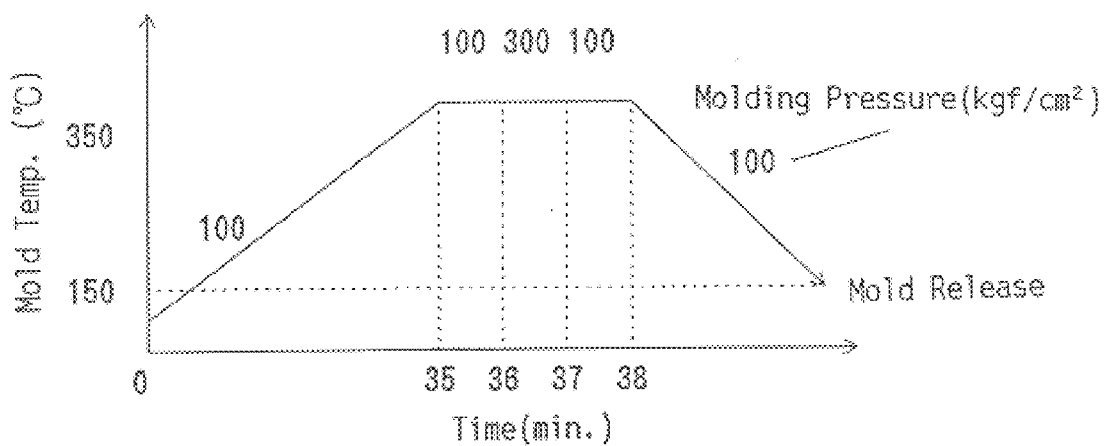
F I G. 1 6
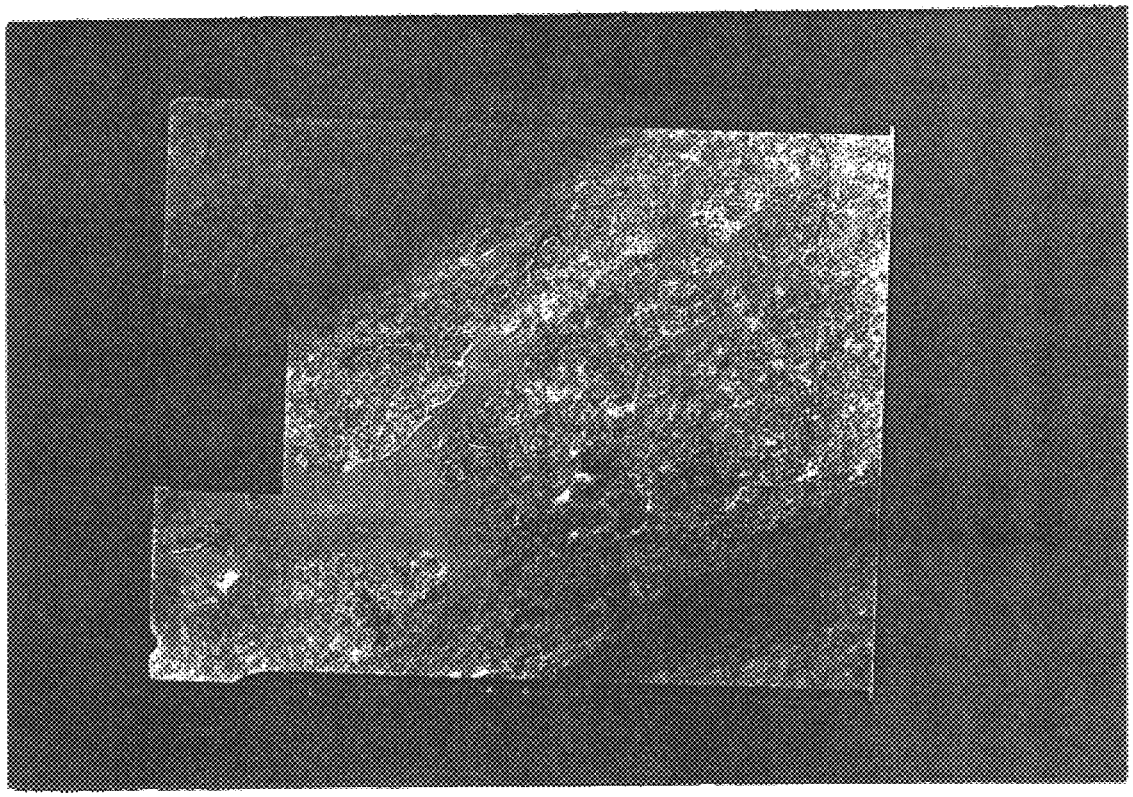

EDX Spectrum of PBZ-T-Rich Phase

EDX Spectrum of Matrix-Rich Phase

F I G. 2 1
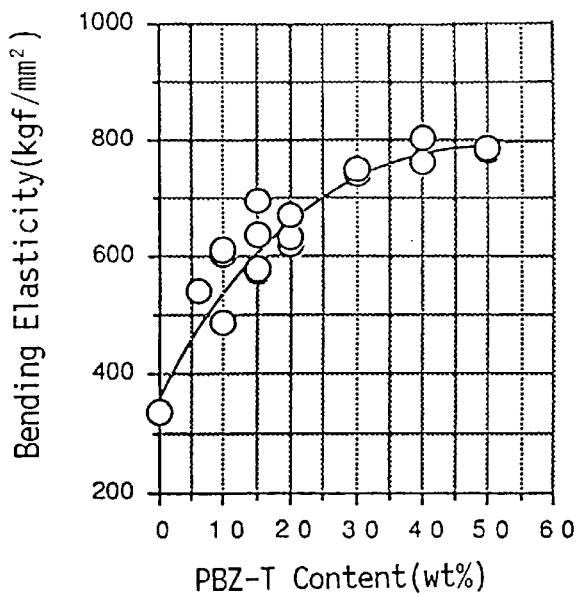
F I G. 2 2
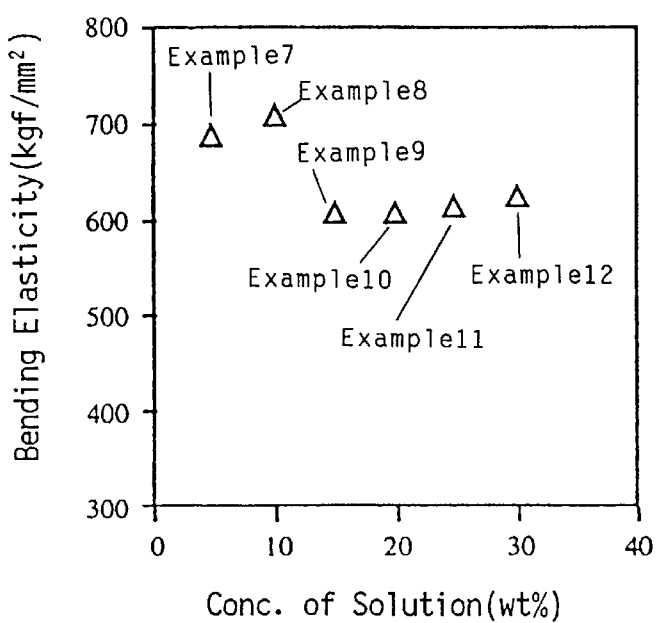

F I G. 2 7
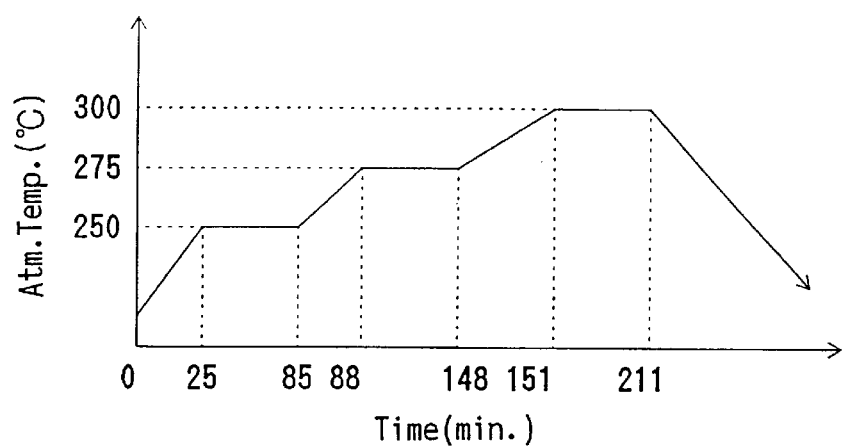
F I G. 2 8
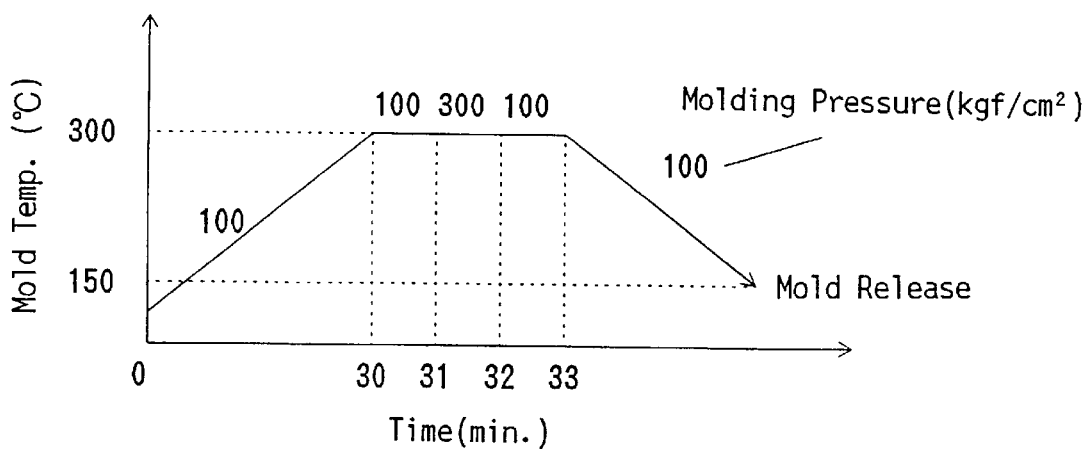

F I G. 2 9
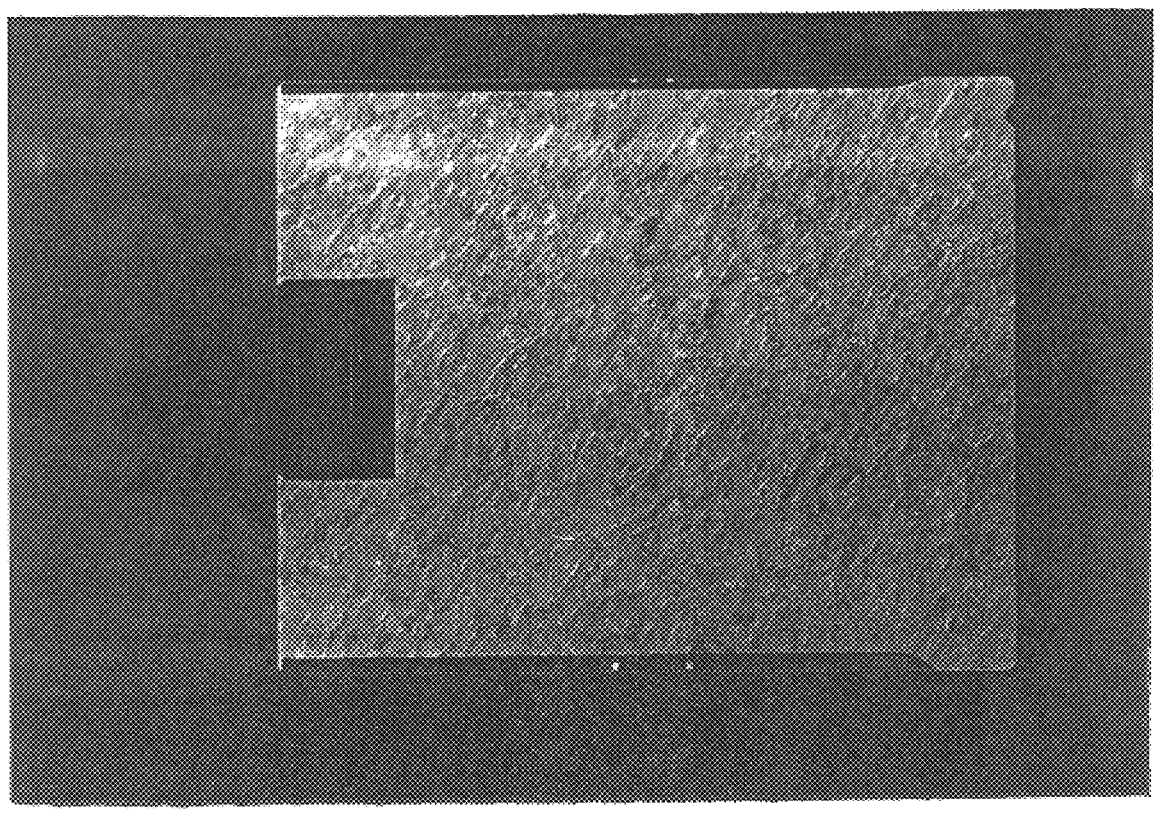
F I G. 3 0
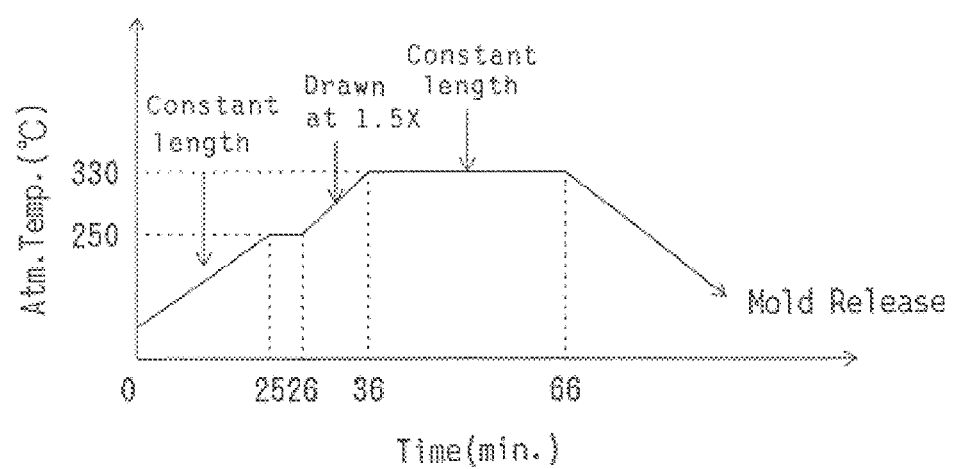

F I G. 3 1
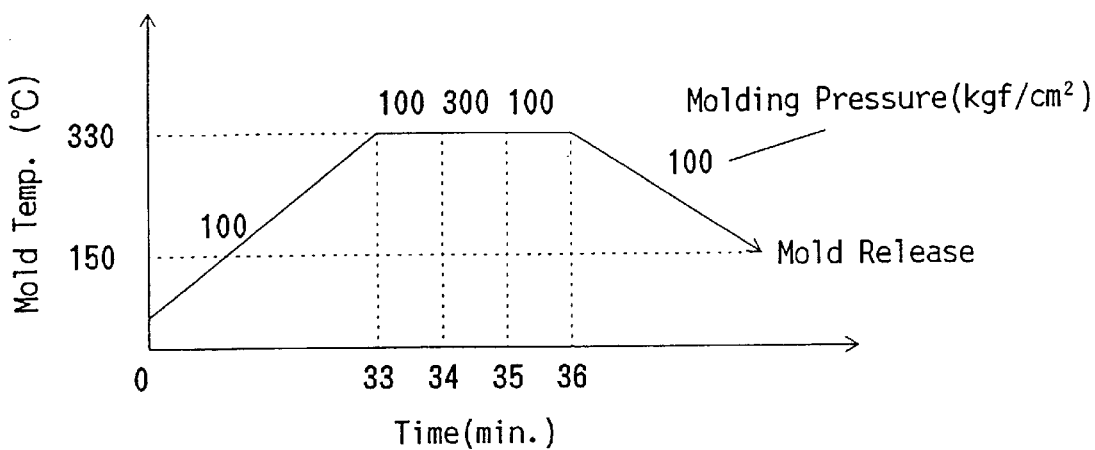
F I G. 3 2
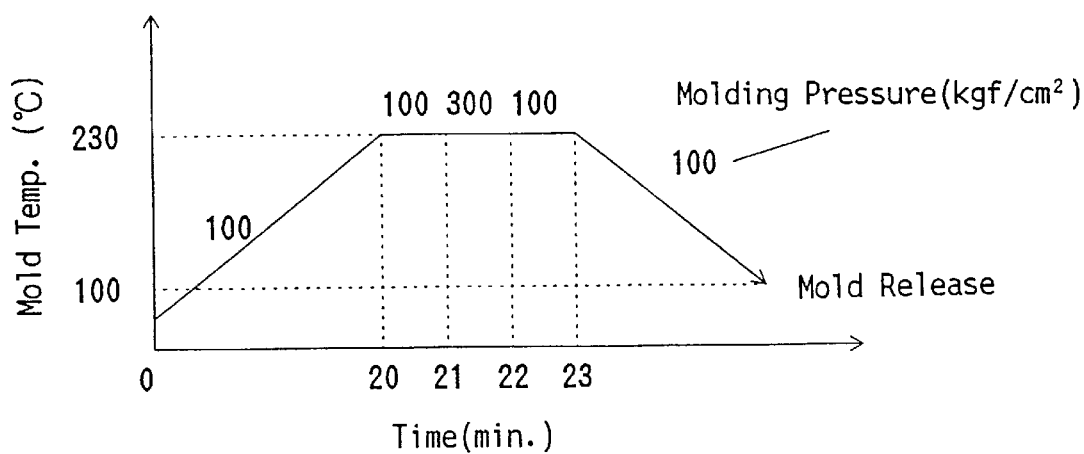

FIG. 48
A
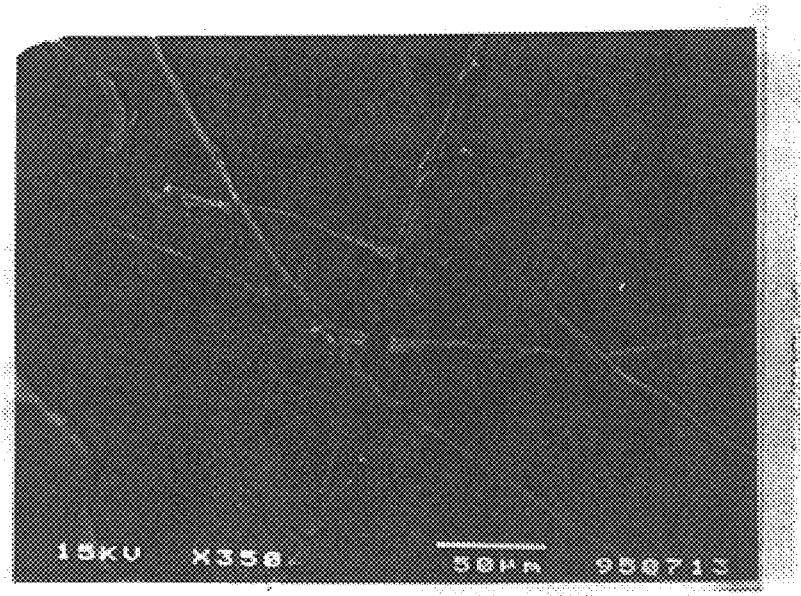
B
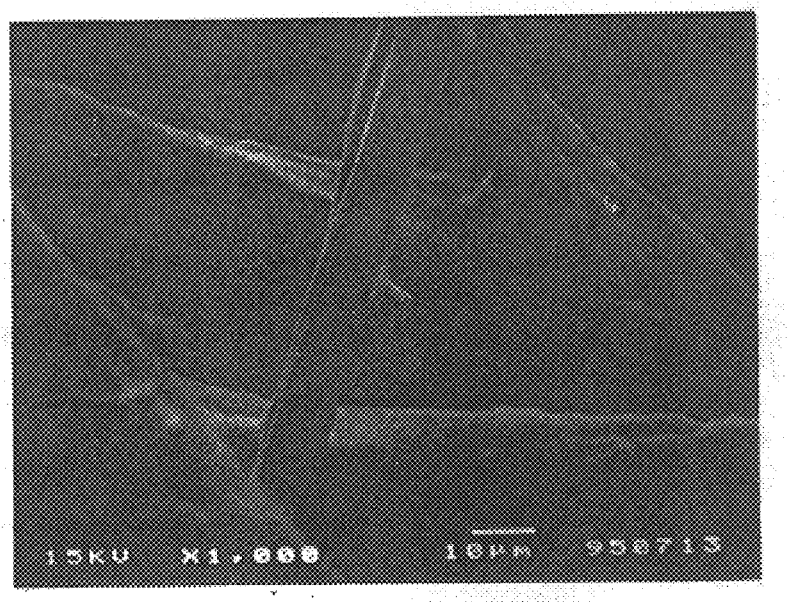

FIG. 49
A
B
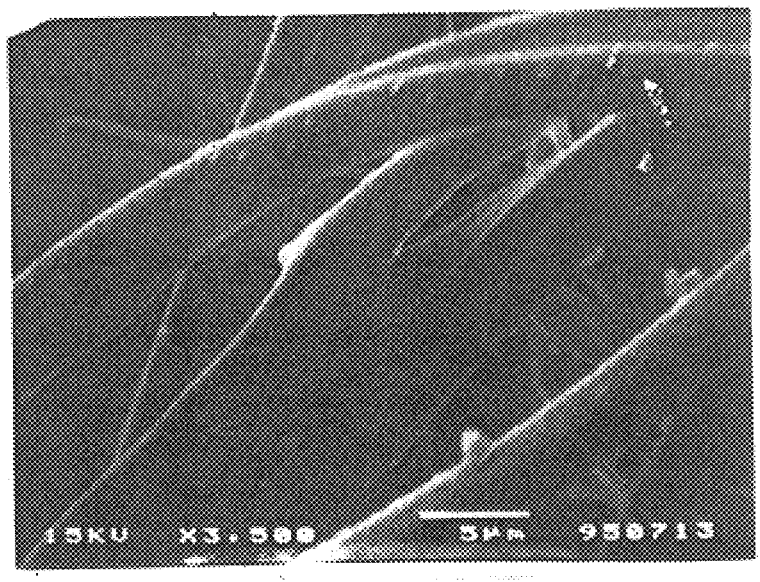

FIG. 50
A
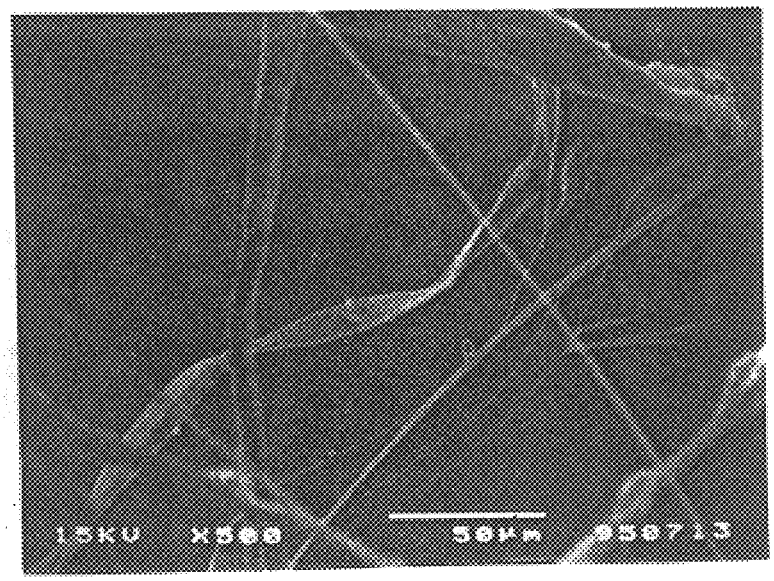
B
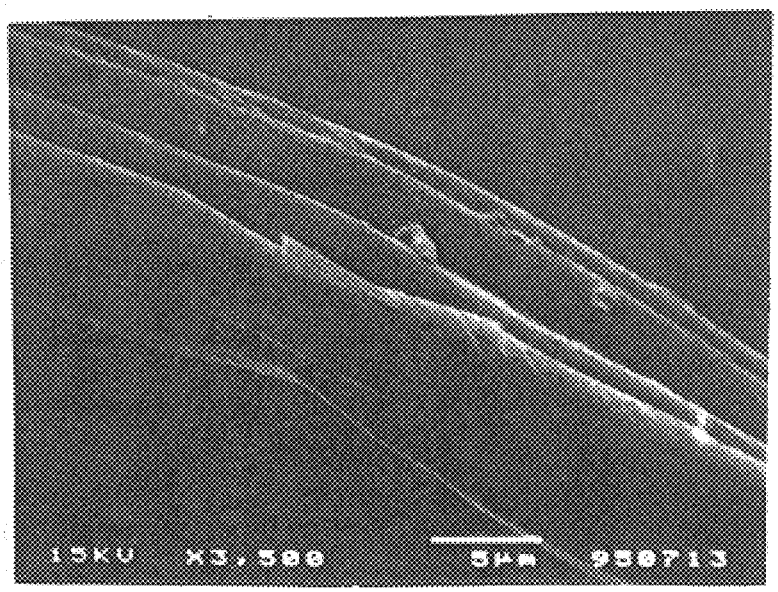

FIG. 51
A
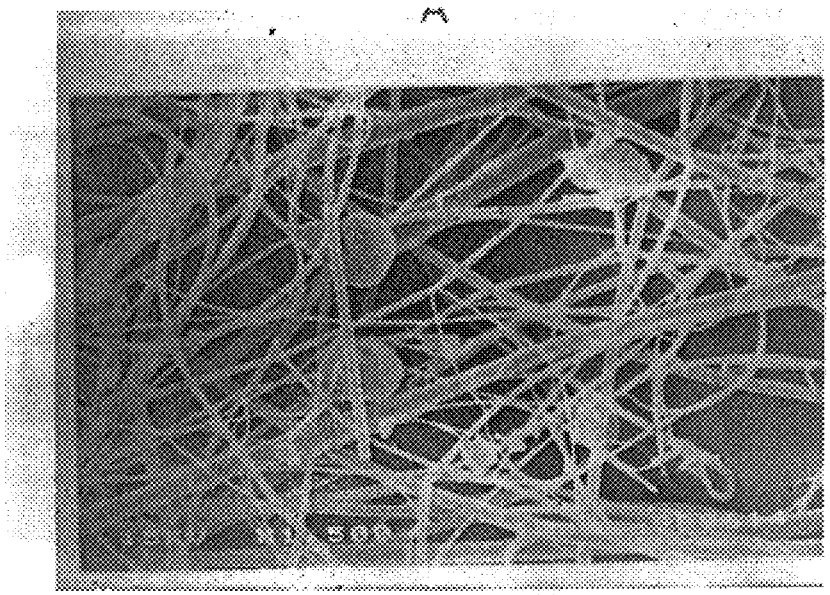
B
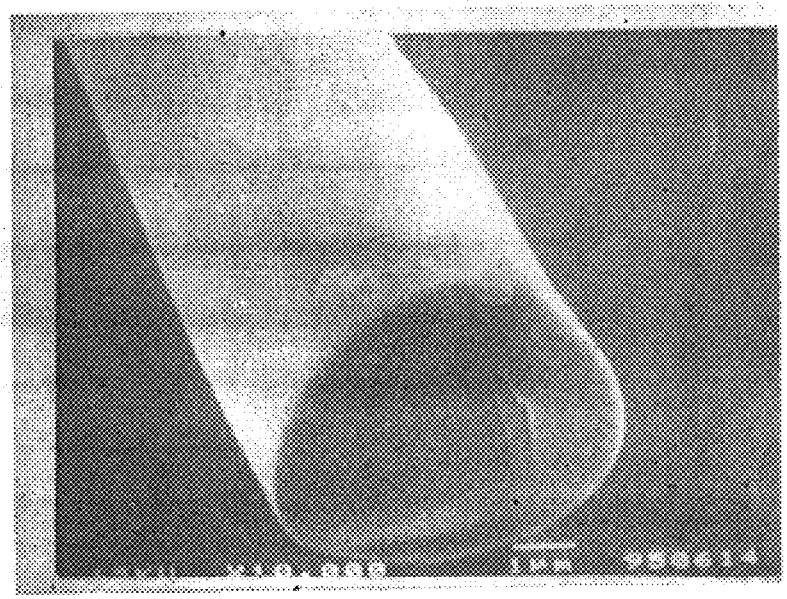

AROMATIC HETEROCYCLIC COPOLYMERS, MOLECULAR COMPOSITE MATERIALS AND THEIR PRODUCTION

BACKGROUND OF THE INVENTION

The present invention relates to aromatic heterocyclic copolymers excellent in mechanical characteristics and suitable for use as structural materials for aircraft, automotive vehicles and space equipment, methods for producing the same, and methods for producing formed articles of the same.

The present invention further relates to molecular composite materials composed of matrix polymers and aromatic heterocyclic copolymers, methods for producing the same, and methods for producing formed articles of the same, and more particularly to molecular composite materials excellent in mechanical characteristics and suitable for use as structural materials for aircraft, automotive vehicles and space equipment.

In recent years, not only light alloys such as alloys of Ti, Al, etc., but also composite materials such as fiber reinforced plastics (FRPs) have been widely used in automotive vehicles and various vehicles, as well as aircraft, for the purpose of lightening weight. These composite materials have also been used as various kinds of structural materials, and composite materials excellent in mechanical characteristics have also been widely researched and developed.

In order to obtain composite materials excellent in mechanical characteristics, fiber high in strength and elasticity has been widely used as reinforcing materials to be added to matrices, and such fiber includes glass fiber and carbon fiber. Further, aromatic polyamide fiber termed so-called aramid fiber such as Kevlar (E. I. du Pont) have also been used.

Carbon fiber shows extremely high elasticity, but is inferior to aramid fiber such as Kevlar in loop strength and knot strength. On the other hand, aramid fiber has high strength, but is inferior to carbon fiber in elasticity. Then, new fiber having both the high elasticity of carbon fiber and the high strength and easy handling of aramid fiber has been desired, and research and development of such fiber have been made.

As substances meeting such requirements, heterocycle-containing aromatic polymers such as poly-p-phenylenebenzobisthiazole (polybenzothiazole; PBZ-T) and poly-p-phenylenebenzobisoxazole (polybenzoxazole; PBZ-O) are noted. Heterocycles are introduced into these substances as means for solving the problem of low elasticity, and hygroscopicity which is the disadvantage of Kevlar is also overcome thereby. Main chains of these substances exhibit rigidity, and can provide fiber having higher strength and elasticity.

Such polymers having heterocycles such as thiazole imidazole, oxazole and oxazinone rings in recurring units (hereinafter referred to as "polythiazoles, etc."), particularly polythiazoles containing thiazole rings, are high in rigidity, and have high strength, high elasticity and high thermal stability. They are therefore considered to be hopeful as plastic materials used as single bodies instead of metal materials, or as reinforcing materials for other engineering plastics.

However, rigid polymers such as polythiazoles, etc. are generally poor in solubility because of their high rigidity, and only dissolved in limited strong acids such as methanesulfonic acid and chlorosulfonic acid. Further, they are low in elongation, poor in bending properties, and thermally infusible, resulting in the difficulty of melt molding. It is therefore difficult to use them as single bodies.

Accordingly, the development of aromatic heterocyclic polymers has been desired which are improved in elongation and bending properties, soluble in organic solvent under mild conditions without use of strong acids, and miscible with other polymers, resulting in the possibility of general melt molding.

On the other hand, when other engineering plastics are compounded with reinforcing fiber, the strength of the resulting composite materials is known to largely depend on the interfacial adhesion between the matrix resins and the fiber, as well as the strength of the matrix resins and the fiber used as the reinforcing material. Under this situation, use of the matrix resins or the fiber having high strength and elasticity as materials does not necessarily result in acquisition of composite materials excellent in strength.

Then, attempts have been made to obtain so-called polymer blend composite materials (molecular composite materials) by finely dispersing rigid polymers such as aromatic polyamides as reinforcing polymers in polymers acting as matrix resins at a molecular level, thereby solving the above-mentioned problems.

However, even if the polymers having the above-mentioned heterocycles in recurring units are simply mixed with the matrix polymers to attempt to produce the molecular composite materials, sufficient miscibility of the reinforcing polymers with the matrix polymers can not generally obtained because of rigidity of the reinforcing polymers, resulting in difficulty of achieving homogeneous dispersion of the reinforcing polymers in the matrix polymers. If the reinforcing polymers are not homogeneously dispersed in the matrix polymers, molecular composite materials excellent in mechanical characteristics can not be obtained. Accordingly, various attempts have hitherto been made as described below.

For example, Japanese Unexamined Patent Publication No. 1-287167 discloses a method for producing a polymer composite comprising introducing a polymer solution mainly containing a reinforcing polymer (A) substantially consisting of a polythiazole having a rod-like skeleton and a matrix polymer (B) having the fusing property into a coagulation bath to form a film, wherein said polymer solution exhibits optical anisotropy, and is coagulated by way of an apparent optical isotropic phase after immersion in the coagulation bath.

Further, Japanese Examined Patent Publication No. 2-7976 discloses a polymer composition containing a reinforcing polymer (A) substantially consisting of a polythiazole having a rod-like skeleton and a matrix polymer (B) composed of slightly crystallizable aromatic copolyamide having a glass transition temperature of 200° C. or more, an incipient fluidization temperature of 500 C. or less and an apparent crystal size of 25 Å or less, crystals having said crystal size being formed when kept between the glass transition temperature and the incipient fluidization temperature for any time within 5 hours, in an (A)/[(A)+(B)] ratio of 0.15 to 0.70 (based on weight).

However, in the method for producing the polymer composite shown in Japanese Unexamined Patent Publication No. 1-287167 and the production of a composite material using the polymer composition disclosed in Japanese Examined Patent Publication No. 2-7976, homogeneous dispersion of the reinforcing polymers in the matrix polymers can not be expected so much, and the strength of the resulting molecular composite materials is not significantly improved.

This is considered to be caused by insufficient dispersion of the reinforcing polymers in the matrix polymers because of poor miscibility of the reinforcing polymers showing rigidity with the matrix polymers.

Then, a method has been proposed which comprises homogeneously mixing a precursor of a rigid aromatic polymer with a matrix polymer or a precursor thereof in an organic solvent, not mixing the rigid aromatic polymer with the matrix polymer, and removing the organic solvent, followed by heating to convert the precursor to the rigid aromatic polymer (Japanese Unexamined Patent Publication No. 64-1760 and Japanese Unexamined Patent Publication No. 64-1761).

However, the inventors' researches revealed that, for example, when a molecular composite material was attempted to be produced using a thermoplastic resin as the matrix resin for the purpose of molding the molecular composite material by hot pressing, and using an aromatic polythiazole precursor therewith, by the method shown in Japanese Unexamined Patent Publication No. 64-1760 or Japanese Unexamined Patent Publication No. 64-1761 described above, an aromatic polythiazole formed by the thiazole ring-closing reaction coagulates in the heat molding stage of a homogeneous mixture of the matrix polymer and the precursor, resulting in reduced mechanical characteristics of the molecular composite material.

Further, although the use of the precursor improves the miscibility, it raises the problem that long-term stirring in an organic solvent is required in order to obtain the homogeneous mixture of the matrix polymer and the precursor. Furthermore, the aromatic polythiazole is poor in interaction with the matrix polymer, for example, in hydrogen bonds, so that the resulting molecular composite material is low in elongation. This causes a defect when it is used as a structural material.

SUMMARY OF THE INVENTION

An object of the present invention is to provide a molecular composite material which has no problem with regard to the miscibility with a matrix polymer and phase separation, in which a rigid polymer is dispersed in the matrix polymer finely, homogeneously and sufficiently, and a reinforcing polymer does not coagulate in the molding stage, and which are excellent in mechanical strength and can be efficiently molded.

According to the present invention, there are provided an aromatic heterocyclic block or random copolymer of an aromatic heterocyclic compound and an aromatic diamino compound, and a method for producing the same.

The present invention further provides a method for producing a formed article of an aromatic heterocyclic copolymer which comprises subjecting an uncyclized block copolymer precursor and/or random copolymer precursor to mold hot pressing, followed by internal mold heat treatment to induce a ring-closing reaction of aromatic heterocycles.

Furthermore, the present invention provides a molecular composite material obtained by dissolving a matrix polymer and an unsubstituted or substituted, uncyclized aromatic heterocyclic copolymer precursor in an organic solvent, then, removing the solvent from the resulting solution, and allowing the aromatic heterocyclic copolymer precursor to conduct a ring-closing reaction.

Moreover, according to the present invention, there is provided a method for producing a formed article of a molecular composite material, in which an aromatic heterocyclic copolymer is dispersed in a matrix polymer to form a fine particle dispersion type structure, a three-dimensional mesh fine particle dispersion type structure or a three-dimensional mesh type dispersion structure.

Still further, the present invention provides a method for producing a formed article of a molecular composite material in which an aromatic heterocyclic copolymer forms a fine particle dispersion type structure or a three-dimensional mesh fine particle dispersion type structure, which comprises dissolving a matrix polymer and an aromatic heterocyclic copolymer precursor in an organic solvent to form a solution, removing the solvent from the solution to form a coagulum, heat treating the coagulum to induce a ring-closing reaction of the aromatic heterocyclic copolymer precursor, and then, subjecting the resulting product to mold hot pressing.

Yet still further, according to the present invention, there is provided a method for producing a formed article of a molecular composite material in which an aromatic heterocyclic copolymer forms a three-dimensional mesh type dispersion structure, which comprises dissolving a matrix polymer and an aromatic heterocyclic copolymer precursor in which at least one hydrogen atom of a functional group forming a heterocycle is substituted by another functional group in an organic solvent to form a mixed solution, removing the solvent from the mixed solution to form a coagulum in a powder, fiber or film form, subjecting the coagulum to mold hot pressing at a temperature at which a ring-closing reaction does not take place, and then, inducing the ring-closing reaction of the aromatic heterocyclic copolymer precursor by internal mold heat treatment under pressure.

In addition, methods of ring enclosure according to the present invention include application of ultrasonic waves, as well as heat treatment.

BRIEF DESCRIPTION OF THE DRAWINGS

FIG. 1(a) is a structural view showing an assembled mold used in hot pressing, and FIG. 1(b) is an exploded view thereof;

FIG. 5 is a schematic view showing a composite state of a three-dimensional mesh fine particle dispersion type molecular composite material of the present invention;

FIG. 6 is a schematic view showing a composite state of a three-dimensional mesh type molecular composite material of the present invention;

FIG. 11 is an electron micrograph (magnification: 14000×) in Example 3;

FIG. 12 is a graph showing the relationship between the bending elasticity and the temperature of formed articles obtained in Example 3 and Comparative Example 2;

FIG. 15 is a graph showing a heating program in Example 5;

FIG. 16 is an electron micrograph (particle structure, magnification: 10,000×) in Example 5;

FIG. 21 is a graph showing the relationship between the PBT content and the bending elasticity in Example 6;

FIG. 22 is a graph showing the relationship between the solution concentration and the bending elasticity in Examples 7 to 12;

FIG. 27 is a graph showing a heating program for heat treatment in Example 24;

FIG. 28 is a graph showing a heating program for molding in Example 24;

FIG. 29 is an electron micrograph (particle structure, magnification: 8,500×) in Example 24;

FIG. 30 is a graph showing a heating program for heat treatment in Example 25;

FIG. 31 is a graph showing a heating program for molding in Example 25;

FIG. 32 is a graph showing a heating program for molding in Comparative Example 6;

FIG. 48(A) is an SEM photograph at a magnification of 350× of a fibrous material obtained in Reference Example 1, and FIG. 48(B) is an SEM photograph at a magnification of 1,000× thereof;

FIG. 49(A) is an SEM photograph at a magnification of 1,000× of a fibrous material obtained in Reference Example 2, and FIG. 49(B) is an SEM photograph at a magnification of 3,500× thereof;

FIG. 50(A) is an SEM photograph at a magnification of 500× of a fibrous material obtained in Reference Example 3, and FIG. 50(B) is an SEM photograph at a magnification of 3,500× thereof;

FIG. 51(A) is an SEM photograph at a magnification of 1,500× of a fibrous material obtained in Reference Example 4, and FIG. 51(B) is an SEM photograph at a magnification of 10,000× thereof.

DESCRIPTION OF THE PREFERRED EMBODIMENTS

Figure 2:
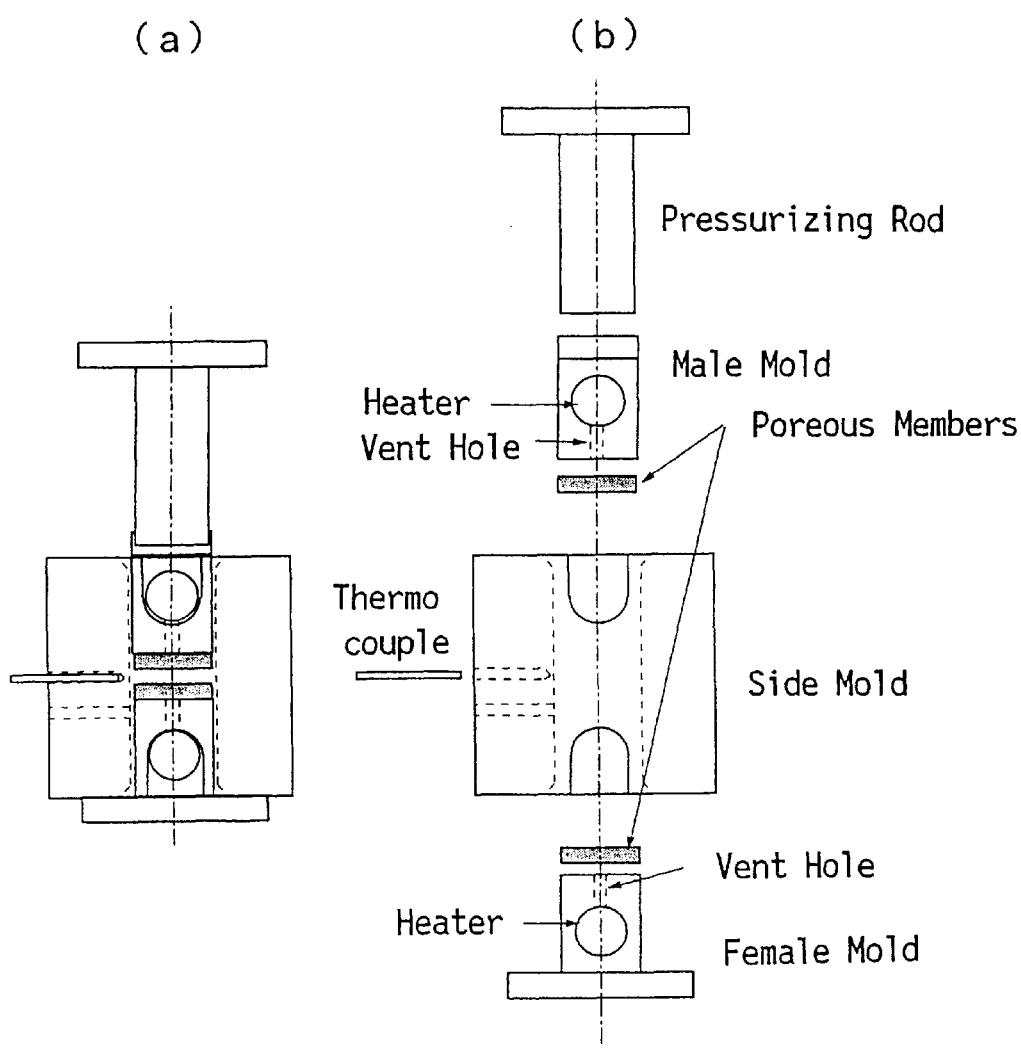
FIGS. 2(a) and 2(b) are structural views showing a mold in which mold gassing is possible.

The aromatic heterocyclic copolymers of the present invention are random or block copolymers of aromatic heterocyclic compounds and aromatic diamino compounds.

The aromatic heterocyclic copolymers of the present invention are not conventional composite materials in which reinforcing polymers are mixed with matrix polymers, but composite materials having straight chain moieties forming reinforcing portions and flexible moieties forming matrix-like portions in molecular chains.

In the aromatic heterocyclic copolymers of the present invention, the rigid chain moieties containing aromatic heterocycles derived from the aromatic heterocyclic compounds are dispersed in the matrix-like portions formed by the flexible chain moieties containing aromatic residues derived from the aromatic diamino compounds, very finely and homogeneously in the three-dimensional mesh form.

As the aromatic heterocycles contained in the rigid chain moieties forming the reinforcing portions, heterocycles containing aromatic rings and condensed rings in main chains are preferably used. The condensed rings include thiazole, oxazole, imidazole and oxazinone rings. These rings may be used alone or in combination.

The aromatic heterocyclic copolymer of the present invention is produced by (i) allowing (a) an aromatic heterocyclic compound and (b) an aromatic diamino compound to separately react with (c) a dicarboxylic acid derivative in an organic solvent, thereby synthesizing two kinds of oligomers, and allowing these two kinds of oligomers to react with each other in an organic solvent to synthesize a block copolymer precursor, or allowing (a) an aromatic heterocyclic compound, (b) an aromatic diamino compound and (c) a dicarboxylic acid derivative to react in an organic solvent, thereby synthesizing a random copolymer precursor, and (ii) heating said block copolymer precursor or random copolymer precursor to induce a ring-closing reaction.

The method for producing the aromatic heterocyclic copolymers of the present invention will be described below, dividing it into step (i) in which the aromatic heterocyclic copolymer precursors are produced and step (ii) in which the ring closure of the aromatic heterocyclic copolymer precursors is performed to produce the aromatic heterocyclic copolymers.

I. Production of Aromatic Heterocyclic Copolymer Precursors (Step (i))

First, polybenzothiazole (PBZ-T) copolymer precursors having thiazole rings as the condensed rings are illustrated.

(1) PBZ-T Copolymer Precursors

The PBZ-T copolymer precursors are represented by the following formula (1):

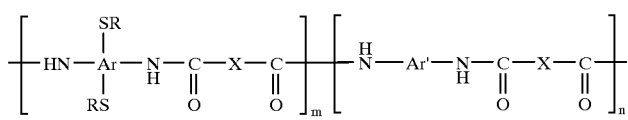

Formula (1)

wherein Ar and Ar' are aromatic residues, R is an unsubstituted or substituted alkyl group, X is a dicarboxylic acid derivative residue, m and n are both integers, and m:n is 0.01:99.99 to 99.99:0.01.

The PBZ-T copolymer precursors are produced by copolymerizing (a) aromatic diaminodithiol compounds (hereinafter referred to as "compounds ($a_t$)") in which hydrogen atoms of thiol groups are substituted by unsubstituted or substituted alkyl groups, as the aromatic heterocyclic compounds, with (b) aromatic diamino compounds and (c) dicarboxylic acid derivatives.

The respective compounds are described below.

($a_t$) Aromatic Diaminodithiol Compounds in Which Hydrogen Atoms of Thiol Groups Are Substituted by Unsubstituted or Substituted Alkyl Groups Compounds($a_t$) are represented by the following formula (2):

Formula (2)

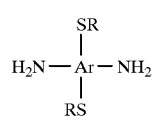

wherein Ar is an aromatic residue, and R is an unsubstituted or substituted alkyl group.

In this general formula, the aromatic residue Ar may be not only a benzene ring, but also an aromatic ring formed by condensation of two or more benzene rings, and may be a residue formed by binding of two or more benzene rings, such as biphenyl. The amino groups and the thioether groups on both sides may each be positioned in bilateral or point symmetry centered with respect to the aromatic residue. Examples of compounds ($a_t$) include the following compounds:

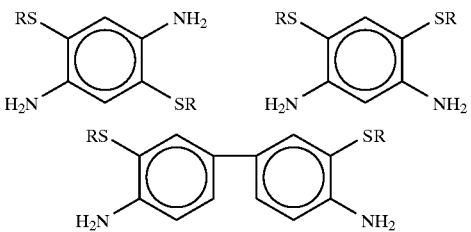

Compound ($a_t$) can be synthesized from an aromatic diaminodithiol compound, a compound having an amino group and a thiol group, respectively, on both sides of an aromatic residue. As the aromatic diaminodithiol compound, a compound obtaining by substituting a hydrogen atom for the alkyl group R of each compound shown above can be used. In order to prevent degradation, this aromatic diaminodithiol compound is used in the form of salts such as a hydrochloride.

The alkyl up R binding to the thiol group of the aromatic diaminodithiol compound is an unsubstituted or substituted alkyl group. The unsubstituted alkyl groups include isopropyl, ethyl, n-propyl, n-butyl, sec-butyl and tert-butyl groups. As the alkyl groups, secondary or tertiary alkyl groups are particularly preferred.

As the substituted alkyl groups, alkyl groups substituted by carboxyl, ester, cyano or benzene groups are preferably used. When the alkyl groups have such substituent groups, they are not necessarily secondary alkyl groups. Examples of the alkyl groups having the substituent groups include the following groups:

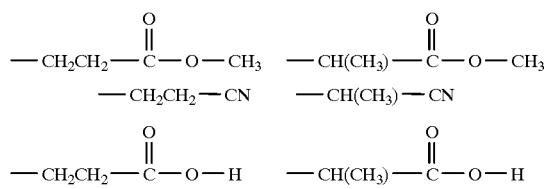

For the two substituted alkyl groups substituted for ester groups shown above, alkyl groups bonding to oxygen atoms of the ester linkages may be alkyl groups each having 2 to 10 carbon atoms, as well as methyl groups.

In particular, substitution of hydrogen atoms of the thiol groups of the aromatic diaminodithiol compounds with cyano group-containing alkyl groups or ester group-containing alkyl groups improves the solubility of the copolymer precursors [the above-mentioned polymers represented by general formula (1)] in organic solvents such as N-methyl-2-pyrrolidone.

The above-mentioned alkyl groups are used as alkyl halides, and compounds($a_t$) are synthesized from the alkyl halides and the aromatic diaminodithiol compounds (salts thereof) previously described by the following method. The halides which can be used herein include bromides, chlorides and iodides of the above-mentioned alkyl groups.

In synthesis of compounds($a_r$), the above-mentioned salts of the aromatic diaminodithiol compounds are allowed to react with the alkyl halides in alkaline aqueous solutions. As the alkaline aqueous solution, there can be used a solution comprising water or a mixed solvent of water and an alcohol(s) (ethanol and/or methanol), and a basic salt such as sodium hydroxide dissolved therein. Alkalifying of the solvents makes it possible to dissolve the salts of the aromatic diaminodithiol compounds. Further, it increases the nucleophilicity of the thiol groups to promote the substitution reaction. The alkaline aqueous solutions preferably contain 2 to 4 equal amounts of alkalis based on the monomers. This reaction is an equilibrium reaction. Accordingly, less than 2 equal amounts results in insufficient progress of reaction, whereas exceeding 4 equal amounts causes a troublesome operation for removing the alkaline aqueous solutions, resulting in inferior operability.

This substitution reaction can be conducted at a temperature ranging from 0° C. to 100° C. A temperature of less than 0° C. unfavorably results in a low rate of reaction, whereas exceeding 100° C. unfavorably results in occurrence of a side reaction. The reaction temperature is more preferably 0° C. to 95° C.

Although there is no particular limitation on the reaction time, it is generally about 2 hours to 24 hours.

In order to increase the rate of reaction, it is preferred to stir the solutions. Further, the use of excess alkyl halides can increase the rate of reaction.

Furthermore, addition of cetyltrimethylammonium chloride, n-butyltriphenylphosphonium bromide, tetraphenylphosphonium bromide or 18-crown-6 as a phase transfer catalyst can increase the rate of reaction. Such phase transfer catalysts accelerate the reaction of the salts of the aromatic diaminodithiol compounds with the alkyl halides.

The monomer compounds (compounds ($a_r$)) in which the hydrogen atoms of the thiol groups of the salts of the aromatic diaminodithiol compounds are substituted by the alkyl groups can be obtained by conducting the substitution reaction under the above-mentioned conditions.

In the synthesis reaction of compound ($a_r$), the reaction of the salt of the aromatic diaminodithiol compound with the alkyl halide proceeds according to the following reaction equation (1):

Reaction Equation (1)

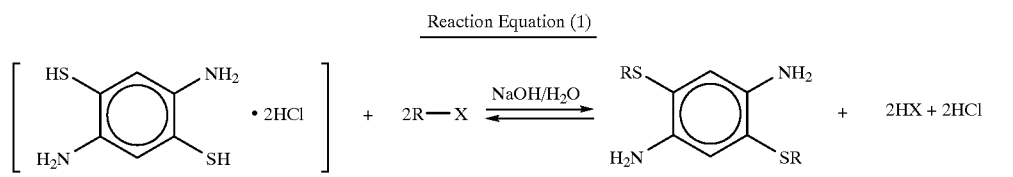

wherein X-R represents an alkyl halide, and 2,5-diamino-1,4-benzenedithiol dihydrochloride is used as an example of the salt of the aromatic diaminodithiol compound.

(b) Aromatic Diamino Compounds

As the aromatic diamino compounds (hereinafter also referred to as "compounds (b)") used in the present invention, aromatic diamino compounds having the flexible structure are preferred. The aromatic diamino compounds (b) are allowed to react with the dicarboxylic acid derivatives (c) to form flexible chain moieties in the aromatic heterocyclic copolymers.

In the present invention, introduction of the flexible chain moieties into the copolymers increases the flexibility of the copolymers, making them moldable. If the flexibility of the aromatic diamino compounds is low, the fluidity of the block copolymers is lowered, resulting in deterioration of the moldability.

In the present invention, as the aromatic diamino compounds, there can be used diamines having aromatic residues such as diphenyl ketone, triphenyl ether, diphenyl ether, diphenyl sulfone, diphenylmethane and biphenyl. In particular, diamines having aromatic residues in which aromatic rings bind to the 3-, 3-positions are suitable. Specifically, aromatic diamino compounds having the following aromatic residues can be used.

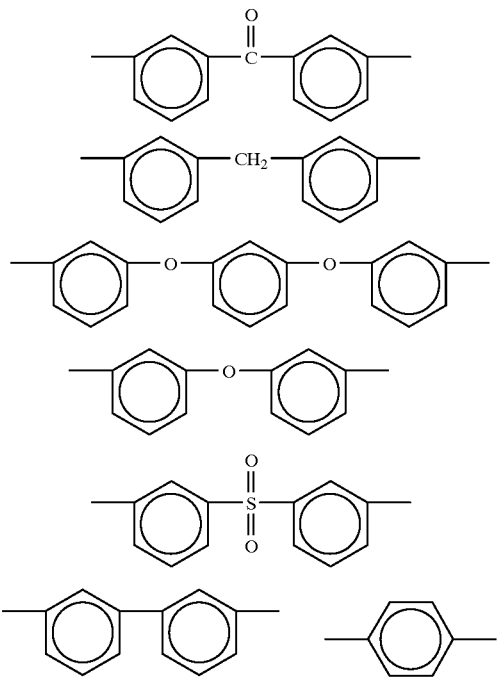

-continued

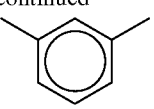

Of the above-mentioned aromatic residues, diphenyl ether, diphenyl ketone and triphenyl ether groups are preferred. The use of such aromatic residues can provide sufficient flexibility to the resulting copolymer precursors.

(c) Dicarboxylic Acid Derivatives

The dicarboxylic acid derivatives (hereinafter also referred to as "compounds (c)") used in the present invention include derivatives in which carboxylic acid groups are substituted as shown below:

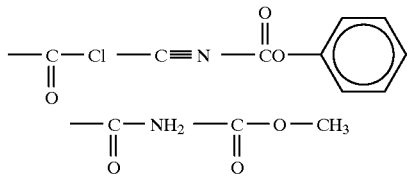

Further, residues of the above-mentioned compounds (c) include alkylene groups each having relatively short chains (2 to 10 carbon atoms) and aromatic residues as shown below. Preferred examples of dicarboxylic acids include aromatic dicarboxylic acids.

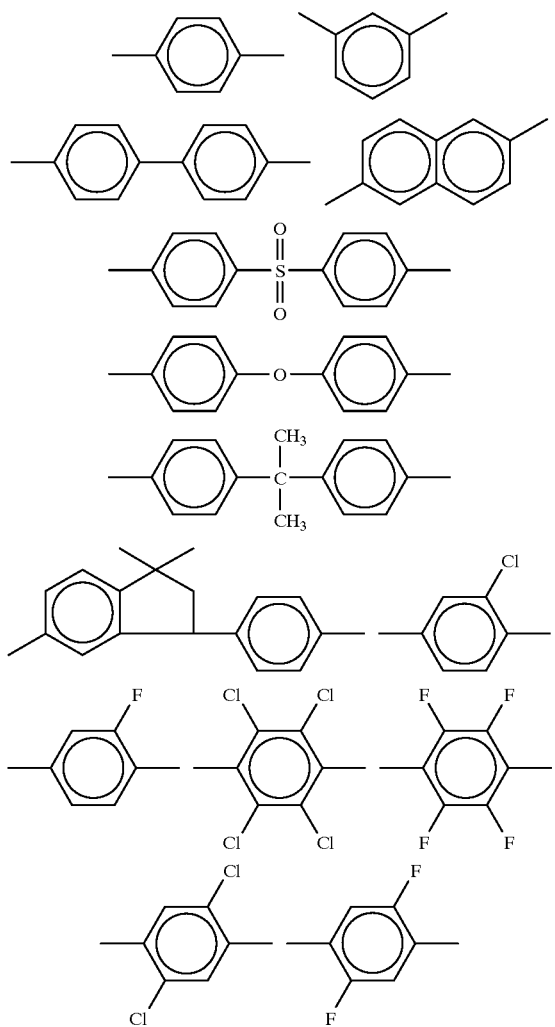

It is possible to add halogen and/or a substituent group such as lower alkyl, lower alkoxyl or phenyl to the aromatic residue. Introduction of such substituent groups can improve the reactivity and the solubility in solvents.

Of such aromatic dicarboxylic acid derivatives, terephthaloyl dichloride or halogen-substituted products thereof and 2,5-dichloroterephtahlic acid dichloride are preferred. Specifically, 2-chloroterephthaloyl dichloride and 2,5-dichloroterephthaloyl dichloride can be suitably used. These aromatic dicarboxylic acid derivatives may be used alone or in combination.

The aromatic heterocyclic copolymers of the present invention are obtained by heating the copolymer precursors obtained from the above-mentioned compounds ($a_t$), (b) and (c), and the copolymer precursors may be either block copolymer precursors or random copolymer precursors.

(1)-1 PBZ-T Block Copolymer Precursor

The PBZ-T block copolymer precursor represented by the above-mentioned general formula (1) can be produced by allowing compound ($a_t$) and compound (b) separately to react with compound (c) in an organic solvent, thereby synthesizing two kinds of oligomers, and allowing the resulting two kinds of oligomers to react with each other in an organic solvent.

The oligomer obtained by reaction of compound ($a_t$) with compound (c) forms an aromatic heterocyclic block acting as the rigid chain moiety in the aromatic heterocyclic copolymer. On the other hand, the oligomer obtained by reaction of compound (b) with compound (c) forms the flexible moiety in the aromatic heterocyclic copolymer.

For simplifying the description, the oligomer obtained by reaction of compound ($a_t$) with compound (c) is referred to as "oligomer (I)", and the oligomer obtained by reaction of compound (b) with compound (c) is referred to as "oligomer (II)".

(1)-1-1 Synthesis of Oligomer for PBZ-T Copolymer Precursor

First, synthesis of oligomer (I) is described. Compound ($a_t$) and compound (c) are dissolved in an organic solvent, and the resulting solution is stirred at a specified temperature to produce oligomer (I).

In the synthesis of oligomer (I), the molar amount of compound ($a_t$) is basically the same as that of compound (c). However, in order to obtain oligomer (I) having a suitable molecular weight and to improve the reaction with oligomer (II) given later, the amount of compound (c) may be adjusted.

Further, the total concentration of compound ($a_t$) and compound (c) is preferably about 0.5 mol/liter to about 5 mol/liter. A concentration exceeding 5 mol/liter unfavorably results in difficulty of dissolving each component.

As the organic solvents, organic solvents of the amide family can be suitably used. The organic solvents of the amide family include N-methyl-2-pyrrolidone (NMP), hexamethylphosphoric triamide and N,N-dimethylacetamide. They may be used alone or as a mixed solution. In order to enhance the solubility, a hydrochloride such as LiCl or $CaCl_2$ may be added in an amount of 3% to 20% by weight.

When the aromatic diaminodithiol compound ($a_t$) is allowed to react with the dicarboxylic acid derivative (c) to synthesize oligomer (I), the polymerization reaction temperature is preferably −20° C. to 200° C. A reaction temperature of less than −20° C. results in occurrence of an insufficient polymerization reaction. On the other hand, the upper limit of the polymerization reaction temperature is 200° C. because of the possibility that the thiazole ring-closing reaction takes place at a temperature of about 250° C. More preferably, the reaction temperature is −10° C. to 50° C.

In the above-mentioned synthesis of oligomer (I), it is preferred to stir the solution in order to enhance the rate of reaction. Further, the reaction time is preferably about 1 minutes to about 120 minutes.

The polymerization reaction of compound ($a_r$) with compound (c) is considered to proceed according to the following reaction equation (2):

Reaction Equation (2)

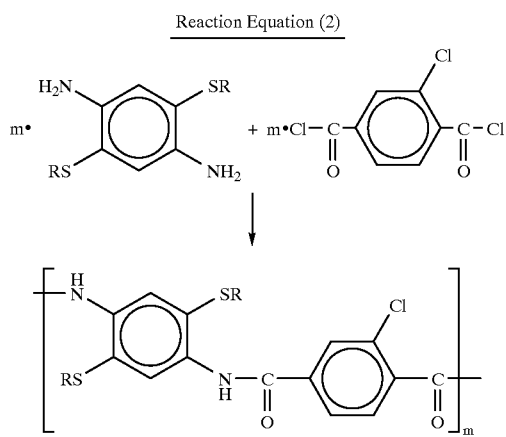

The total concentration of compound (b) and compound (c) is preferably about 0.5 mol/liter to about 5 mol/liter.

The polymerization reaction temperature is preferably −20° C. to 300° C., and more preferably −20° C. to 200° C. A reaction temperature of less than −20° C. results in occurrence of an insufficient polymerization reaction. On the other hand, the upper limit of the polymerization reaction temperature is 300° C. because of occurrence of thermal decomposition at a temperature of about 400° C. More preferably, the reaction temperature is −10° C. to 50° C.

The organic solvents used in the synthesis of oligomer (II) include the same solvents as used in the above-mentioned synthesis of oligomer (I). Although there is no particular limitation on the reaction time, it is generally about 1 minute to about 120 minutes.

The polymerization reaction of compound (b) with compound (c) is considered to proceed according to the following reaction equation (3):

Reaction Equation (3)

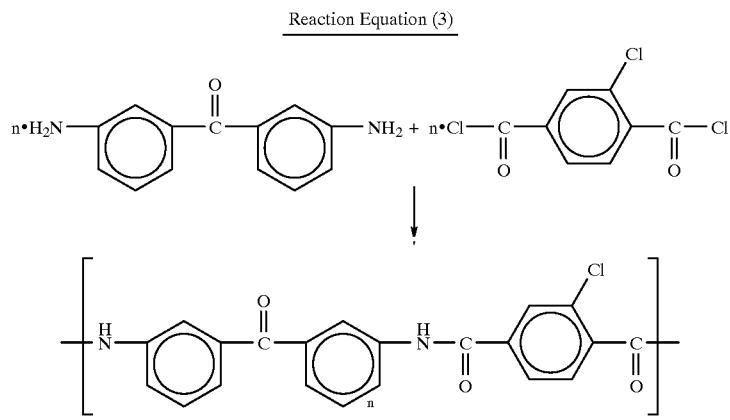

wherein m represents the degree of polymerization, an alkyl group-substituted product of 2,5-diamino-1,4-benzenedithiol dihydrochloride is used as an example of compound ($a_r$), and 2-chloroterephthaloyl dichloride is used as an example of compound (c). The intrinsic viscosity $\eta_{inh}$ (NMP, 30° C.) of the resulting oligomer (hereinafter referred to as "oligomer (I1)") is about 0.1 to about 0.7.

Oligomer (II) can also be synthesized in a manner similar to the above-mentioned synthesis method of oligomer (I).

In the synthesis of oligomer (II), the amount of the dicarboxylic acid derivative (c) is also basically the same as that of compound (b). However, it is preferred that the amount of compound (c) in the synthesis of oligomer (II) is also adjusted to the amount of compound (c) in the synthesis of compound (I).

wherein n represents the degree of polymerization, 3,3'-diaminodiphenyl ketone is used as an example of compound (b), and 2-chloroterephthaloyl dichloride is used as an example of compound (c). The intrinsic viscosity $\eta_{inh}$ (NMP, 30° C.) of the resulting oligomer (hereinafter referred to as "oligomer (II$_1$)") is about 0.1 to about 0.6.

(1)-1-2 Production of PBZ-T Block Polymer Precursor

Oligomer (I) and oligomer (II) obtained by the above-mentioned methods are allowed to react with each other in an organic solvent to synthesize a PBZ-T block copolymer precursor. As the organic solvent, there can be employed the solvent used in the above-mentioned synthesis of oligomer (I) or oligomer (II).

Specifically, the organic solvent in which oligomer (I) is dissolved is mixed with the organic solvent in which oligomer (II) is dissolved, and the resulting mixture is stirred at a temperature of −10 C. to 50° C. to synthesize a block copolymer precursor. The polymerization reaction does not proceed at a temperature of less than −10° C. Exceeding 250° C. results in progress of the thiazole ring-closing reaction, so that the above-mentioned temperature range is employed for safety.

The polymerization reaction is conducted under the above-mentioned conditions, thereby obtaining the PBZ-T block copolymer precursor having a high degree of polymerization without occurrence of the thiazole ring-closing reaction.

The intrinsic viscosity $\eta_{inh}$ (NMP, 30° C.) of the PBZ-T block copolymer precursor obtained from oligomer (I1) and oligomer (II$_1$) described above is about 0.7 to about 2.0.

The polymerization reaction of oligomer (I1) with oligomer (II$_1$) proceeds according to the following reaction equation (4) to obtain the block copolymer precursor:

Reaction Equation (4)

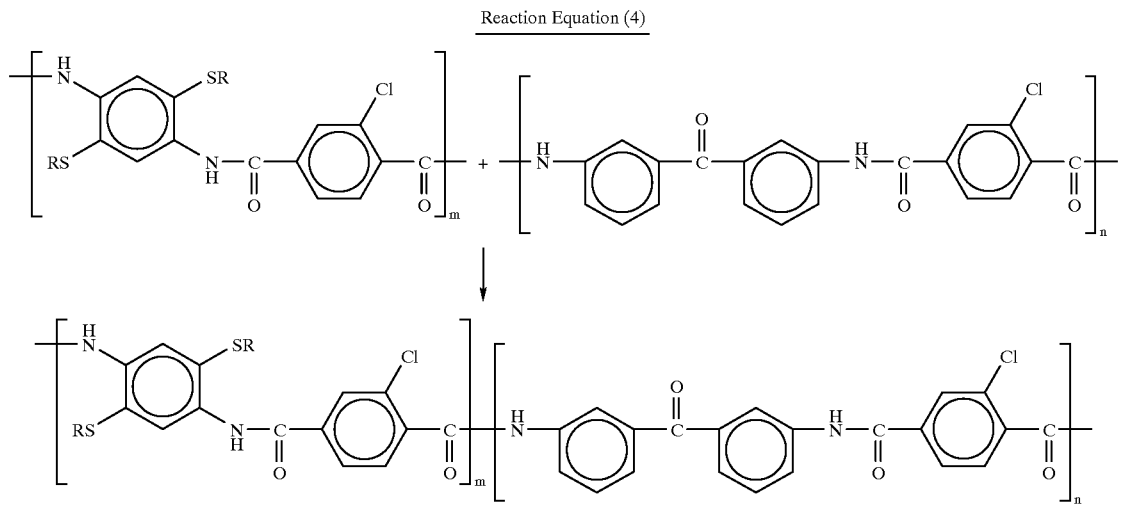

wherein oligomer (I1) obtained according to reaction equation (2) described above is used as oligomer(I), and oligomer (II$_1$) obtained according to reaction equation (3) described above is used as oligomer(II). However, the present invention is not limited thereto.

For example, in the production of oligomer (II), when 4,4'-diaminodiphenyl ether (4-amino-p-phenoxyaniline) is used as compound (b), and 2-chloroterephthaloyl dichloride is used as compound (c), the reaction proceeds according to the following reaction equation (5) to obtain an oligomer (hereinafter referred to as "oligomer (II$_2$)"):

Reaction Equation (5)

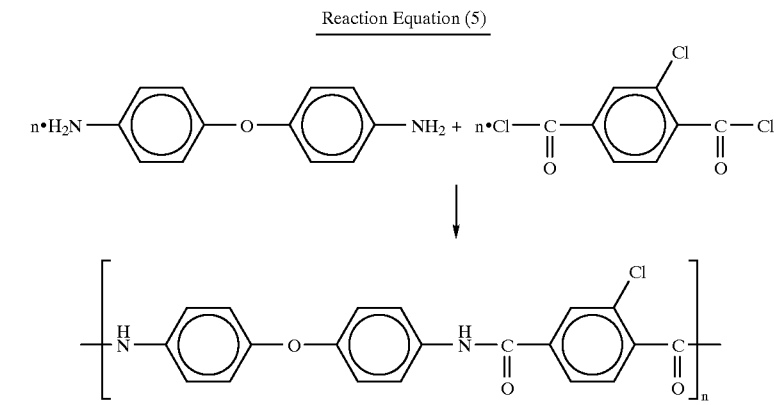

The intrinsic viscosity $\eta_{inh}$ (NMP, 30° C., 0.5 g/dl) of oligomer (II$_2$) is about 0.1 to about 0.4.

The polymerization reaction of oligomer (II$_2$) with oligomer (I1) described above proceeds according to the following reaction equation (6) to obtain a block copolymer precursor:

Reaction Equation (6)

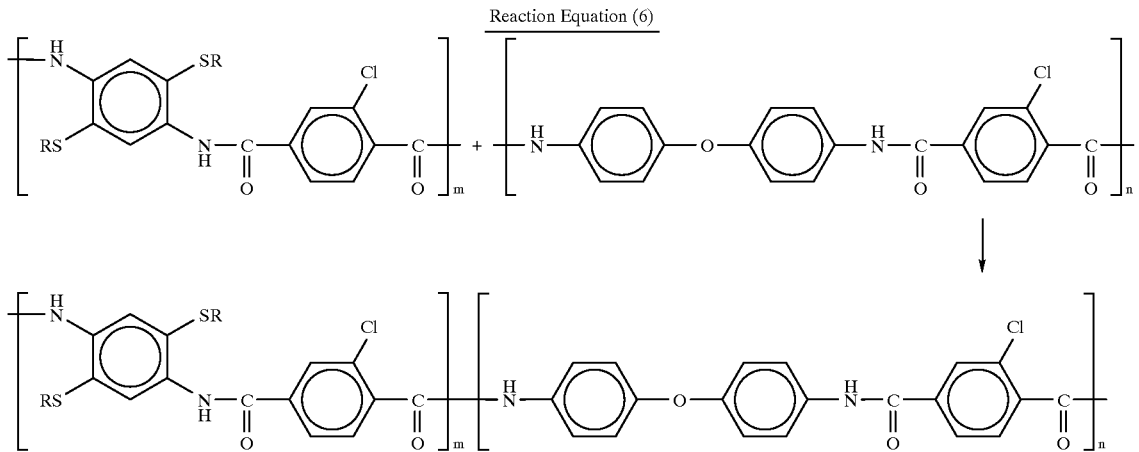

wherein m and n represent the degree of polymerization. In the present invention, m:n, ratio of the total of m in one copolymer (the total degree of polymerization of the moiety in the block copolymer precursor, combined by m in the above-mentioned formula) to the total of n (the total degree of polymerization of the moiety in the block copolymer precursor, combined by n in the above-mentioned formula), ranges from 0.01:99.99 to 99.99:0.01. If the ratio of the aromatic heterocyclic block which is a rigid chain is too high, the fluidity of the block copolymer is lost. On the other hand, if the ratio is too low, the reinforcing effect becomes insufficient.

The resulting block copolymer precursor can be washed and dried by known methods.

(1)-2 Production of PBZ-T Random Copolymer Precursor

Then, a method for producing a random copolymer precursor of the PBZ-T copolymer precursors is described. When the random copolymer is produced, compound (a$_t$), compound (b) and compound (c) are dissolved in a desired compounding ratio in an organic solvent, and these three components are copolymerized. Preferably, a homogeneous solution of compound (a$_t$) and compound (b) is first prepared, and compound (c) is added thereto.

The ratio of the amount of compound (a$_t$) to that of compound (b) in the solution using the organic solvent is the ratio of the portion converted to the rigid chain moiety to the portion forming the flexible chain moiety (namely, the ratio of m to n in the above-mentioned general formula (1)) in the PBZ-T random copolymer precursor. According to the purpose of use of the PBZ-T random copolymer precursor, the amount of compound (a$_t$) and compound (b) is appropriately determined. In the present invention, compound (a$_t$) and compound (b) are compounded so as to give an m:n ratio of 0.01: 99.99 to 99.99:0.01.

The amount of compound (c) is at least the same amount as the total molar amount of compound (a$_t$) and compound (b). The total concentration of compound (a$_t$), compound (b) and compound (c) in the organic solvent is preferably about 0.1 mol/liter to about 5 mol/liter. A concentration exceeding 5 mol/liter unfavorably results in difficulty of dissolving each component.

As the organic solvents, organic solvents of the amide family can be suitably used. The organic solvents of the amide family include N-methyl-2-pyrrolidone (NMP), hexamethylphosphoric triamide and N,N-dimethylacetamide. They may be used alone or as a mixed solution. In order to enhance the solubility, a hydrochloride such as LiCl or CaCl2 may be added in an amount of 3% to 20% by weight.

When compounds (a$_t$), (b) and (c) are polymerized to produce the random copolymer precursor, the polymerization reaction temperature is preferably −20° C. to 50° C. A polymerization temperature of less than −20 C. results in occurrence of an insufficient polymerization reaction and in a reduction in the degree of polymerization of the resulting random copolymer precursor. On the other hand, the upper limit of the polymerization reaction temperature is 50° C. because of the possibility that the thiazole ring-closing reaction takes place at a temperature of about 250° C. More preferably, the reaction temperature is −20° C. to 30° C.

In the above-mentioned polymerization reaction, it is preferred that the solution is stirred to enhance the rate of reaction. Although there is no particular limitation on the reaction time, it is generally about 1 hour to about 24 hours.

The polymerization reaction is conducted under the above-mentioned conditions, thereby obtaining the random copolymer precursor having a high degree of polymerization without occurrence of the thiazole ring-closing reaction. The intrinsic viscosity $\eta_{inh}$ (NMP, 30° C., 0.5 g/dl) of the resulting random copolymer precursor is preferably 0.4 or more, and more preferably about 0.8 to about 1.6.

This polymerization reaction is considered to proceed according to the following reaction equation (7):

Reaction Equation (7)

[Chemical reaction scheme showing diaminobenzenedithiol derivative + diaminodiphenyl ether + 2-chloroterephthaloyl dichloride → copolymer product]

wherein m and n represent the degree of polymerization, an alkyl group-substituted product of 2,5-diamino-1,4-benzenedithiol dihydrochloride is used as an example of compound ($a_t$), 4,4'-diaminodiphenyl ether (4-amino-p-phenoxyaniline) is used as an example of compound (b), and 2-chloroterephthaloyl dichloride is used as an example of compound (c).

The resulting random copolymer precursor can be washed and dried by known methods.

Then, precursors of polybenzoxazole (PBZ-O) having oxazole rings as condensed rings are described.

(2) PBZ-O Block Copolymer Precursors

PBZ-O block copolymer precursors are represented by the following formula (3):

Formula (3)

[Chemical structure of PBZ-O block copolymer with repeating units m and n]

wherein Ar and Ar' are aromatic residues, m and n are both integers, and m:n is 0.01:99.99 to 99.99:0.01.

The copolymer precursors are produced by copolymerizing (a) aromatic diaminohydroxy compounds (hereinafter referred to as "compounds($a_o$)") in which hydrogen atoms of amino groups and/or hydroxyl groups are substituted or unsubstituted, used as aromatic heterocyclic compounds, with (b) aromatic diamino compounds and (c) dicarboxylic acid derivatives.

($a_o$) Aromatic Diaminodihydroxy Compounds in Which Hydrogen Atoms of Amino groups and/or Hydroxyl Groups Are Substituted or Unsubstituted In the present invention, the aromatic diaminodihydroxy compound is a compound having amino groups and/or hydroxyl groups, and preferably a compound having amino groups and hydroxyl groups, respectively, on both sides. The aromatic residue may be not only a benzene ring, but also an aromatic ring formed by condensation of two or more benzene rings, and may be a residue formed by binding of two or more benzene rings, such as biphenyl. The amino groups and the hydroxyl groups on both sides may each be positioned in bilateral or point symmetry centered with respect to the aromatic residue. Examples of such aromatic diaminodihydroxy compounds include the following compounds:

[Chemical structures of three diaminodihydroxy benzene isomers]

-continued

[Chemical structure of diaminodihydroxy biphenyl]

In the present invention, the aromatic diaminodihydroxy compounds ($a_o$) are preferably compounds in which hydrogen atoms of their amino groups and/or hydroxyl groups are substituted, and more preferably compounds in which hydrogen atoms of their amino groups and hydroxyl groups are substituted. Silylated compounds in which hydrogen atoms are substituted by silyl groups are preferably used for the production of the PBZ-O copolymer precursors, because copolymer precursors having a high molecular weight can be obtained in high yields.

Further, in the above-mentioned aromatic diaminodihydroxy compounds ($a_o$), aromatic residues thereof may have substituent groups such as Cl. In order to prevent degradation, these aromatic diaminodihydroxy compounds are preferably used in the form of salts such as hydrochlorides.

As the aromatic diaminodihydroxy compounds, 4,6-diamino-1,3-dihydroxybenzene (or salts thereof) and silylates thereof are particularly preferably used.

(b) Aromatic Diamino Compounds

As the aromatic diamino compounds (hereinafter also referred to as "compounds (b)") used in the present invention, aromatic diamino compounds having the flexible structure are preferred. The reason for this is the same as that described above for the aromatic diamino compounds (b) used when the PBZ-T block copolymer precursors are synthesized, and compounds similar to these compounds (b) can be preferably used.

Specifically, compounds having the aromatic residues shown above with respect to the aromatic diamino compounds for the PBZ-T block copolymer precursors can be used. The hydrogen atoms of the amino groups of these aromatic diamino compounds may be substituted. In particular, silylated compounds are preferred. Of the above-mentioned aromatic residues, diphenyl ether, triphenyl ether and diphenyl ketone groups are preferred. The use of such aromatic residues can provide sufficient flexibility to the resulting PBZ-T copolymer precursors.

In the present invention, the PBZ-O block copolymer precursors are obtained from compounds($a_o$), compounds (b) and compounds (c), and it is preferred that the aromatic diaminodihydroxy compounds in which amino groups and hydroxyl groups thereof are silylated are used as compounds ($a_o$), the aromatic diamino compounds in which amino groups are silylated are used as compounds (b), and these are allowed to react with compounds (c). When the copolymer precursors are produced using the silylated compounds as compounds ($a_o$) and compounds (b) as described above, copolymer precursors having a high molecular weight can be obtained in high yields.

For silylation of the amino groups and the hydroxyl groups of the aromatic diaminodihydroxy compounds, the aromatic diaminodihydroxy compounds or salts thereof, particularly hydrochlorides, are treated with nitrogen-containing silylating agents in organic solvents or without solvents at 80° C. to 140° C. for 6 hours to 72 hours.

The nitrogen-containing silylating agents effective for such silylation reaction include hexamethyldisilazane, N,N-diethylaminotrimethylsilane, N,O-bis(trimethylsilyl) carbamate and N-trimethylsilylimidazole.

Although tetrahydrofuran, carbon tetrachloride, N,N-dimethylacetamide, etc. can be used as the organic solvents for the silylation reaction, the organic solvents can also be omitted. A silylation temperature of lower than 80° C. results in insufficient reactivity, whereas a temperature of higher than 140° C. unfavorably results in decomposition of amine hydrochlorides.

Similarly, the aromatic diamino compounds can also be silylated.

In the present invention, the PBZ-O copolymer precursors, which are obtained from the above-mentioned compounds ($a_o$), (b) and (c), may be either block copolymer precursors or random copolymer precursors.

(2)-1 PBZ-O Block Copolymer Precursor

The PBZ-O block copolymer precursor can be produced by allowing compound ($a_o$) and compound (b) separately to react with compound (c) in an organic solvent, thereby synthesizing two kinds of oligomers, and allowing the resulting two kinds of oligomers to react with each other in an organic solvent.

For simplifying the description, the oligomer obtained by reaction of compound ($a_o$) with compound (c) is referred to as "oligomer (III)", and the oligomer obtained by reaction of compound (b) with compound (c) is referred to as "oligomer (IV)".

(2)-1-1 Oligomer for PBZ-O Block Copolymer Precursor

Compound ($a_o$) silylated under the above-mentioned conditions is produced, and the resulting compound ($a_o$) is allowed to react with compound (c) to produce oligomer (III). The reaction of compound ($a_o$) with compound (c) is conducted in an organic solvent, under conditions substantially free from water and oxygen, in an atmosphere of dried nitrogen or argon gas, at a temperature of −10° C. to 100° C. for 15 minutes to 120 minutes, although they vary according to the solvents used. A reaction temperature of less than −10° C. results in insufficient reactivity, whereas exceeding 100° C. results in the fear of oxidation of the above-mentioned reaction product. Preferably, the reaction temperature is −10° C. to 40° C.

The molar amount of compound ($a_o$) is basically the same as that of compound (c). However, it is preferred that the molar amount of compound (c) is properly varied to that of compound ($a_o$). The adjustment of the amount of compound (c) is described later.

Further, the total concentration of compound ($a_o$) and compound (c) in the organic solvent is preferably about 0.1 mol/liter to about 5 mol/liter. A concentration exceeding 5 mol/liter unfavorably results in difficulty of dissolving each component.

Examples of the organic solvents include amide solvents such as N,N-dimethylformamide, N,N-dimethylacetamide and N-methyl-2-pyrrolidone (NMP), aromatic amine solvents such as pyridine, sulfur solvents such as dimethyl sulfoxide and tetramethyl sulfone, benzene solvents such as benzene, toluene, anisole, diphenyl ether, nitrobenzene and benzonitrile, ether solvents such as tetrahydrofuran and 1,4-dioxane, and aprotic solvents, for example, hydrocarbon halides such as chloroform, trichloroethane and carbon tetrachloride.

The polymerization reaction of compound ($a_o$) with compound (c) proceeds according to the following reaction equation (8) to obtain an oligomer (hereinafter referred to as "oligomer ($III_1$)"):

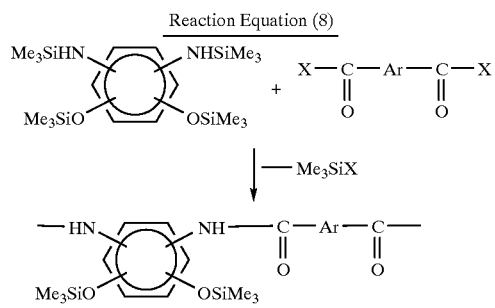

wherein Ar represents an aromatic residue, X represents halogen, Me represents a methyl group, and silylated diaminodihydroxybenzene is used as the silylated aromatic diaminodihydroxy compound.

Similarly to the above-mentioned synthesis of oligomer (III), oligomer (IV) can also be synthesized by using a silylated aromatic diamino compound as compound (b) to allow it to react with a dicarboxylic acid derivative.

In the synthesis of oligomer (IV), the amount of the dicarboxylic acid derivative (c) is also basically the same as that of compound (b). However, it is preferred that the amount of compound (c) in the synthesis of oligomer (IV) is also adjusted to the amount of compound (c) in the synthesis of compound (III). This is described later.

The total concentration of compound (b) and compound (c) in the organic solvent is preferably about 0.1 mol/liter to about 5 mol/liter. A concentration exceeding 5 mol/liter unfavorably results in difficulty of dissolving each component.

The polymerization reaction is conducted at a temperature of −10° C. to 100° C. for 5 minutes to 120 minutes. A reaction temperature of less than −10° C. results in insufficient reactivity, whereas exceeding 100° C. results in the fear of oxidation of the above-mentioned reaction product. Preferably, the reaction temperature is −10° C. to 40° C.

The organic solvents used in the synthesis of oligomer (IV) include the same solvents as used in the above-mentioned synthesis of oligomer (III).

The polymerization reaction of compound (b) with compound (c) proceeds according to the following reaction equation (9) to obtain an oligomer (hereinafter referred to as "oligomer (IV$_1$)"):

According to the studies of the present inventors, when a relatively large amount of oligomer (III) is used in the production of the copolymer precursor given later (namely, when many rigid moieties having dihydroxyl groups are introduced into the PBZ-O copolymer finally obtained), it is preferred that the amount of compound (c) in the synthesis of oligomer (III) is somewhat larger than the number of moles of compound ($a_o$). On the other hand, when the amount of oligomer (III) is smaller than that of oligomer (IV) in the production of the copolymer precursor, it is preferred that the amount of compound (c) in the synthesis of oligomer (III) is slightly smaller than the number of moles of compound ($a_o$). However, when the amount of compound (c) is slightly decreased in the synthesis of one oligomer, the amount of compound (c) is increased by that decrease in the synthesis of the other oligomer.

(2)-1-2 PBZ-O Block Copolymer Precursor

Oligomer (III) and oligomer (IV) obtained by the methods described above are allowed to react with each other in an organic solvent to synthesize a PBZ-O block copolymer precursor. As the organic solvent, there can be employed the solvent used in the above-mentioned synthesis of oligomer (III) or oligomer (IV).

Specifically, the organic solvent in which oligomer (III) is dissolved is mixed with the organic solvent in which oligomer (IV) is dissolved, and the resulting mixture is stirred at

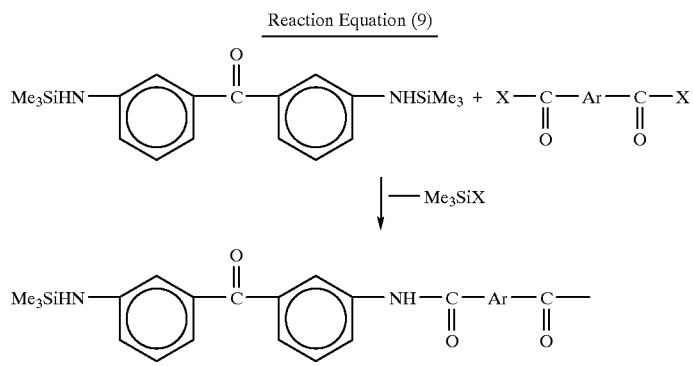

Reaction Equation (9)

wherein Ar represents an aromatic residue, X represents halogen, Me represents a methyl group, and silylated 3,3'-diaminodiphenyl ketone is used as the silylated aromatic diamino compound (b).

The adjustment of the amount of the dicarboxylic acid derivative in the synthesis of oligomer (III) and oligomer (IV) is described below.

In the synthesis of each oligomer, the molar amount of the dicarboxylic acid derivative is basically the same as that of compound ($a_o$) or compound (b). However, it is preferred that the molar amount of compound (c) is properly varied to that of compound ($a_o$) or compound (b), for the following reasons:

(1) One of oligomer (III) and oligomer (IV) is terminated with —COCl, and the other is terminated with —NH2 so that oligomer (III) and oligomer (IV) are well reacted with each other; and (2) The molecular weight of oligomer (III) or oligomer (IV) is properly adjusted.

a temperature of −20° C. to 250° C. for 2 hours to 24 hours to synthesize a block copolymer precursor. The polymerization reaction does not proceed at a temperature of less than −20° C. On the other hand, exceeding 250° C. results in progress of the thiazole ring-closing reaction.

The polymerization reaction is conducted under the above-mentioned conditions, thereby obtaining the PBZ-O block copolymer precursor having a high degree of polymerization without occurrence of the thiazole ring-closing reaction.

The intrinsic viscosity $\eta_{inh}$ (in NMP, 30° C., 0.5 g/dl) of the PBZ-O block copolymer precursor is about 0.3 to about 1.8.

The polymerization reaction of oligomer (III$_1$) described above with oligomer (IV$_1$) proceeds according to the following reaction equation (10) to obtain the block copolymer precursor:

Reaction Equation (10)

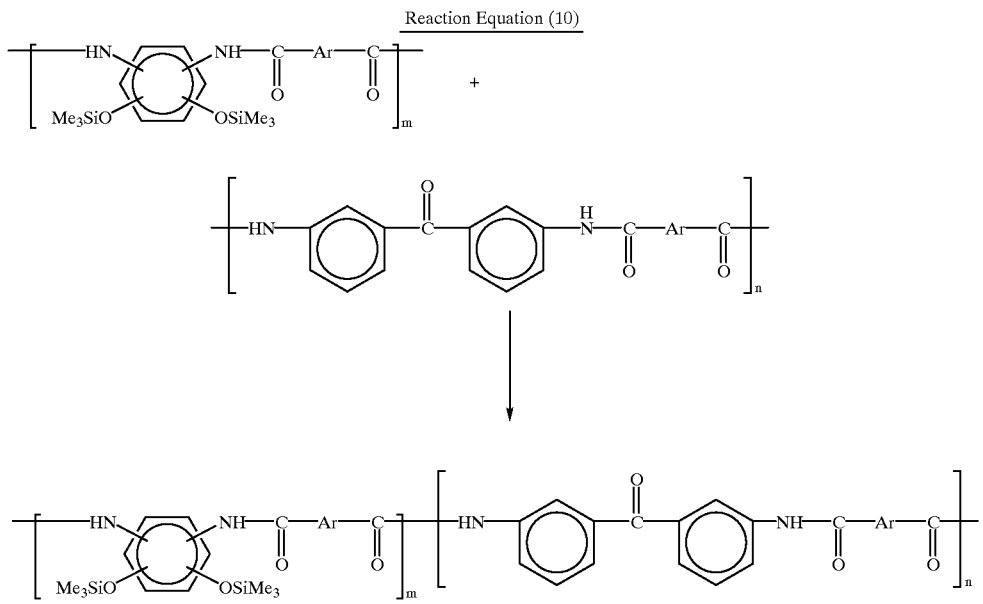

wherein m and n represents the degree of polymerization, and m:n can be within the range from 0.01:99.99 to 99.99:0.01.

The resulting block copolymer precursor can be washed and dried by known methods.

Here, oligomer (III$_1$) obtained according to reaction equation (8) described above is used as oligomer(III), and oligomer (IV$_1$) obtained according to reaction equation (9) described above is used as oligomer(IV). However, the present invention is not limited thereto.

For example, in the production of oligomer (IV), when silylated 3,4'-diaminodiphenyl ether is used as compound (b), and 2-chloroterephthaloyl dichloride is used as compound (c), the reaction proceeds according to the following reaction equation (11) to obtain an oligomer (hereinafter referred to as "oligomer (IV$_2$)"):

Reaction Equation (11)

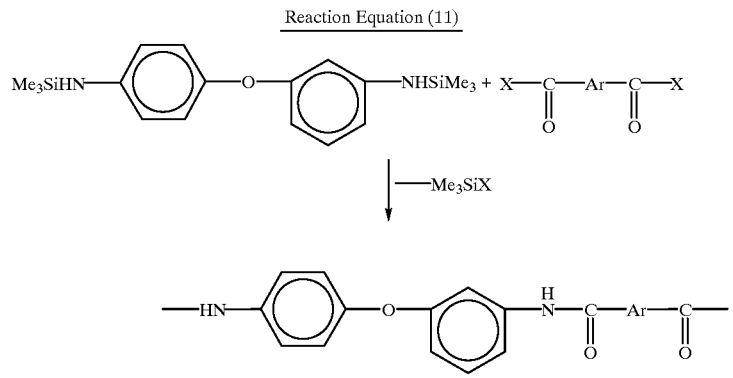

wherein Ar represents an aromatic residue, X represents halogen, and Me represents a methyl group.

The polymerization reaction of oligomer (IV$_2$) with oligomer (III$_1$) described above proceeds according to the following reaction equation (12) to obtain a block copolymer precursor:

Reaction Equation (12)

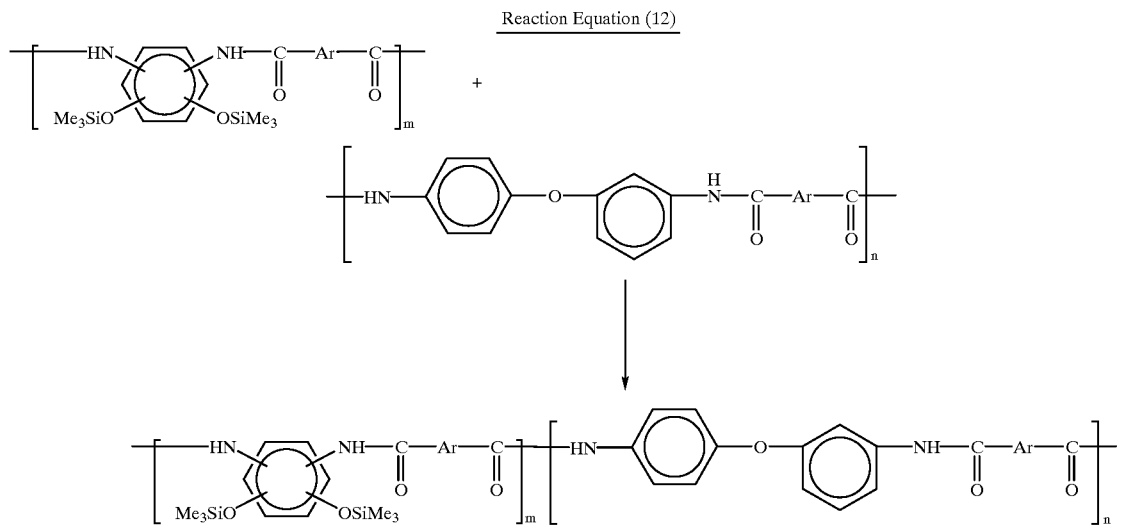

wherein m and n represents the degree of polymerization, and m:n can be within the range from 0.01:99.99 to 99.99:0.01.

The intrinsic viscosity $\eta_{inh}$ (NMP, 30° C., 0.5 g/dl) of the resulting PBZ-O block copolymer precursor is about 0.4 to about 1.5.

(2)-2 PBZ-O Random Copolymer Precursor

Then, a method for producing a random copolymer precursor of the PBZ-O copolymer precursors is described. When the PBZ-O random copolymer is produced, compound ($a_o$), compound (b) and compound (c) are dissolved in a desired compounding ratio in an organic solvent, and these three components are copolymerized.

Preferably, compound ($a_o$) silylated is used as compound (a), and the aromatic diamino compound in which an amino group is silylated is used as compound (b), and these are allowed to react with compound (c). When the copolymer precursor is produced using the silylated compounds as compound ($a_o$) and compound (b) as described above, a copolymer precursor having a high molecular weight can be obtained in high yield.

Silylation of the amino and hydroxyl groups of the aromatic diaminodihydroxy compound can be performed in a manner similar to that of silylation in the production of the PBZ-O random copolymer precursor described above.

Similarly, the aromatic diamino compound (b) can also be silylated. The silylated compounds are produced under the above-mentioned conditions, and then, the above-mentioned compounds ($a_o$), (b) and (c) are dissolved in a desired compounding ratio in an organic solvent. The resulting solution is stirred at a temperature of −10° C. to 40° C. for 6 hours to 24 hours to copolymerize these three components. Preferably, a homogeneous solution of compound ($a_o$) and compound (b) is first prepared, and compound (c) is added thereto. The polymerization reaction does not proceed at a temperature of less than −20° C. On the other hand, exceeding 250° C. results in progress of the thiazole ring-closing reaction.

The polymerization reaction is conducted under the above-mentioned conditions, thereby obtaining the random copolymer precursor having a high degree of polymerization without occurrence of the thiazole ring-closing reaction.

The intrinsic viscosity $\eta_{inh}$ (NMP, 30° C., 0.5 g/dl) of the resulting PBZ-O random copolymer precursor is about 0.4 to about 1.2.

The ratio of the amount of compound ($a_o$) to that of compound (b) in the solution using the organic solvent is the ratio of the portion converted to the rigid chain moiety to the portion forming the flexible chain moiety (namely, the ratio of m to n in the above-mentioned general formula (2)) in the random copolymer finally obtained. According to the purpose of use of the random copolymer precursor, the amount of compound ($a_o$) and compound (b) is appropriately determined. In the present invention, m:n can be within the range from 0.01:99.99 to 99.99:0.01.

The amount of compound (c) is at least the same amount as the total molar amount of compound ($a_o$) and compound (b). The total concentration of compound ($a_o$), compound (b) and compound (c) in the organic solvent is preferably about 0.5 mol/liter to about 5 mol/liter. A concentration of less than 0.5 mol/liter results in difficulty of progress of the polymerization reaction, whereas exceeding 5 mol/liter unfavorably results in difficulty of dissolving each component.

The organic solvents include the same solvents as used in the production of the block polymer precursor.

The resulting random copolymer precursor can be washed and dried by known methods.

When the silylated compounds are used as compounds ($a_o$) and (b), the resulting random copolymer precursor is subjected to desilylation treatment by stirring it in an alcohol such as methyl alcohol for several hours and repeating washing with the alcohol, similarly to the block copolymer.

The blocks containing aromatic heterocycles having imidazole rings as condensed rings include a block containing polybenzimidazole represented by the following formula (4):

Formula (4)

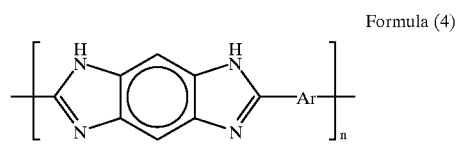

This copolymer precursor can be obtained according to the following reaction equation (13):

Reaction Equation (13)

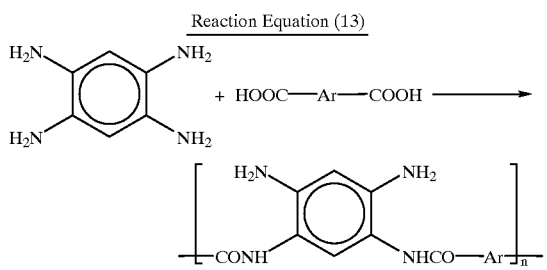

Further, the blocks containing aromatic heterocycles having oxazinone rings as condensed rings include a block containing polybibenzoxazinone represented by the following formula (5):

Formula (5)

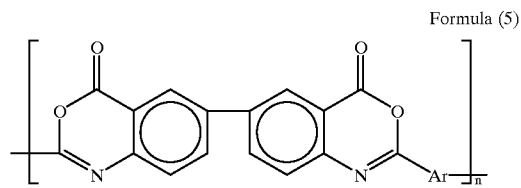

This precursor polymer can be obtained according to the following reaction equation (14):

Reaction Equation (14)

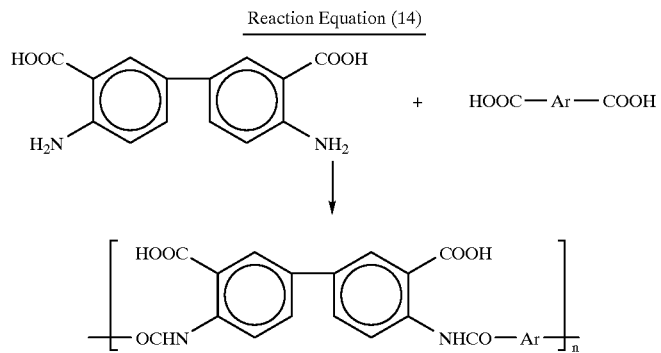

The above-mentioned methods can also be applied to these aromatic heterocycles to produce copolymers with aromatic amide-containing polymers.

II. Ring-Closing Reaction of Aromatic Heterocyclic Copolymer Precursors (Step (ii))

The aromatic heterocyclic copolymers are obtained by ring closure of the block and/or random copolymer precursors obtained as described above.

The ring-closing reaction of the aromatic heterocyclic copolymer precursors is performed by heating at 250° C. to 400° C. The formation of aromatic heterocycles is not observed on heating at a temperature of less than 250° C. On the other hand, heating at a temperature exceeding 400° C. unfavorably initiates thermal decomposition. Accordingly, the upper limit of the temperature is preferably 380° C.

The heating may be conducted not only at a constant temperature, but also according to a heating program gradually changing the temperature.

On the heating of the aromatic heterocyclic copolymer precursors as described above, the ring-closing reaction occurs to obtain the aromatic heterocyclic copolymers. The use of the PBZ-O copolymer precursor obtained according to a reaction equation (17) given later can provide an aromatic heterocyclic copolymer shown in the following reaction equation (15):

Reaction Equation (15)

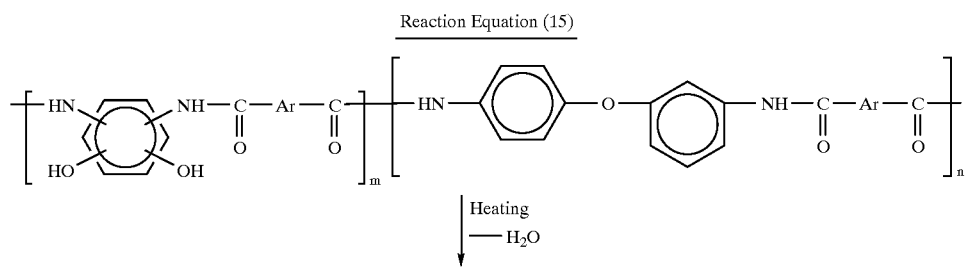

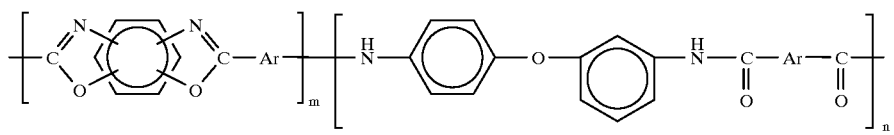

The formed articles of the aromatic heterocyclic copolymers of the present invention can be produced by subjecting the uncyclized block and/or random copolymer precursors to the mold hot pressing process, followed by internal mold heat treatment.

The aromatic heterocyclic copolymer precursors produced by the method of the above-mentioned step (i) can be separated as coagulums by introducing reaction solutions thereof into poor solvents. At this time, it is preferred that the concentration of the reaction solutions is adjusted to about 15% to about 40% by weight and the resulting solutions are sprayed in the poor solvents to rapidly form coagulated powders. The poor solvents include alcohols such as methanol and ethanol and distilled water.

The coagulums may be molded as they are. However, they may be dissolved again in organic solvents and recoagulated by the removal of the solvents, followed by molding of the resulting coagulums. Such recoagulation of the precursors after dissolution in the organic solvents results in complete removal of unreacted products from the products, thereby being able to measure the yield precisely and to obtain coagulated powders more suitable for molding.

When the organic solvent solutions of the aromatic heterocyclic copolymer precursors are introduced into the poor solvents, the concentration thereof is preferably 10% to 40% by weight, and more preferably 15% to 30% by weight.

The dissolution time is preferably about 6 hours to about 30 days, although it somewhat varies depending on the solvents. The temperature is $-15°$ C. to $150°$ C., preferably room temperature to $80°$ C., and more preferably room temperature to $60°$ C. The solutions of the copolymer precursors are preferably prepared in an atmosphere of an inert gas such as nitrogen or argon gas, or under vacuum.

When the PBZ-O copolymer precursor is subjected to the ring-closing reaction using the silylated compounds as compounds ($a_o$) and (b), the precursor is stirred in an alcohol such as methyl alcohol for several hours to repeat washing with the alcohol, thereby subjecting the precursor to desilylation treatment as shown in the following reaction equation (16):

Reaction Equation (16)

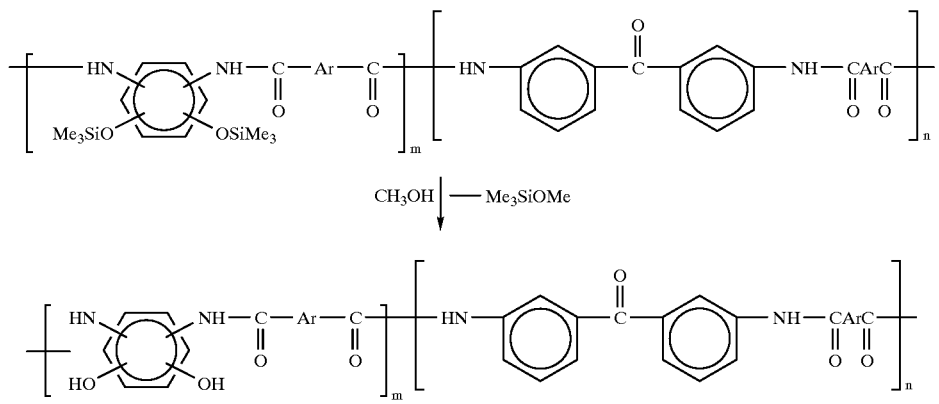

In this case, it is preferred to stir for 3 days to 1 week for complete dissolution of the precursors in the organic solvents. The organic solvents preferably used herein include organic solvents of the amide family such as N-methyl-2-pyrrolidone (NMP) and N,N-dimethylacetamide, and dimethyl sulfoxide.

Methods for removing the solvents include introduction of the organic solvent solutions of the aromatic heterocyclic copolymer precursors into poor solvents, and drying of the solutions to form cast films. The poor solvents include alcohols such as methanol and ethanol and distilled water.

Methods for introducing the organic solvent solutions of the precursors into the poor solvents may be any, including spraying, dropping, pouring in the fiber form and spreading in the tabular form of the solutions in the poor solvents for coagulation in the poor solvents. In particular, spraying and pouring in the fiber form are preferred.

wherein Ar is an aromatic residue.

Further, the fiber-like aromatic heterocyclic copolymer precursors may be drawn. When molded, they may be placed in molds as they are in the long fiber form, or as fiber cut to a length of about 2 mm to about 10 mm.

The molding is conducted by the mold hot pressing process, as long as the ring-closing reaction of the aromatic heterocyclic copolymer precursors does not occur. The molding temperature is preferably $200°$ C. to $250°$ C. Lower than $200°$ C. results in insufficient melt viscosity, whereas exceeding $250°$ C. unfavorably results in initiation of ring closure. The pressure is preferably 50 kgf/cm$^2$ to 500 kgf/cm$^2$ and more preferably 100 kgf/cm$^2$ to 300 kgf/cm$^2$. Less than 50 kgf/cm$^2$ results in the fear of development of voids in the formed articles, whereas exceeding 500 kgf/cm$^2$ unfavorably results in remaining of residual stress. Further, the molding is preferably performed in a glove box in an atmosphere of an inert gas such as argon.

In the present invention, after mold hot pressing, the temperature of the molds is elevated as such to heat treat the copolymer precursors in the molds under pressure, thereby allowing the ring-closing reaction to occur in the copolymer precursors. Thus, the formed articles of aromatic heterocyclic copolymers are produced.

The temperature of heat treatment after the molding can be appropriately selected according to the aromatic heterocyclic copolymers. In general, however, it is 250° C. to 400° C. No formation of aromatic heterocycles such as thiazole and oxazole rings is observed at a temperature of lower than 250° C. In the case of PBZ-T, the temperature is most suitably elevated at a rate of 1° C./minute to 350° C. after the molding, followed by heating for 30 minutes. If the rate of temperature elevation and the heating time exceed these values, the materials are unfavorably decomposed. The heating may be conducted not only at a constant temperature, but also according to a heating program gradually changing the temperature.

The heating is preferably conducted in an atmosphere of an inert gas or under vacuum. The pressure in heating is preferably 50 kgf/cm² to 300 kgf/cm².

In this heating, an alkyl group R is eliminated for the PBZ-T copolymer precursor and hydrogen for the PBZ-O copolymer precursor, and a thiazole ring or an oxazole ring is formed at this site to form the aromatic heterocyclic copolymer.

When the PBZ-T block copolymer precursor obtained according to reaction equation (4) described above is used as the aromatic heterocyclic block copolymer precursor, an aromatic heterocyclic block copolymer having the following structural formula (6) is formed:

shown in FIG. 2 is preferably used rather than a mold provided with no vent hole as shown in FIG. 1.

According to the above-mentioned method, the uncyclized aromatic heterocycles homogeneously dispersed in the matrix-like portions formed by the flexible chain moieties act as aromatic heterocycles forming rigid moieties as such, so that the aromatic heterocycles are dispersed finely and homogeneously in the matrixes, resulting in acquisition of polymer materials having good mechanical characteristics.

Further, rigid chain blocks have the homogeneous mesh structure without coagulation because of the restraint by the pressure of the mold in the ring-closing reaction.

The formed articles obtained by mold hot pressing process of the aromatic heterocyclic copolymers of the present invention have the structure in which aromatic hetero-cycle-rich phases, rigid chains acting as reinforcing materials, homogeneously exist as continuous three-dimensional mesh phases in matrix-like phases rich in flexible chain moieties. In the present invention, the average size of the three-dimensional meshes is preferably 1 μm or less, and the size of the continuous phases of the aromatic heterocyclic copolymer blocks is preferably 200 nm or less.

Figure 3:
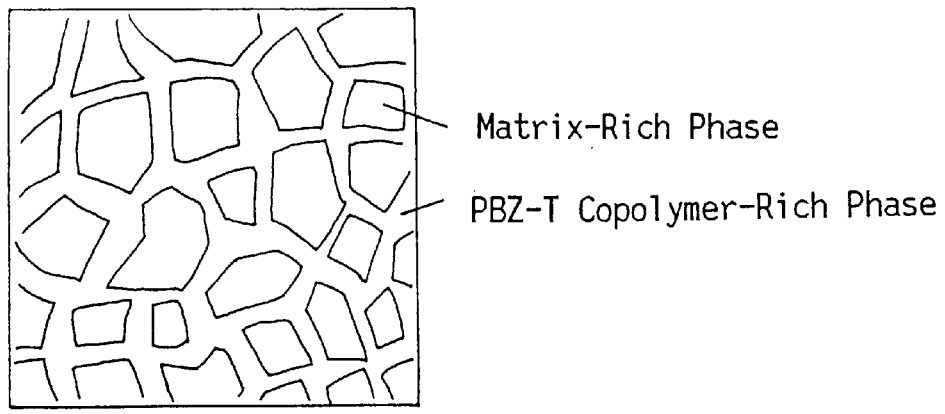
FIG. 3 is a schematic view showing a state of a PBZ-T block copolymer of the present invention.

FIG. 3 is a schematic view showing the state of the aromatic heterocyclic copolymer of the present invention.

In the aromatic heterocyclic copolymers of the present invention, the rigid chain blocks, namely, the aromatic heterocyclic polymer blocks form the three-dimensional mesh structure in the matrix-like portions containing the flexible chain moieties, and dispersed very finely and homogeneously. Further, the copolymerization with the aromatic Formula (6)

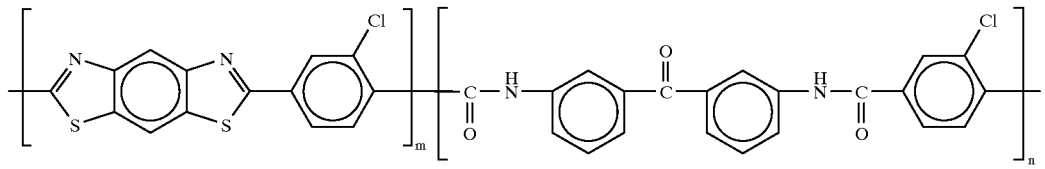

When the PBZ-O block copolymer precursor obtained according to reaction equation (16) is used as the block copolymer precursor, an aromatic heterocyclic block copolymer having the following structural formula (7) is formed:

polyamide-containing chain moieties enhances the flexibility of the composite materials, so that general melt molding becomes possible. Furthermore, coagulation of the rigid chain polymers does not occur in molding, and large phase separation is not developed, different from compounding of Formula (7)

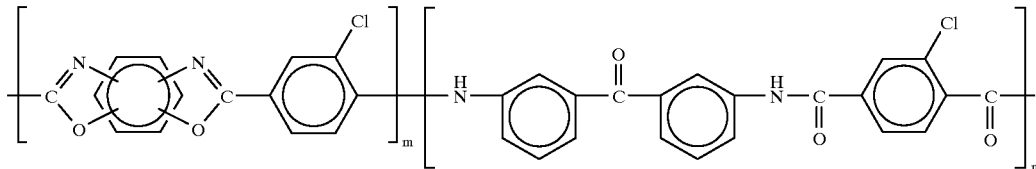

A gas is generated in the ring-closing reaction. In the present invention, it is preferred that the heating is performed with purging this gas because the ring-closing reaction is conducted in a mold. Accordingly, a mold provided with a vent hole and porous members at molding faces as two kinds of polymers. Accordingly, the polymer materials of the present invention have excellent mechanical characteristics.

Such characteristics are caused by forming the copolymers acting as the matrixes in which fragments very high in bending properties are introduced into the rigid polymers, thereby improving the flexibility and combining two elements of the reinforcing polymers and the matrixes in molecules.

In the ring-closing reaction, the restraint by the pressure of the molds prevents coagulation of the rigid chain blocks, and allows the reinforcing materials or the rigid chain blocks, namely, the aromatic heterocyclic polymer blocks to form the three-dimensional mesh structure, thereby dispersing them finely and homogeneously in the matrixes. Thus, general melt molding becomes possible, large phase separation which is developed in the conventional molding of the composite materials is not developed, and coagulation of the aromatic heterocyclic polymers does not occur. Accordingly, the polymer materials excellent in mechanical characteristics can be obtained.

Solutions of the aromatic heterocyclic copolymers of the present invention are high in liquid crystallinity, and the precursors thereof can be easily spun from solutions of the precursors in organic solvents. According to the method of the present invention, therefore, not only films of the aromatic heterocyclic copolymers, but also fiber thereof can be easily produced.

Further, long-term stirring is not required for compounding two kinds of polymers. The method of the present invention is therefore efficient.

Such fine compounding in the same molecule can substantially improve the rigidity, the hardness and characteristics at high temperatures, and can lower the coefficient of linear expansion to a level of light metals, even when a small amount of reinforcing component is added.

The polymer materials of the present invention have high mechanical strength, and therefore, can be widely utilized as various materials including parts of aircraft, parts of automotive vehicles and space equipment.

III. Molecular Compounding of Matrix Polymers and Aromatic Heterocyclic Copolymers Another aspect of the present invention relates to molecular composite materials of matrix polymers and the above-mentioned aromatic heterocyclic copolymers. The molecular composite material is obtained by dissolving the matrix polymer and the unsubstituted or substituted, uncyclized aromatic heterocyclic copolymer precursor in an organic solvent, then coagulating the resulting composite material by removal of the solvent, and subjecting the aromatic heterocyclic copolymer precursor to the ring-closing reaction.

In the molecular composite materials of the present invention, the aromatic heterocyclic copolymers form a fine particle dispersion type structure, a three-dimensional mesh fine particle dispersion type structure or a three-dimensional mesh type dispersion structure in the matrix polymers.

The matrix polymers used in the present invention include polyamides, polyimides, polyamideimides, aramid resins (aromatic polyamides), polyethersulfones, and polyetherimides. These matrix polymers are good in miscibility with the aromatic heterocyclic copolymers, and can provide molecular composite materials excellent in mechanical strength. As the matrix polymers, aromatic polyamides and/or aromatic polyamide copolymers are particularly preferred.

Further, in order to improve the miscibility of the aromatic heterocyclic copolymer with the matrix polymer, it is preferred that the aromatic heterocyclic copolymer has fragments each containing at least a part of the matrix polymer in repeating units. Accordingly, when the aromatic heterocyclic copolymer precursor is produced, a compound having a structure identical to or similar to a part of the matrix polymer to be mixed therewith is preferably selected as compound (b) described above.

From such a viewpoint, when the matrix polymer is an aromatic polyamide, the aromatic heterocyclic copolymer is preferably a polybenzothiazole copolymer.

In order to obtain the molecular composite material of the present invention, the above-mentioned matrix polymer and the aromatic heterocyclic copolymer precursor obtained as described above are dissolved in an organic solvent sufficiently dissolving both, and then, the solvent is removed for coagulation to obtain the molecular composite material composed of the matrix polymer and the aromatic heterocyclic copolymer precursor.

The organic solvents suitably used include organic solvents of the amide family such as N-methyl-2-pyrrolidone (NMP) and N,N-dimethylacetamide, and dimethyl sulfoxide.

In the compounding of the copolymer precursor and the matrix polymer, even a very small amount of the copolymer precursor gives the reinforcing effect. However, the ratio of the copolymer precursor to the matrix polymer is preferably established so that the final compounding ratio of the aromatic heterocyclic copolymer to the matrix polymer is within the range from 1:99 to 90:10. If the compounding ratio of the aromatic heterocyclic copolymer acting as a reinforcing polymer is too high, its existence becomes too dense. Accordingly, molecules of the aromatic heterocyclic copolymer aggregate, resulting in poor dispersion at the molecular level, which conceivably decreases the mechanical strength of the molecular composite material. More preferably, the compounding ratio is 3:97 to 80:20.

The copolymer precursor and the matrix polymer may be dissolved by any methods, as long as a homogeneous solution is obtained. For example, a solution of the copolymer precursor and a solution of the matrix polymer may each be prepared, followed by mixing them with each other to provide a homogeneous solution, or the matrix polymer may be added to a solution in which the copolymer precursor is dissolved to form a homogeneous solution. Further, both may be dissolved in one kind of solvent at the same time.

The final concentration of the solutions is preferably 1 to 40% by weight, and more preferably 3 to 30% by weight. Less than 1% by weight is too thin to be practical, whereas exceeding 40% by weight results in a reduction in solubility.

The mixing time is preferably about 6 hours to about 30 days, although it somewhat varies according to the matrix polymer used and the kind of solvent. Further, the mixing temperature is −15° C. to 150° C., preferably room temperature to 80° C., and more preferably room temperature to 60° C. The solubility is low at a low temperature of less than −15° C., whereas the decomposition unfavorably proceeds at a temperature exceeding 150° C. The copolymer precursor solution and the matrix polymer solution are preferably prepared and mixed in an atmosphere of an inert gas such as nitrogen or argon gas, or under vacuum.

Then, the solvent is removed from the solution in which the matrix polymer and the aromatic heterocyclic copolymer precursor are dissolved, thereby coagulating the composite material to obtain a composite coagulum of the matrix polymer and the aromatic heterocyclic copolymer.

Methods for removing the solvents include introduction of the solutions of the matrix polymers and the aromatic heterocyclic copolymer precursors into poor solvents, and methods for removing the solvents by heating or reduced pressure.

The poor solvents used herein include alcohols such as methanol and ethanol and distilled water.

The desilylation can be conducted by stirring the composite coagulum in an alcohol such as methyl alcohol for several hours to repeat washing with the alcohol in a manner similar to that of the aromatic heterocyclic copolymer.

A reaction equation of desilylation treatment of the PBZ-O copolymer precursor obtained according to reaction equation (12) described above is shown below as reaction equation (17):

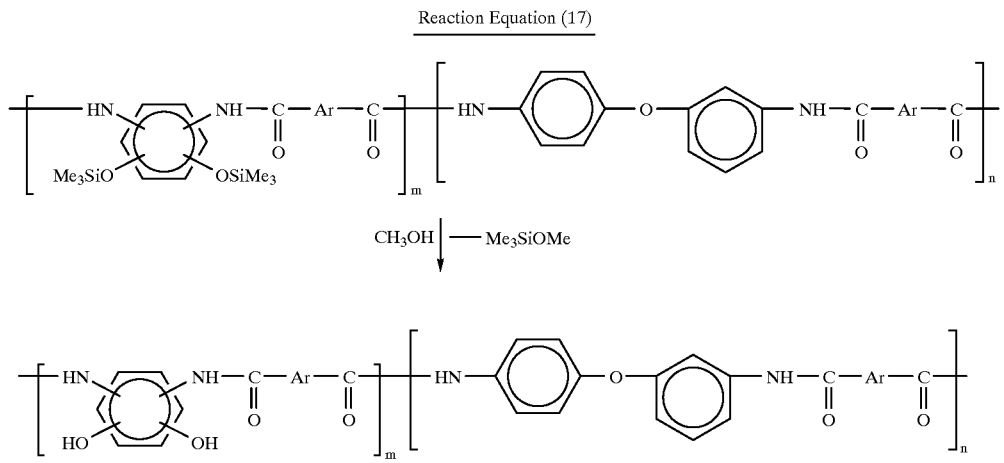

wherein Ar is an aromatic residue.

Then, the composite coagulum of the copolymer precursor and the matrix copolymer obtained above is heated to allow the thiazole or oxazole ring-closing reaction to occur, thus obtaining the molecular composite material of the aromatic heterocyclic copolymer and the matrix copolymer.

Methods for introducing the solutions into the poor solvents may be any, including spraying, dropping, pouring in the fiber form and spreading in the tabular form of the solutions in the poor solvents.

When the solution is poured in the fiber form, it may be simply poured in the poor solvent. However, it is more preferred that the solution is ejected through a die having a diameter of 0.1 mm to 1 mm. In this case, the fiber coagulated in the poor solvent is preferably continuously taken up.

When the silylated compounds are used as compounds (a) and (b) in the production of the aromatic heterocyclic copolymer precursor, desilylation thereof is conducted.

The silylated aromatic heterocyclic copolymer precursor has high solubility in the organic solvent and good miscibility with the matrix polymer. The desilylation is therefore applied to a composite coagulum after the aromatic hetero- In this heating, the alkyl group R is eliminated for the PBZ-T copolymer precursor, or hydrogen is eliminated for the PBZ-O copolymer precursor, and a thiazole or oxazole ring is formed at the eliminated site to form an aromatic heterocyclic copolymer. The use of the PBZ-T copolymer precursor as the copolymer precursor, said PBZ-T copolymer precursor being obtained according to reaction equation (6) described above, results in formation of an aromatic heterocyclic copolymer having the following structural formula (8) which is finely dispersed in the matrix polymer.

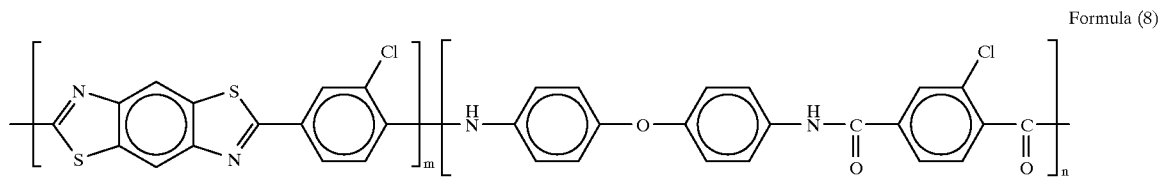

Formula (8)

cyclic copolymer precursor and the matrix copolymer have been dissolved and the resulting product has been coagulated.

Further, the use of the PBZ-O copolymer precursor as the copolymer precursor, said PBZ-O copolymer precursor being obtained according to reaction equation (17) described above, results in formation of an aromatic heterocyclic copolymer having the following structural formula (9) which is finely dispersed in the matrix polymer.

Then, the molecular composite materials of the matrix polymers and the aromatic heterocyclic copolymers thus obtained are molded by the mold hot pressing process,

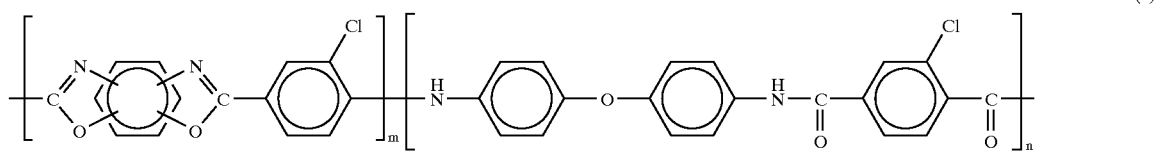

Formula (9)

The heating temperature is generally 250° C. to 400° C. although it varies according to the kind of matrix polymer used. The formation of the thiazole or oxazole ring is not observed at a temperature of less than 250° C., whereas the decomposition of the polymers is unfavorably initiated at a temperature exceeding 400° C.

In particular, in the case of a powdery composite coagulum in which the aromatic heterocyclic copolymer precursor is the FBZ-T copolymer precursor, the heating is most suitably conducted at about 330° C. for about 30 minutes. Further, in the case of a powdery composite coagulum in which the aromatic heterocyclic copolymer precursor is the PBZ-O copolymer precursor, the heating is most suitably conducted at about 350° C. for about 30 minutes. The heating may be conducted not only at a constant temperature, but also according to a heating program gradually changing the temperature. Furthermore, the heating is preferably conducted in vacuo.

When the composite coagulum of the copolymer precursor and the matrix copolymer is in the fiber form, such heat treatment is preferably performed under tension or with drawing. Namely, the heat treatment is conducted while keeping the length of fibrous coagulum constant or while drawing the fibrous coagulum. When the length of the fibrous coagulum is kept constant (heat treatment under tension), a jig which can clamp both ends of the fibrous coagulum is preferably used. When the fibrous coagulum is drawn, the draw ratios preferably about 1.1 to about 2.0.

The copolymer precursors used in the present invention contract in association with the ring-closing reaction. Contracting tension is therefore generated on heating, and keeping the length of the fibrous coagulum constant results in self drawing to bring about a state similar to drawing. Accordingly, heating under conditions under which such tension is generated can prevent aromatic heterocyclic copolymer molecules from being coagulated, and can uniaxially orient rigid polymers well.

When the fibrous coagulum is heated while keeping the length thereof constant, it is most suitable that the coagulum in which the aromatic heterocyclic copolymer precursor is the PBZ-T copolymer precursor is heated at 250° C. for 1 hour, and then, the temperature thereof is elevated to 275° C., followed by heating for 1 hour and further elevated to 300° C., followed by heating with drawing. Further, it is most suitable that the coagulum in which the aromatic heterocyclic copolymer precursor is the PBZ-O copolymer precursor is heated at a temperature of 250° C. to 400° C. for 30 minutes to 1 hour. Furthermore, when heated with drawing, it is preferred that the coagulum is heated at 250° C. for 1 hour, and then, the temperature thereof is elevated to 275° C., followed by heating with drawing for 1 hour and further elevated to 300° C., followed by heating for 1 hour.

Although the heating may be performed in the atmosphere, it is preferably conducted in vacuo or in an inert atmosphere.

thereby being able to obtain formed articles of the molecular composite materials of the present invention.

When the molecular composite material is fibrous, it is preferably placed in a mold as staple fiber having a length of 1 to 30 mm, and a diameter of 0.3 mm to 1.0 mm in molding, followed by mold hot pressing.

The molding temperature is preferably 200° C. to 400° C. than 200° C. results in insufficient molding fluidity to cause the fear of development of voids, whereas exceeding 400° C. unfavorably initiates the decomposition of the polymers. The pressure is preferably 60 kgf/cm$^2$ to 300 kgf/cm$^2$, and more preferably 80 kgf/cm$^2$ to 150 kgf/cm$^2$. Less than 60 kgf/cm$^2$ results in easy development of voids in the formed articles, whereas exceeding 300 kgf/cm$^2$ results in the tendency of the problem of residual stress to arise.

Although the mold hot pressing process may be conducted in the atmosphere, it is preferably performed in an atmosphere of an inert gas, and more preferably in a glove box in an atmosphere of argon gas.

According to the methods described above, the copolymer precursors homogeneously dispersed in the matrix polymers at the molecular level are converted to the aromatic heterocyclic copolymers as such by the ring-closing reaction. The molecular composite materials are therefore obtained in which the aromatic heterocyclic copolymers are dispersed finely and homogeneously in the matrix polymers. Also in melt molding of the molecular composite materials, the aromatic heterocyclic copolymers do not coagulate, and large phase separation does not occur. Accordingly, in the formed articles of the aromatic heterocyclic copolymers molded from the powdery composite coagulums, the aromatic heterocyclic copolymers form the fine particle dispersion type structure.

Further, in the fibrous molecular composite materials, molecules of the reinforcing materials (aromatic heterocyclic copolymers) are finely dispersed without occurrence of granular coagulation, so that they form the three-dimensional mesh fine particle dispersion type structure having uniform meshes and composed of the finely divided molecules of the reinforcing materials.

Figure 4:
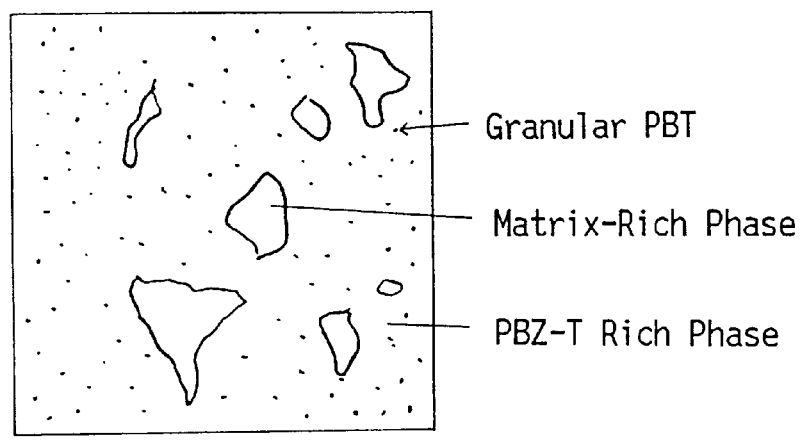
FIG. 4 is a schematic view showing a composite state of a fine particle dispersion type molecular composite material of the present invention.

FIG. 4 is a schematic view showing the structure of a formed article molded from the powdery molecular composite material of the present invention.

Like this, the formed article of the molecular composite material of the present invention has a structure in which a matrix-rich phase is an island component and the aromatic heterocyclic copolymer or the reinforcing material is a sea component, and the reinforcing polymer (aromatic heterocyclic copolymer) is homogeneously dispersed in the reinforcing material-rich phase as particles having a maximum size of 100 nm or less.

FIG. 5 is a schematic view showing the structure of a formed article molded from the fibrous molecular composite material of the present invention.

Like this, the formed article of the molecular composite material of the present invention has a structure in which a phase rich in the aromatic heterocyclic copolymer or the reinforcing polymer is distributed in the matrix polymer in the three-dimensional mesh form, and the reinforcing polymer is dispersed in the PBZ-T copolymer-rich phase as fine particles.

In the present invention, the average size of the meshes is preferably 2 μm or less, and the average size of the aromatic heterocyclic copolymer particles is preferably 60 nm or less.

As described above, in the present invention, the aromatic heterocyclic copolymers are used as the reinforcing materials for the matrix polymers, said aromatic heterocyclic copolymers being improved in miscibility with the matrix polymers by introducing fragments identical to or similar to the matrix polymers into the aromatic heterocyclic polymers to form copolymers. As a result, the aromatic heterocyclic copolymers can be dispersed homogeneously and finely at the nanometer level in the matrix polymers.

In the ring-closing reaction, granular coagulation of the reinforcing materials can be prevented by applying the tension to the fibrous composite coagulums. It is therefore possible in the subsequent melt molding to finely dividing the meshes into particle populations, and to allow the aromatic heterocyclic copolymers or the reinforcing materials to form the three-dimensional mesh fine particle dispersion type structure, thereby dispersing them finely and homogeneously in the matrix polymers to form the molecular composite materials.

Accordingly, the molecular composite materials of the present invention can be applied to the general melt molding, do not generate large phase separation, do not produce coagulation of the aromatic heterocyclic copolymers, and are excellent in mechanical characteristics.

The above descriptions are directed to the formed articles of the molecular composite materials which are obtained by molding the composite coagulums of the aromatic heterocyclic copolymers and the matrix polymers after ring closure of aromatic heterocycles thereof. However, the composite coagulums can be molded without ring closure, and then cyclized, thereby obtaining the formed articles of the molecular composite materials.

The composite coagulums used herein are obtained by dissolving the matrix polymers and the aromatic heterocyclic copolymer precursors in the organic solvents in which both can be sufficiently dissolved, and then removing the solvents to coagulate the composite materials, similarly to the composite coagulums used in molding after ring closure.

However, the compounding ratio of the copolymer precursor to the matrix polymer is preferably established so that the final weight ratio is within the range from 1:99 to 70:30, and more preferably within the range from 1:99 to 60:40.

The formed articles of the molecular composite materials are produced by molding the composite coagulums of the aromatic heterocyclic copolymer precursors and the matrix polymers by mold hot pressing, and then heating the composite coagulums in molds at a specified temperature to induce the ring-closing reaction.

When the fibrous composite coagulums are used in this case, they may be drawn for use.

They may be placed in molds as they are in the long fiber form, or as fiber cut to a length of about 2 mm to about 10 mm.

In this case, the mold hot pressing is conducted in such a manner that the ring-closing reaction of the aromatic heterocyclic copolymer precursors does not occur. The molding temperature is preferably 200° C. to 400° C. Less than 200° C. results in insufficient molding fluidity to cause the fear of development of voids, whereas exceeding 400° C. unfavorably initiates the decomposition of the polymers. The pressure is preferably 10 kgf/cm$^2$ to 500 kgf/cm$^2$, and more preferably 100 kgf/cm$^2$ to 300 kgf/cm$^2$. Less than 10 kgf/cm$^2$ results in remaining of voids in the formed articles, whereas exceeding 500 kgf/cm$^2$ results in application of residual stress to the formed articles. The molding is preferably performed in a glove box in an atmosphere of an inert gas such as argon.

After the mold hot pressing, the temperature of the molds is elevated as such to heat treat the copolymer precursors in the molds under pressure, thereby allowing the ring-closing reaction to occur in the aromatic heterocyclic copolymer precursors. Thus, the formed articles of the molecular composite materials of the aromatic heterocyclic copolymers and the matrix polymers are produced.

The temperature of heat treatment is generally 250° C. to 350° C. although it varies depending on the kind of matrix polymer used. The formation of aromatic heterocycles such as thiazole and oxazole rings is not observed at a temperature of lower than 250° C.

In particular, when the aromatic heterocyclic copolymer precursor is the PBZ-T copolymer precursor, it is most suitable that the temperature is elevated to 320° C. at a rate of temperature elevation of 1° C./minute after molding, followed by heating for 5 minutes. When the aromatic heterocyclic copolymer precursor is the PBZ-O copolymer precursor, it is most suitable that the temperature is elevated to 350° C. at a rate of temperature elevation of 1° C./minute after molding, followed by heating for 5 minutes. If the rate of temperature elevation and the heating temperature exceed these value, the material is unfavorably decomposed.

The heating may be conducted not only at a constant temperature, but also according to a heating program gradually changing the temperature.

Further, the heating is preferably conducted in an inert atmosphere. The pressure in heating is preferably 50 kgf/cm$^2$ to 300 kgf/cm$^2$.

In this heating, the alkyl group R is eliminated for the PBZ-T copolymer precursor, or hydrogen is eliminated for the PBZ-O copolymer precursor, and a thiazole or oxazole ring is formed at the eliminated site to form an aromatic heterocyclic copolymer.

A gas is generated in the ring-closing reaction. In the present invention, it is preferred that the heating is performed with purging this gas because the ring-closing reaction is conducted in a mold. Accordingly, a mold provided with a vent hole and porous members at molding faces as shown in FIG. 2 is preferably used, similarly to the mold used in the ring closing reaction of the aromatic heterocyclic copolymer precursors.

According to the above-mentioned method, the copolymer precursors homogeneously dispersed in the matrix polymers at the molecular level are converted to the aromatic heterocyclic copolymers as such, resulting in fine and homogeneous dispersion of the aromatic heterocyclic copolymers in the matrix polymers. Thus, the molecular composite materials having good mechanical characteristics are obtained.

Further, molecules of the reinforcing materials form the homogeneous mesh structure without occurrence of granular coagulation because of the restraint by the pressure of the molds in the ring-closing reaction.

FIG. 6 is a schematic view showing the structure of the molecular composite material of the present invention.

Like this, the formed article of the molecular composite material of the present invention has a structure in which a phase rich in the aromatic heterocyclic copolymer or the reinforcing polymer uniformly exists as a continuous three-dimensional mesh phase in a matrix polymer-rich phase.

In the present invention, the average size of the meshes is preferably 1 μm or less, and the average size of the continuous phase of the aromatic heterocyclic copolymer is preferably 200 nm or less.

The molecular composite materials of the present invention, in which the aromatic heterocyclic copolymers or the reinforcing materials thus form the three-dimensional mesh structure and dispersed very finely and homogeneously in the matrix polymers, can be applied to the general melt molding, do not produce coagulation of the reinforcing material polymers in molding, and do not generate large phase separation, whereby the molecular composite materials of the present invention have excellent mechanical characteristics.

As described above, in the present invention, when the aromatic heterocyclic polymers which are generally poor in solubility, are only soluble in strong acids, do not melt by heat, are poor in miscibility, and are difficult of molding processing are combined with the matrix polymers to form the composite materials, the fragments identical to or similar to the matrix polymers are introduced into the aromatic heterocyclic polymers to form the copolymers, thereby improving the miscibility with the matrix polymers.

In the ring-closing reaction, the restraint by the pressure of the molds prevents coagulation of the molecules of the reinforcing materials, and allows the aromatic heterocyclic copolymers or the reinforcing materials to form the three-dimensional mesh structure, thereby dispersing them finely and homogeneously in the matrix polymers to form the composite materials. Thus, the molecular composite materials can be obtained which can be applied to the general melt molding, do not generate large phase separation in molding, do not produce coagulation of the aromatic heterocyclic copolymers, and are excellent in mechanical characteristics.

Further, ultrasonic vibrations can be applied to the composite coagulums of the aromatic heterocyclic copolymer precursors and the matrix polymers under pressure, thereby achieving molding and ring closure to obtain the formed articles of the molecular composite materials.

That is, application of ultrasonic vibrations to the composite coagulums of the aromatic heterocyclic copolymer precursors and the matrix polymers can induce the chain-reacting ring-closing reaction from melting by heating. When the fibrous coagulums are used in this case, they may be drawn for use. Further, they may be placed in molds as they are in the long fiber form, or as fiber cut to a length of about 2 mm to about 10 mm.

Figure 7:
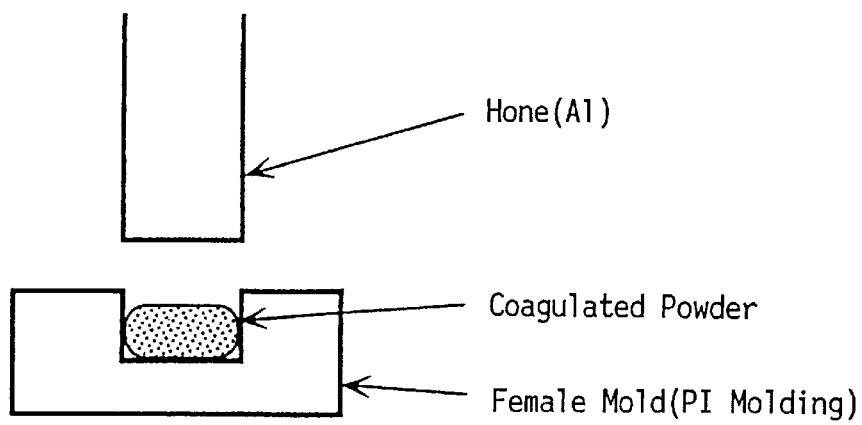
FIG. 7 is a cross sectional view showing a mold used in molding by ultrasonic application.

The molding by ultrasonic vibrations are performed according to the general methods usually employed. A cross sectional view of a mold is shown in FIG. 7. The ultrasonic vibrations are superimposed through a horn to which they are given. Materials of the horn include aluminum, titanium and ceramic-sprayed titanium, and titanium and ceramic-sprayed titanium poor in thermal conductivity are preferred.

A female mold is preferably made of a resin which is poor in thermal conductivity and does not harm the horn. However, a mold having a clearance of about 0.5 mm may also be used. When the resin female mold is used, the clearance thereof may be selected to a degree that the horn moves without resistance.

The output of an ultrasonic wave generator can be appropriately determined according to the size of the formed article, etc. When the size of the formed article is about 5×10 mm, the output is preferably 100 W to 5,000 W, and the frequency of ultrasonic vibrations is preferably 10 kHz to 20 kHz. The amplitude of the horn is preferably 10 μm to 200 μm to 200

The pressure in application of ultrasonic vibrations is preferably 10 kgf/cm² to 500 kgf/cm², and more preferably 50 kgf/cm² to 300 kgf/cm². Less than 10 kgf/cm² results in the tendency of inferior molding to take place, whereas exceeding 500 kgf/cm² results in too much overflow.

Although the application time of ultrasonic vibrations varies according to the kind of matrix polymer used, it is generally preferably 1 second to 60 seconds. Less than 1 second results in insufficient molding, whereas exceeding 60 seconds results in resin yellowing. After application for a specified period of time, the formed article is allowed to stand under pressure for 10 second to 360 seconds until it is cooled.

In the present invention, such application of ultrasonic vibrations induces the chain-reacting ring-closing reaction of thiazole or oxazole in the copolymer precursor from melting by heating to form the composite material of the aromatic heterocyclic copolymer.

In this application of ultrasonic vibrations, the alkyl group R is eliminated for the PBZ-T copolymer precursor, or hydrogen is eliminated for the PBZ-O copolymer precursor, and an aromatic heterocycle such as a thiazole or oxazole ring is formed at the eliminated site to form the aromatic heterocyclic copolymer. When the PBZ-T copolymer precursor obtained by reaction equation (6) described above is used as the copolymer precursor, the aromatic heterocyclic copolymer represented by formula (8) described above is formed.

When the PBZ-O copolymer precursor obtained by reaction equation (17) described above is used, the aromatic heterocyclic copolymer represented by the following formula (10) is formed.

Formula 10

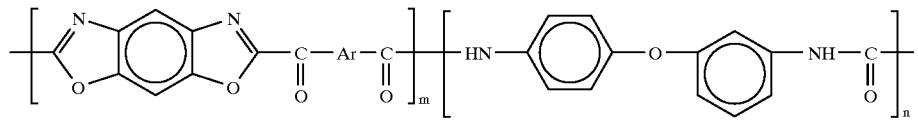

A gas is generated in the ring-closing reaction. However, the method of the present invention is very excellent in the mold gassing effect, so that voids do not remain in the formed article. In the conventional methods, the mold is heated from the periphery thereof, and therefore an outer portion of the formed article is first elevated in temperature, from which melting starts. Accordingly, the outer portion is melted in the capsule form, and a powder in a center portion remains as it is, in which the gas accumulates, resulting in very difficulty of degassing. In the method of the present invention using ultrasonic vibrations, the inside of the formed article is melted by use of the internal exothermic reaction, so that the method of the present invention has not such a problem.

Further, it is not necessary to slowly elevate the temperature for a long period of time, thereby lowering the rate of formation of the gas and diffusing the resulting gas, as the conventional methods. The molding can therefore be performed for a very short period of time.

According to the method described above, the copolymer precursors homogeneously dispersed in the matrix polymers at the molecular level are converted to the aromatic heterocyclic copolymers as such, resulting in fine and homogeneous dispersion of the aromatic heterocyclic copolymers in the matrix polymers. Thus, the molecular composite materials having good mechanical characteristics are obtained.

Further, molecules of the reinforcing materials form the structure that needle-like materials are homogeneously dispersed or homogeneously dispersed in the mesh form, without occurrence of granular coagulation because of the restraint by the pressure of the molds in the ring-closing reaction.

In the composite material of the present invention, the aromatic heterocyclic copolymer or the reinforcing material is thus dispersed very finely and homogeneously in the matrix polymer as the needle-like material or the mesh structure formed by the needle-like material. In molding, therefore, the reinforcing material polymer does not coagulate, and large phase separation does not occur, thereby the composite material of the present invention has excellent mechanical characteristics.

The present invention will be described with reference to examples in more detail below, but the following examples are given to illustrate the present invention and are not intended to be limitations on the scope of the invention.

EXAMPLE 1

(1) Synthesis of Monomers

Fifty grams (0.357 mole) of 4,6-diaminoresorcin dihydrochloride represented by the following formula (11) was mixed with 123 ml (0.58 mole) of 1,1,1,3,3,3-hexamethyldisilazane in an argon atmosphere.

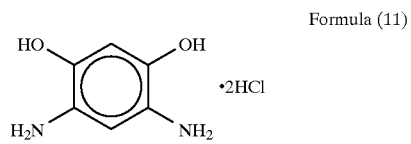

Formula (11)

The mixture was refluxed at 130° C. for 6 hours to conduct the reaction. Then, the reaction product was distilled under reduced pressure to obtain a distillate at an oil bath temperature of 200° C. to 210° C. at 10 Torr. Thus, monomer A represented by the following formula (12) was obtained. The yield was 60%.

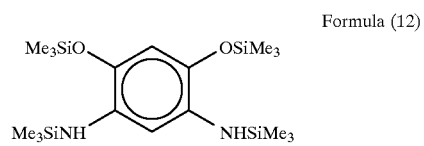

Formula (12)

With 50 ml (0.24 mole) of 1,1,1,3,3,3-hexamethyldisilazane, 14.6 g (0.05 mole) of 1,3-bis(m-aminophenoxy)-benzene represented by the following formula (13) was mixed in an argon atmosphere.

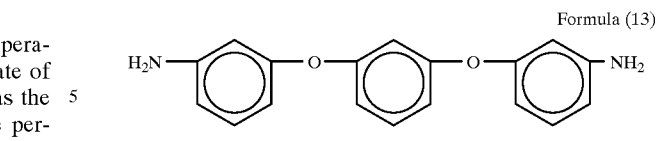

Formula (13)

The mixture was refluxed at 130° C. for 6 hours to conduct the reaction. Then, the reaction product was distilled under reduced pressure to obtain a distillate at an oil bath temperature of 200° C. at 10 Torr. Thus, monomer B represented by the following formula (14) was obtained. The yield was 65%.

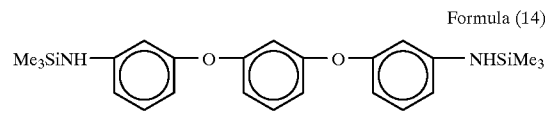

Formula (14)

(2) Synthesis of Oligomer (I) and Oligomer (II)

In 8 ml of N-methyl-2-pyrrolidone (hereinafter referred to as NMP), 5.24 g (8 mmoles) of monomer A obtained as described above was dissolved in a stream of argon. Then, 2.28 g (9.6 mmoles) of chloroterephthaloyl dichloride represented by the following formula (15) was added under ice cooling, followed by stirring for 30 minutes to obtain oligomer (I).

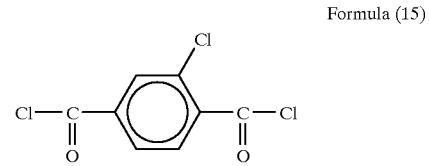

Formula (15)

In 17 ml of NMP, 3.51 g (12 mmoles) of monomer B obtained as described above was dissolved in a stream of argon. Then, 2.47 g (10.4 mmoles) of chloroterephthaloyl dichloride represented by formula (15) was added under ice cooling, followed by stirring for 30 minutes to obtain oligomer (II).

(3) Synthesis of PBZ-O Precursor

A solution of oligomer (II) was added to a solution of oligomer (I), followed by stirring at a temperature of OC to room temperature for 6 to 8 hours. The reaction solution was poured in ethanol to cause coagulation, and the resulting coagulum was dried under vacuum at 80° C. The yield was 99%. The intrinsic viscosity $\eta_{inh}$ of this polymer was 0.42. The intrinsic viscosity was measured at a polymer concentration in NMP of 0.5 g/dl by the Ubbelohde method.

(4) Ring-Closing Reaction of PBZ-O Precursor

Figure 8:
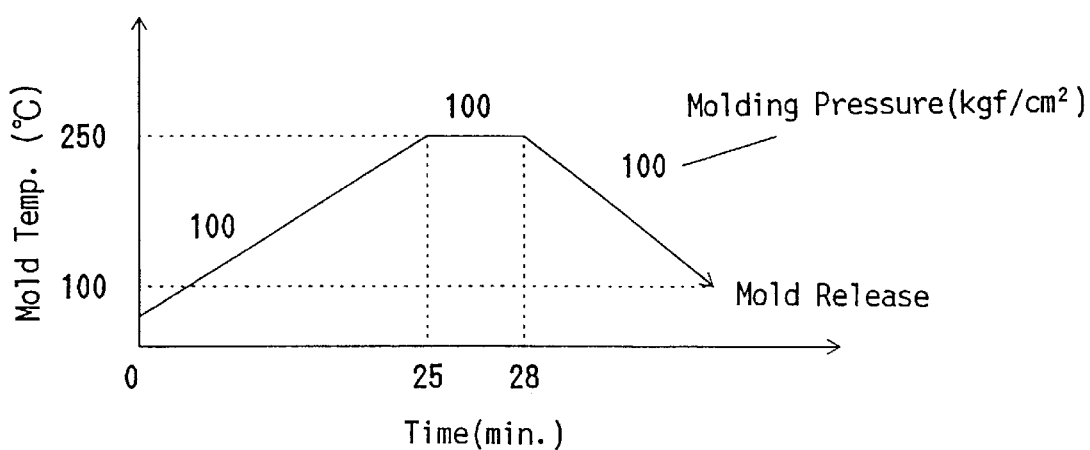
FIG. 8 is a graph showing a heating program used in Example 1.

The polymer was dissolved in NMP to give a concentration of 20% by weight, followed by stirring at room temperature for 1 week. The resulting solution was blown into ethanol with a spray to obtain a rapidly coagulated powder. This coagulated powder was stirred in a methanol/water (weight ratio: 1:1) mixed solution for 2 hours to conduct desilylation, followed by drying under vacuum at 100° C. The mold shown in FIG. 1 was filled with the resulting product, and molding was carried out at a pressure of 100 kgf/cm$^2$ by the mold hot pressing process to obtain a tabular formed article of 15 mm×15 mm×2t mm. The molding operation was conducted according to the heating program shown in FIG. 8.

The bending elasticity of the resulting formed article was 655 kgf/mm$^2$, and the strength thereof was 4.7 kgf/mm$^2$.

COMPARATIVE EXAMPLE 1

Equimolar amounts of 1,3-bis(m-aminophenoxy)benzene represented by formula (13) described above and chloroterephthaloyl dichloride represented by formula (15) described above were dissolved in NMP in a stream of argon to give a concentration of 1.6 moles/liter, followed by stirring at a temperature of 0° C. to room temperature for 6 hours to obtain a polyamide. The intrinsic viscosity ηinh of this polymer was 0.60. The intrinsic viscosity was measured at a polymer concentration in NMP of 0.5 g/dl by the Ubbelohde method.

Figure 9:
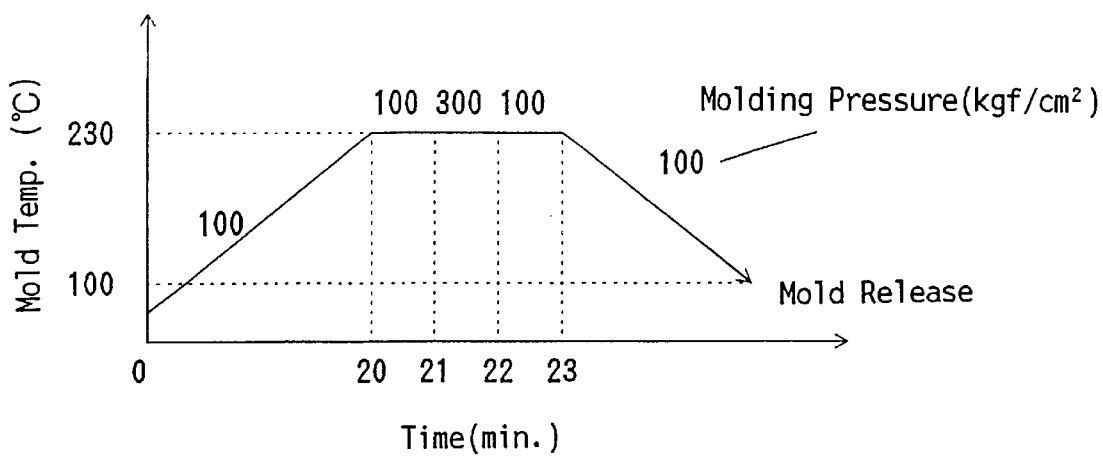
FIG. 9 is a graph showing a heating program used in Comparative Example 1.

This polymer was molded at a pressure of 100 kgf/cm² by the mold hot pressing process according to the heating program shown in FIG. 9 to obtain a tabular formed article of 50 mm×15 mm×2t mm.

The bending elasticity of the resulting formed article was 405 kgf/mm², and the strength thereof was 11.2 kgf/mm².

EXAMPLE 2

(1) Synthesis of Monomer

Ten grams (0.05 mole) of 3,4'-diaminodiphenyl ether represented by the following formula (16) was mixed with 50 ml (0.24 mole) of 1,1,1,3,3,3-hexamethyldisilazane in an argon atmosphere.

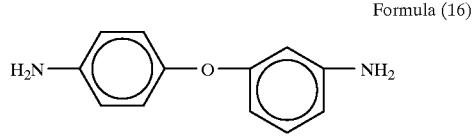

Formula (16)

The mixture was refluxed at 130° C. for 6 hours to conduct the reaction. Then, the reaction product was distilled under reduced pressure to obtain a distillate at an oil bath temperature of 200° C. at 10 Torr. Thus, monomer C represented by the following formula (17) was obtained. The yield was 70%.

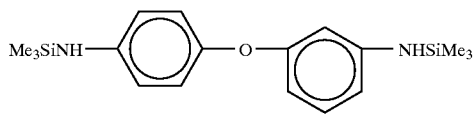

Formula (17)

(2) Synthesis of Aromatic Heterocyclic Random Copolymer Precursor

In 20 ml of NMP, 3.43 g (8 mmoles) of monomer A obtained in Example 1 and 3.51 g (12 mmoles) of monomer C obtained as described above were dissolved in a stream of argon. Then, 4.75 g (20 mmoles) of chloroterephthaloyl dichloride represented by formula (15) described above was added under ice cooling with stirring, followed by stirring at a temperature of 0° C. to room temperature for 6 hours to obtain a random copolymer.

The reaction solution was poured in ethanol to cause coagulation, and the resulting coagulum was refluxed in a methanol/water (weight ratio: 1:1) mixed solution for 2 hours to conduct desilylation. The resulting product was dried under vacuum at 100° C. The intrinsic viscosity η$_{inh}$ of this polymer was 0.82. The intrinsic viscosity was measured at a polymer concentration in NMP of 0.5 g/dl by the Ubbelohde method.

(3) Ring-Closing Reaction to Aromatic Heterocyclic Random Copolymer

The above-mentioned copolymer precursor was dissolved in DMSO to give a concentration of 20% by weight, and the resulting solution was cast on a glass plate. This was placed on a hot plate heated at 80° C. to evaporate the solvent, thereby obtaining an uniform film. This film was heat treated under vacuum at 350° C. for 30 minutes to cyclize the polyoxazole.

The tensile elasticity of the film thus obtained was 509 kgf/mm², and the strength thereof was 3.6 kgf/mm². On the other hand, the tensile elasticity of the film obtained from the copolymer precursor before ring closure of the polyoxazole, namely before heating, was 219 kgf/mm², and the strength thereof was 4.6 kgf/mm².

EXAMPLE 3

A PBZ-T block copolymer precursor represented by the following formula (18) was produced as show below.

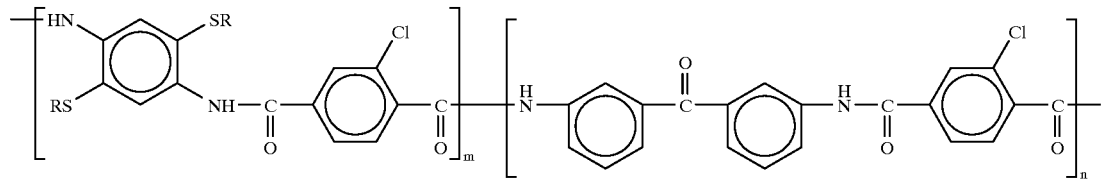

Formula (18)

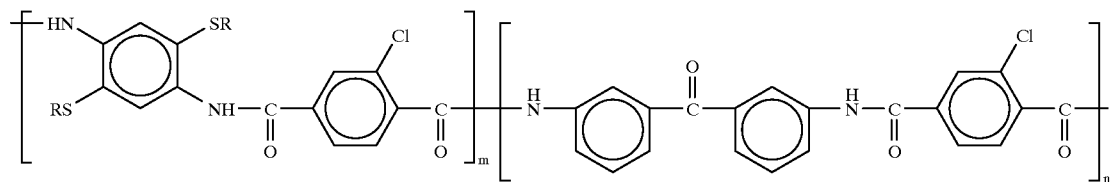

Formula (18)

R; C₂H₄CN

49

(1) Synthesis of Oligomer (I) (PBZ-T Precursor Block)

Eight milliliters of NMP was placed in a well-dried flask in a stream of dried argon, and 8 mmoles (2.227 g) of compound ($a_t$) represented by the following formula (19) was dissolved therein to prepare a homogeneous NMP solution.

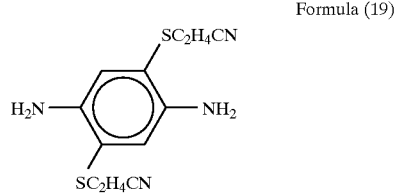

Formula (19)

To this solution cooled with ice together with the flask, 9.6 mmoles (2.2798 g) of 2-chloroterephthaloyl dichloride was added as compound (c), followed by stirring for 30 minutes to synthesize oligomer (I).

(2) Synthesis of Oligomer (II) (Matrix Block)

Concurrently with the above-mentioned synthesis of oligomer (I), 17 ml of NMP was placed in a well-dried flask in a stream of dried argon, and 12 mmoles (2.5470 g) of compound (b) represented by the following formula (20) was dissolved therein to prepare a homogeneous NMP solution.

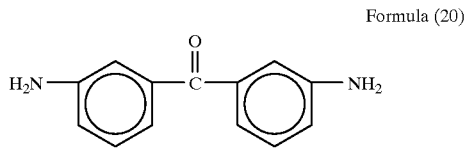

Formula (20)

To this solution cooled with ice together with the flask, 10.4 mmoles (2.4696 g) of 2-chloroterephthaloyl dichloride was added as compound (c), followed by stirring for 30 minutes to synthesize oligomer (II).

(3) Synthesis of PBZ-T Block Copolymer Precursor

The solution of oligomer (II) in NMP was added to the solution of oligomer (I) in NMP obtained by the above-mentioned procedure, followed by stirring at a temperature under ice cooling to room temperature.

The resulting solution was poured in a large amount of ethanol to coagulate the polymer. This procedure was conducted with stirring ethanol. After washing several times with ethanol, the resulting precipitate (polymer) was dried under vacuum at 120° C.

The intrinsic viscosity $\eta_{inh}$ of this polymer was 1.4. The intrinsic viscosity was measured at a polymer concentration in NMP of 0.5 g/dl at 30° C. by the Ubbelohde method.

In this polymer, the ratio of the degree of polymerization m of a moiety derived from oligomer (I) and exhibiting the rigidity to the degree of polymerization n of a moiety derived from oligomer (II), forming a matrix and exhibiting the flexibility in the entire molecule (m:n) was 14:6.

(4) Molding The coagulated polymer powder obtained as described above was dissolved in NMP to give a concentration of 25% by weight, and the mixture was stirred at a temperature of room temperature to 80 C. for 1 week to obtain a homogeneous solution. This solution was blown into ethanol with a spray to obtain a rapidly coagulated powder. This was filtered, and the resulting coagulated powder was dried under vacuum at 120° C.

Figure 10:
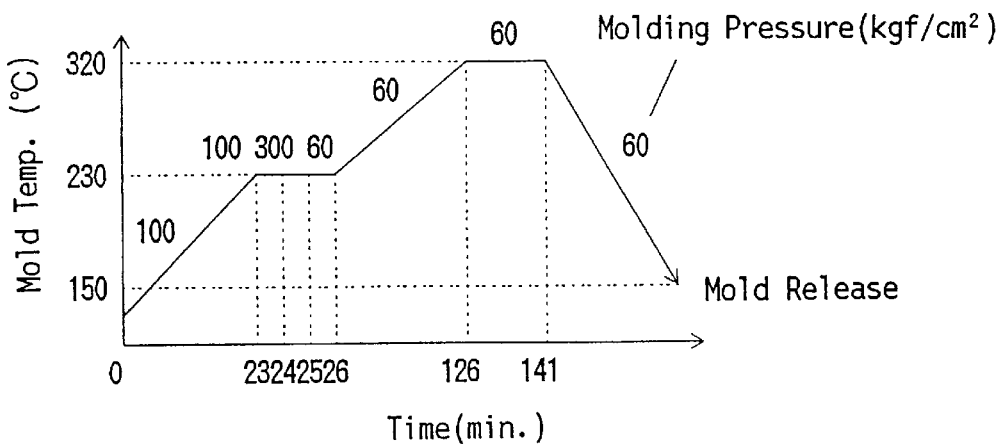
FIG. 10 is a graph showing a heating and pressurizing program in Example 3.

The mold shown in FIG. 2 was filled with the resulting coagulated polymer powder, and the mold hot pressing process was carried out at 230° C. Then, the temperature of the mold was elevated as such, and the PBZ-T block copolymer precursor was cyclized at 320° C. by internal mold heat treatment. Thus a test piece (T/P) of a tabular formed article of 15 mm×50 mm×2t mm was obtained. In this case, the mold was heated and pressurized according to a heating and pressurizing program shown in FIG. 10. Further, the heating was performed in a glove box in an argon atmosphere.

A transmission electron micrograph (ultrathin sectioning method, magnification: 14,000×) of the resulting formed article is shown in FIG. 11. This shows that a PBZ-T-rich phase uniformly exists as a continuous three-dimensional mesh phase in a base matrix. The average size of the meshes was 0.3 μm or less, and the average size of the PBZ-T continuous phase was about 60 nm.

The properties of the formed article are shown in Table 1, and the bending elasticity at high temperatures is shown in FIG. 12.

COMPARATIVE EXAMPLE 2

One hundred milliliters of NMP was placed in a well-dried flask in a stream of dried argon, and 94.2 mmoles (20.0 g) of compound (b) represented by formula (20) described above was dissolved therein to prepare a homogeneous NMP solution.

To this solution cooled with ice together with the flask, 94.2 mmoles (22.3762 g) of 2-chloroterephthaloyl dichloride was added as compound (c), followed by stirring at a temperature under ice cooling to room temperature to synthesize a polymer represented by the same structural formula as that of the matrix block in the block copolymer in Example 3.

The resulting solution was poured in a large amount of ethanol to coagulate the polymer. This procedure was conducted with stirring ethanol. After washing several times with ethanol, the resulting precipitate (polymer) was dried under vacuum at 120° C.

Figure 13:
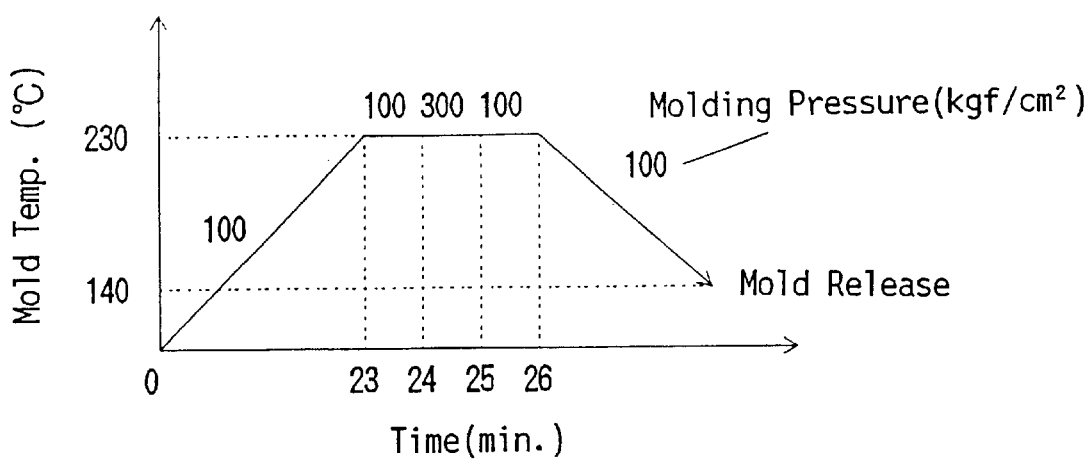
FIG. 13 is a graph showing a heating and pressurizing program in Comparative Example 2.

The mold shown in FIG. 1 was filled with the resulting coagulated polymer powder, and the mold hot pressing process was carried out to obtain a test piece (T/P) of a tabular formed article of 15 mm×50 mm×2t mm. In this case, the mold was heated and pressurized according to a heating and pressurizing program shown in FIG. 13.

The properties of the formed article are shown in Table 1, and the bending elasticity at high temperatures is shown in FIG. 12. The results reveal that the formed article obtained in Example 3 is minimized in reductions in properties at high temperatures, compared with the formed article obtained in Comparative Example 2.

TABLE 1

| | Example 3 | Comparative Example 2 |
|---|---|---|
| Bending Elasticity (JIS K7203) (kgf/mm²) | 974 | 541 |
| Specific Gravity (JIS K7112) (g/cm³) | 1.37 | 1.35 |
| Thermal Decomposition Temperature (JIS K7120) in $N_2$ (° C.) | >400 | >400 |
| Coefficient of Linear Expansion (JIS K7197) 1/K; 130° C. | $2.6 \times 10^{-5}$ | — |
| Vicat Softening Point (JIS K7206) | Not observed | 217° C. |

EXAMPLE 4

A PBZ-T block copolymer precursor represented by the following formula (21) was synthesized in the same manner as with Example 3 with the exception that 3.5082 g of a diamine represented by formula (13) described above is used as compound (b) to synthesize oligomer (II).

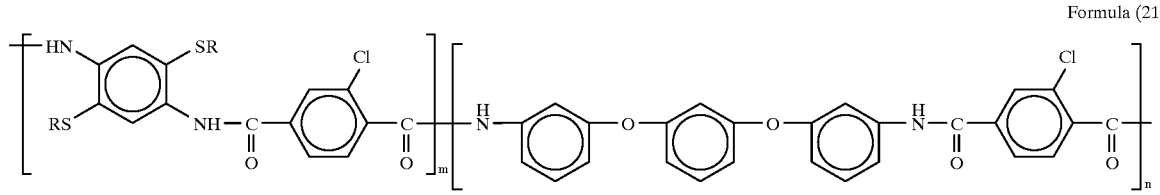

Formula (21)

After termination of the reaction, the reaction solution was adjusted to give a concentration of 25% by weight, and this solution was blown into a large amount of ethanol with a spray to obtain a rapidly coagulated powder. This was filtered, and the resulting coagulated powder was dried under vacuum at 120° C. concentration in NMP of 0.5 g/dl at 30° C. by the Ubbelohde method.

In this polymer, the ratio of the degree of polymerization m of a moiety derived from oligomer (I) and exhibiting the rigidity to the degree of polymerization n of a moiety derived from oligomer (II), forming a matrix and exhibiting the flexibility in the entire molecule (m:n) was 4:6.

Figure 14:
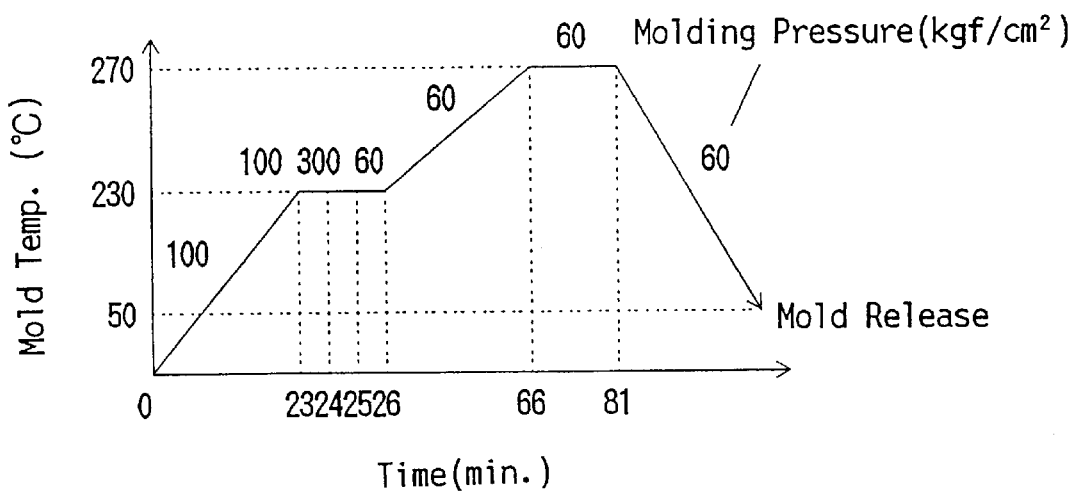
FIG. 14 is a graph showing a heating and pressurizing program in Example 4.

The mold was filled with the coagulated polymer powder thus obtained, and the powder was molded in the same manner as with Example 3 with the exception that the mold was heated and pressurized according to a program shown in FIG. 14.

The properties of the formed article are shown in Table 2.

COMPARATIVE EXAMPLE 3

Sixty milliliters of NMP was placed in a well-dried flask in a stream of dried argon, and 40 mmoles (11.6935 g) of compound (b) represented by formula (13) described above was dissolved therein to prepare a homogeneous NMP solution.

To this solution cooled with ice together with the flask, 40 mmoles (9.4988 g) of 2-chloroterephthaloyl dichloride was added as compound (c), followed by stirring at a temperature under ice cooling to room temperature to synthesize a polymer represented by the same structural formula as that of the matrix block in the block copolymer in Example 4.

The resulting solution was poured in a large amount of ethanol to coagulate the polymer. This procedure was conducted with stirring ethanol. After washing several times with ethanol, the resulting precipitate (polymer) was dried under vacuum at 120° C.

The resulting coagulated polymer powder was molded by the mold hot pressing process in the same manner as with Comparative Example 2 to obtain a test piece (T/P) of a tabular formed article of 15 mm×50 mm×2t mm. The properties of the formed article are shown in Table 2.

TABLE 2

| | Example 4 | Comparative Example 3 |
|---|---|---|
| Bending Elasticity (JIS K7203) (kgf/mm²) | 768 | 477 |
| Specific Gravity (JIS K7112) (g/cm³) | 1.38 | 1.27 |
| Thermal Decomposition Temperature (JIS K7120) in N₂ (° C.) | >400 | >400 |
| Rockwell Hardness (JIS K7202) | HRL 125 | HRL 120 |
| Vicat Softening Point (JIS K7206) | Not observed | 147° C. |

EXAMPLE 5

(1) Synthesis of PBZ-T Random Copolymer Precursor

Eight millimoles of compound ($a_t$) represented by formula (19) described above and 2 mmoles of compound (b) represented by formula (16) were dissolved in 15 ml of NMP in an argon atmosphere to prepare a homogeneous solution. To this solution cooled with ice together with the flask, 10 mmoles of 2-chloroterephthaloyl dichloride was added as compound (c). The temperature of the solution was gradually elevated to room temperature with stirring. Then, the reaction was further continued for 6 hours while maintaining the temperature at room temperature. The resulting emerald green solution was poured in a large amount of methanol. This procedure was conducted with stirring methanol.

Stirring was continued for 30 minutes, followed by filtration. Then, reflux with a water-methanol solution was conducted overnight to remove the solvent. The resulting polymer was dried under vacuum at 100° C. for 24 hours. The yield was 99.8%. The intrinsic viscosity $\eta_{inh}$ of this polymer was 1.4. The intrinsic viscosity was measured at a polymer concentration in NMP of 0.5 g/dl at 30° C. by the Ubbelohde method. The structure of the resulting random copolymer precursor is deduced to be as the following formula (22):

Formula (22)

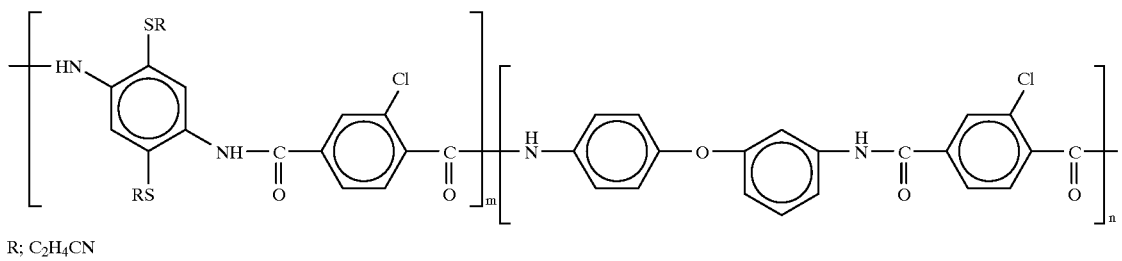

R; C$_2$H$_4$CN wherein m:n is 8:2.

(2) Production of Molecular Composite Material

In 160 ml of NMP, 18.35 g of the random copolymer precursor obtained as described above and 21.64 g of the aromatic polyamide represented by the following formula (23) (TX-1 manufactured by Toray Industries, Inc.) were dissolved, and stirred at a temperature of room temperature to 80° C. for 1 week to obtain a homogeneous brown solution.

Formula (23)

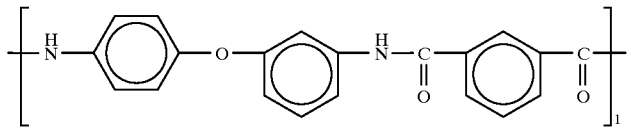

This solution was sprayed in a large amount of ethanol to obtain a coagulated composite powder composed of the random copolymer precursor and the aromatic polyamide. This was filtered, and the resulting coagulated powder was dried under vacuum at 100° C.

The powder dried under vacuum was heat treated under vacuum at 330° C. for 30 minutes to cyclize the random copolymer precursor, thus obtaining a PBZ-T copolymer. The content of PBZ-T was 30% by weight.

The mold shown in FIG. 1 was filled with the composite material thus obtained, and the mold hot pressing process was carried out to obtain a test piece (T/P) of a formed article of 15 mm×50 mm×2t mm. A heating program of the mold used in this case is shown in FIG. 15. The pressure was 100 kgf/cm$^2$.

For the bending properties of the resulting formed article, the elasticity was 644 kgf/mm$^2$, and the strength was 6.8 kgf/mm$^2$. Further, a transmission electron micrograph (ultrathin sectioning method) of the resulting formed article is shown in FIG. 16.

This micrograph shows that the formed article comprises two phases, island-like portions and a sea-like portion containing them, and that particles having a maximum size of 10 to 50 nm are homogeneously dispersed in the sea-like portion.

Figure 17:
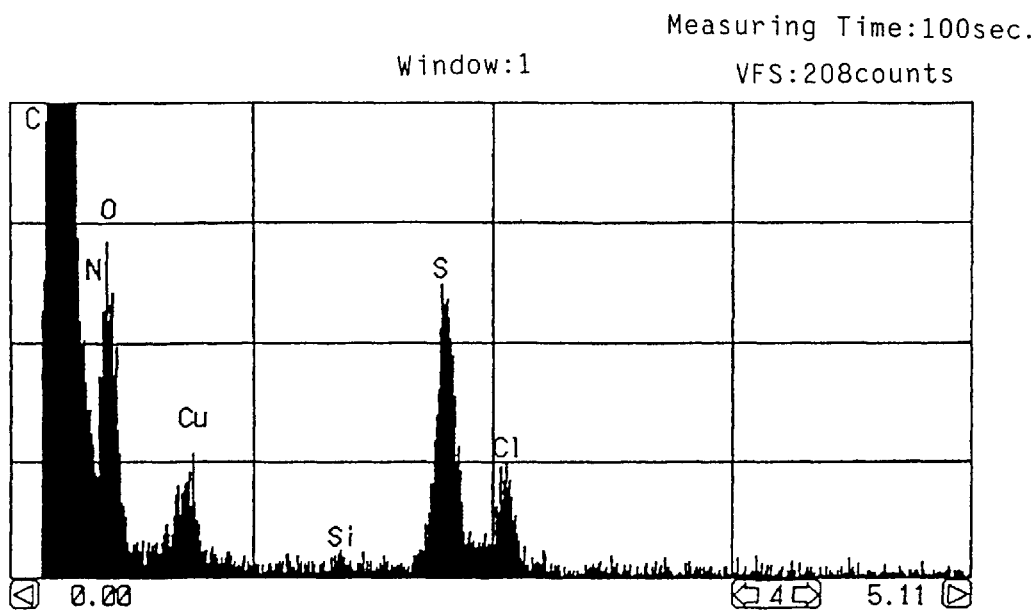
FIG. 17 is an EDX spectrum of a sea-like portion of a formed article obtained in Example 5.
Figure 18:
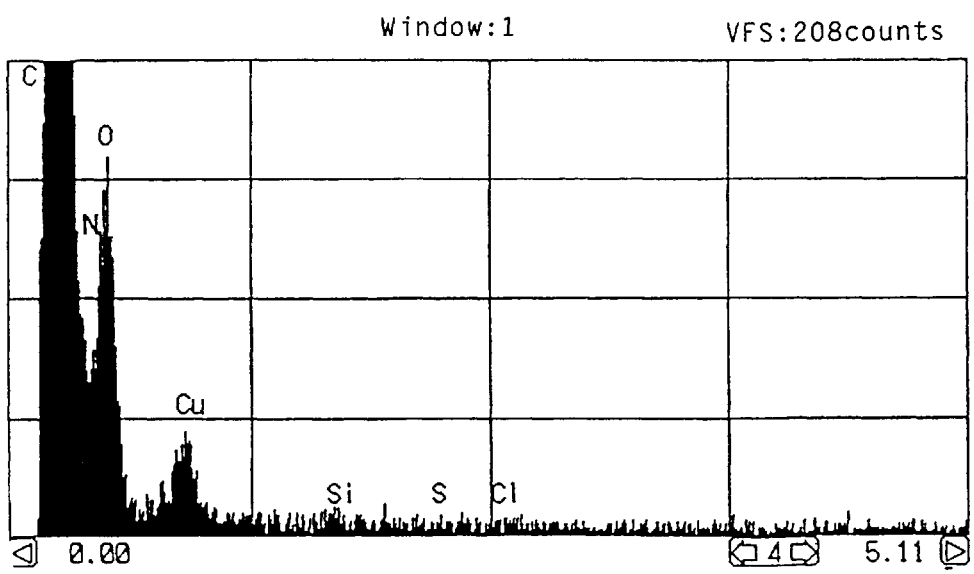
FIG. 18 is an EDX spectrum of an island-like portion of the formed article obtained in Example 5.

FIG. 4 is a schematic view of this micrograph. EDX spectra of the sea-like and island-like portions of this drawing was taken, and are shown in FIGS. 17 and 18, respectively. The sea-like portion contains S and Cl, but the island-like portion does not contain them, which reveals that the sea-like portion is a polybenzothiazole-rich phase and the island-like portion is a matrix-rich phase.

As described above, the composite material of the present invention is a two-phase composite material comprising the matrix-rich phase as an island component and the reinforcing polymer-rich phase as a sea component, and the reinforcing material is homogeneously dispersed as fine particles in the reinforcing polymer-rich phase.

COMPARATIVE EXAMPLE 4

Figure 19:
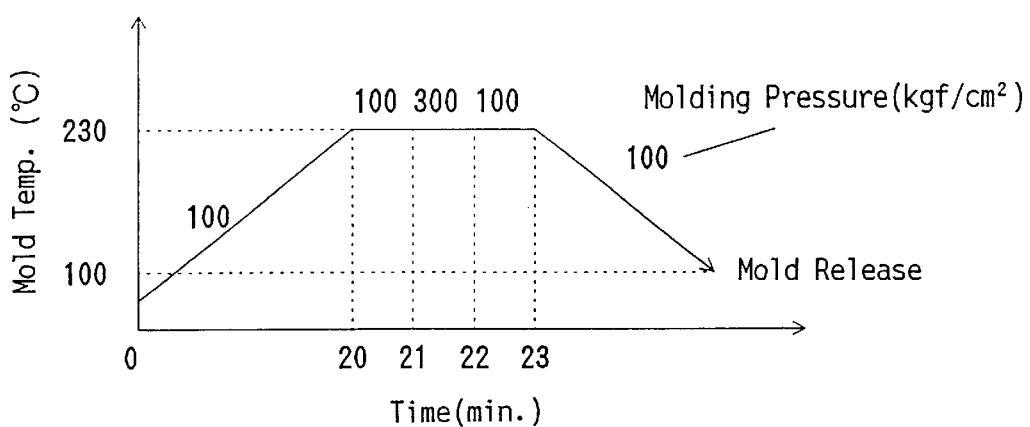
FIG. 19 is a graph showing a heating program in Comparative Example 4.

Only the matrix polymer used in Example 5 was molded at 100 kgf/cm$^2$ by the mold hot pressing process to obtain a test piece (T/P) of a formed article of 50 mm×15 mm×2t mm. A heating program of the mold used in this case is shown in FIG. 19.

For the bending properties of the resulting formed article, the elasticity was 479 kgf/mm$^2$, and the strength was 20.4 kgf/mm$^2$.

The properties of the formed article obtained in Example 5 are shown in Table 3, in comparison with those of the formed article obtained in Comparative Example 4.

TABLE 3

| | Example 5 | Comparative Example 4 |
|---|---|---|
| Bending Elasticity (JIS K7203) (kgf/mm$^2$) | 644 | 479 |
| Specific Gravity (JIS K7112) (g/cm$^3$) | 1.37 | 1.29 |
| Izod Impact Value (JIS K7113) (KJ/m$^2$) | 5.0 | 2.4 |
| Rockwell Hardness (M Scale) | 122.0 | 112.3 |
| Thermal Decomposition Temperature (JIS K7120) in N$_2$ (° C.) | >400 | >400 |
| Coefficient of Linear Expansion (JIS K7197); 130° C. | 3.89 × 10$^{-5}$ | 6.16 × 10$^{-5}$ |
| 170° C. | 3.88 × 10$^{-5}$ | |

In Table 3, the Izod impact value was measured without a notch at room temperature.

Figure 20:
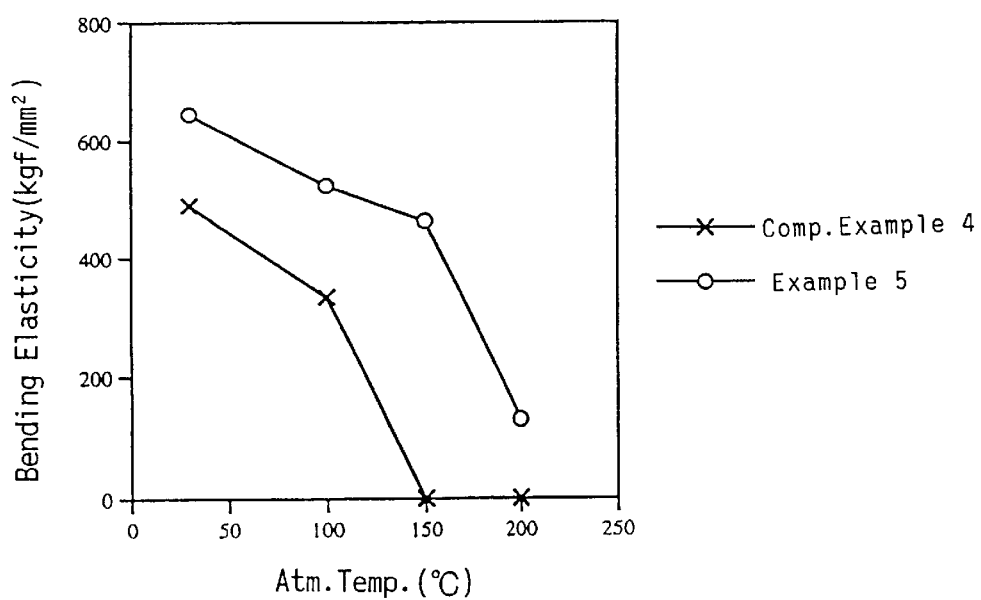
FIG. 20 is a graph showing the relationship between the bending elasticity and the temperature of formed articles obtained in Example 5 and Comparative Example 4.

For the formed articles obtained in Example 5 and Comparative Example 4, the bending elasticity at high temperatures is shown in FIG. 20.

The above results show that fine compounding significantly improves the rigidity, the impact resistance, the hardness and the properties at high temperatures, and reduces the thermal expansion, even when the reinforcing components are added in small amounts.

EXAMPLE 6

A formed article was obtained in the same manner as with Example 5 with the exception that the mixing ratio of the random copolymer precursor to the matrix polymer was changed to give final PBZ-T contents ranging from 6% to 50% by weight, and the bending elasticity of these formed articles was measured. The relationship between the PBZ-T content and the bending elasticity is shown in FIG. 21.

EXAMPLES 7 TO 12

A random copolymer precursor was obtained in the same manner as with Example 5 with the exception that m is changed to 6 and n is changed to 4. The intrinsic viscosity $\eta_{inh}$ of this polymer was 1.2. The intrinsic viscosity was measured at a polymer concentration in NMP of 0.5 g/dl at 30° C. by the Ubbelohde method.

In amounts shown in Table 4 of NMP, 6.5 g of the random copolymer precursor thus obtained and 4.34 g of the same matrix polymer as used in Example 5 were dissolved, and formed articles were obtained in the same manner as with Example 5. The PBZ-T content of all the formed articles was 30% by weight.

TABLE 4

| Example | 7 | 8 | 9 | 10 | 11 | 12 |
|---|---|---|---|---|---|---|
| Amount of NMP (ml) | 216 | 105 | 72 | 54 | 43 | 36 |

The bending properties of these formed articles, as well as the results of Comparative Example 4, are shown in Table 5. Further, the relationship between the concentration of the polymer solutions and the bending elasticity is shown in FIG. 22.

TABLE 5

|  | Bending Elasticity (kgf/mm$^2$) | Bending Strength (kgf/mm$^2$) |
|---|---|---|
| Example 7 | 683 | 9.2 |
| Example 8 | 706 | 5.6 |
| Example 9 | 603 | 14.4 |
| Example 10 | 604 | 18.4 |
| Example 11 | 610 | 10.6 |
| Example 12 | 623 | 12.6 |
| Comparative Example 4 | 425 | 9.6 |

EXAMPLES 13 TO 17

A block polymer precursor represented by the same structural formula as that of the copolymer precursor in Example 5 was produced in the following manner.

(1) Synthesis of Oligomer (I) and Oligomer (II)

Five milliliters of NMP was placed in a well-dried 50-ml flask in a stream of dried argon, and 8 mmoles (2.227 g) of compound (a$_t$) represented by formula (19) described above was dissolved therein to prepare a homogeneous NMP solution.

To this solution cooled with ice together with the flask, 8.2 mmoles (1.947 g) of 2-chloroterephthaloyl dichloride was further added as compound (c), followed by stirring for 5 minutes to synthesize oligomer (I).

Concurrently with the above-mentioned synthesis of oligomer (I), 10 ml of NMP was placed in a well-dried 50-ml flask in a stream of dried argon, and 2 mmoles (0.4004 g) of compound (b) represented by formula (16) was dissolved therein to prepare a homogeneous NMP solution.

To this solution cooled with ice together with the flask, 1.8 mmoles (0.427 g) of 2-chloroterephthaloyl dichloride was further added as compound (c), followed by stirring for 5 minutes to synthesize oligomer (II).

(2) Synthesis of PBZ-T Block Copolymer Precursor

The solution of oligomer (I) in NMP obtained by the above-mentioned procedure was added to the solution of oligomer (II) in NMP. Thereafter, the flask used for the solution of oligomer (I) in NMP was further washed with 2 ml of NMP, and the washings were also added the solution of oligomer (II) in NMP.

The mixed polymer solution was stirred for 1 hour under ice cooling, and the temperature thereof was elevated to room temperature with stirring. Then, stirring was further continued while maintaining the temperature of the solution at room temperature.

The resulting solution was poured in a large amount of methanol. This procedure was conducted with stirring methanol.

This methanol solution was filtered, and the resulting precipitated (polymer) was dried under vacuum at 100° C. for 24 hours. The yield was 99.8%.

The intrinsic viscosity $\eta_{inh}$ of this polymer was 1.2. The intrinsic viscosity was measured at a polymer concentration in NMP of 0.5 g/dl at 30° C. by the Ubbelohde method.

In this polymer, the ratio of the degree of polymerization m of a moiety derived from oligomer (I) and exhibiting the rigidity to the degree of polymerization n of a moiety derived from oligomer (II) and exhibiting the flexibility in the entire molecule (m:n) was 8:2.

(3) Production of Molecular Composite Material

Five grams of the block copolymer precursor obtained by the above-mentioned method and 5.71 g of the same matrix polymer as used in Example 5 were dissolved in amounts shown in Table 6 of NMP, and formed articles were obtained in the same manner as with Example 5. The PBZ-T content of all the formed articles was 30% by weight.

TABLE 6

| Example | 13 | 14 | 15 | 16 | 17 |
|---|---|---|---|---|---|
| Amount of NMP (ml) | 214 | 107 | 72 | 54 | 43 |

Figure 23:
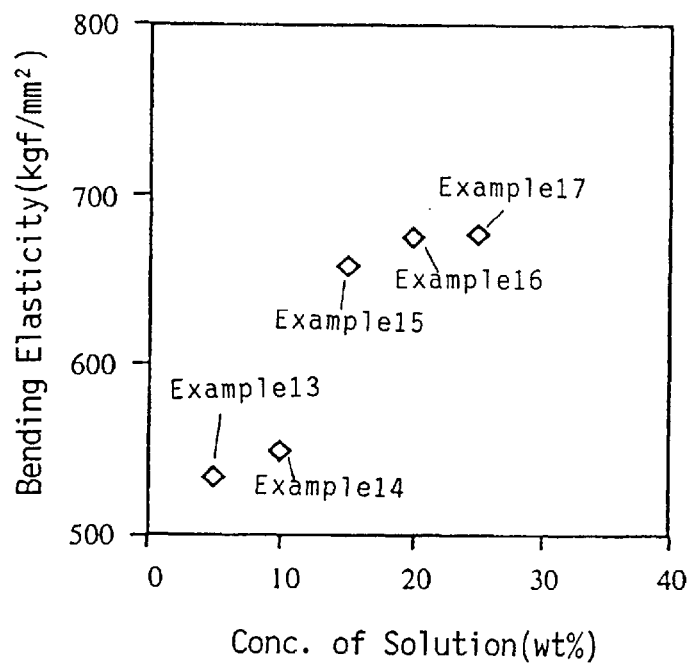
FIG. 23 is a graph showing the relationship between the solution concentration and the bending elasticity in Examples 13 to 17.

The bending properties of the formed articles, as well as the results of Comparative Example 4, are shown in Table 7. Further, the relationship between the concentration of the polymer solutions and the bending elasticity is shown in FIG. 23.

TABLE 7

|  | Bending Elasticity (kgf/mm$^2$) | Bending Strength (kgf/mm$^2$) |
|---|---|---|
| Example 13 | 534 | 7.6 |
| Example 14 | 548 | 6.7 |
| Example 15 | 657 | 6.9 |
| Example 16 | 674 | 7.5 |
| Example 17 | 676 | 6.5 |
| Comparative Example 4 | 425 | 9.6 |

EXAMPLES 18 AND 19

A random copolymer precursor was obtained in the same manner as with Example 5 with the exception that isophthaloyl dichloride was used as compound (c). The intrinsic viscosity $\eta_{inh}$ of this polymer was 1.4. The intrinsic viscosity was measured at a polymer concentration in NMP of 0.5 g/dl at 30° C. by the Ubbelohde method. The structure of the resulting random copolymer precursor is deduced to be as the following formula (24):

at a polymer concentration in NMP of 0.5 g/dl at 30° C. by the Ubbelohde method. The structure of the resulting random copolymer precursor is deduced to be as formula (21) described above. In this polymer, m:n is 8:2.

Forty millimoles of the above-mentioned compound represented by formula (13) was dissolved in 60 ml of NMP to Formula (24)

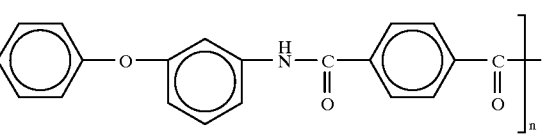

R; $C_2H_4CN$

The resulting random copolymer precursor and the same matrix polymer as used in Example 5 were dissolved in amounts shown in Table 8 in 400 ml of NMP, and formed articles were obtained in the same manner as with Example 5. The PBZ-T content of these formed articles is shown in Table 8.

TABLE 8

|  | Amount of Copolymer Precursor (g) | Amount of Matrix (g) | Amount of PBZ-T (wt %) |
|---|---|---|---|
| Example 18 | 3.69 | 7.38 | 20 |
| Example 19 | 5.53 | 6.07 | 30 | prepare a homogeneous NMP solution. To this solution cooled with ice together with the flask, 40 mmoles of 2-chloroterephthaloyl dichloride was added, followed by stirring for 12 hours to synthesize a matrix polymer. The intrinsic viscosity $\eta_{inh}$ of this polymer was 0.55. The intrinsic viscosity was measured at a polymer concentration in NMP of 0.5 g/dl at 30° C. by the Ubbelohde method. The structure of the resulting polymer is deduced to be as the following formula (25):

Formula (25)

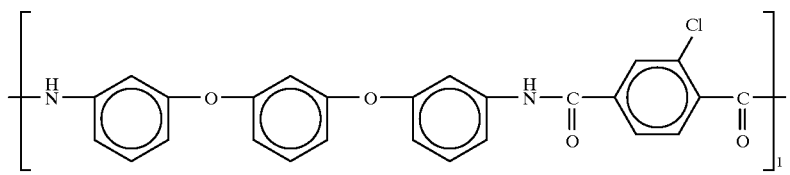

Figure 24:
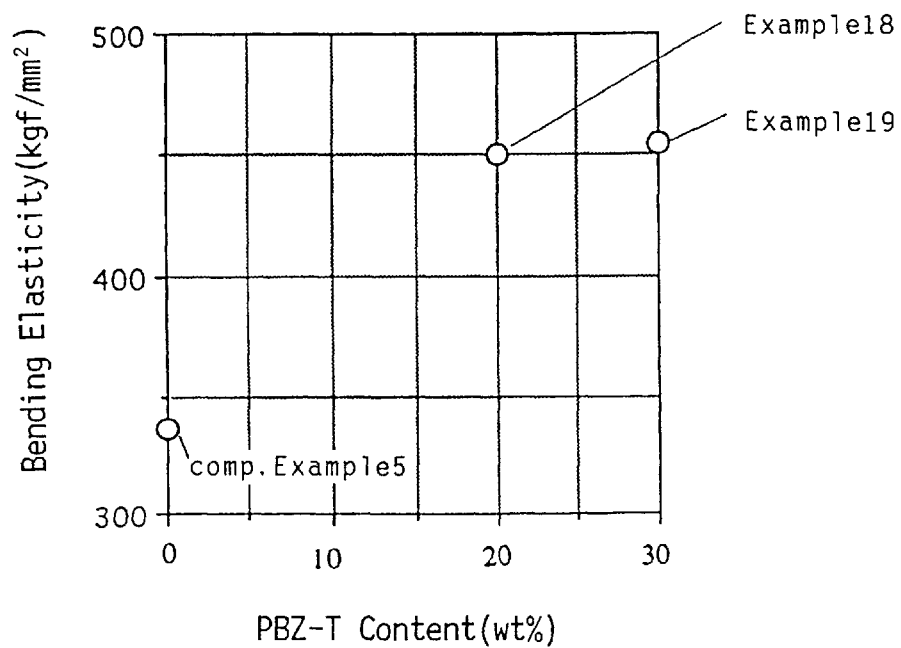
FIG. 24 is a graph showing the relationship between the FBT content and the bending elasticity in Examples 18 and 19.

The bending properties of the formed articles, as well as the results of Comparative Example 4, are shown in Table 9. Further, the relationship between the PBZ-T content and the bending elasticity is shown in FIG. 24.

TABLE 9

|  | Bending Elasticity (kgf/mm²) | Bending Strength (kgf/mm²) |
|---|---|---|
| Example 18 | 450 | 6.9 |
| Example 19 | 454 | 4.5 |
| Comparative Example 4 | 425 | 9.6 |

EXAMPLES 20 TO 22 AND COMPARATIVE EXAMPLE 5

A random copolymer precursor was obtained in the same manner as with Example 5 with the exception that the above-mentioned compound represented by formula (13) was used as compound (b). The intrinsic viscosity $\eta_{inh}$ of this polymer was 0.88. The intrinsic viscosity was measured The random copolymer precursor and the matrix polymer obtained by the above-mentioned methods were dissolved in amounts shown in Table 10 in 400 ml of NMP, and formed articles were obtained in the same manner as with Example 5. The PBZ-T content of these formed articles is shown in Table 10.

TABLE 10

|  | Amount of Copolymer Precursor (g) | Amount of Matrix (g) | Amount of PBZ-T (wt %) |
|---|---|---|---|
| Example 20 | 3.70 | 7.24 | 20 |
| Example 21 | 5.56 | 5.86 | 30 |
| Example 22 | 7.41 | 4.48 | 40 |

Figure 25:
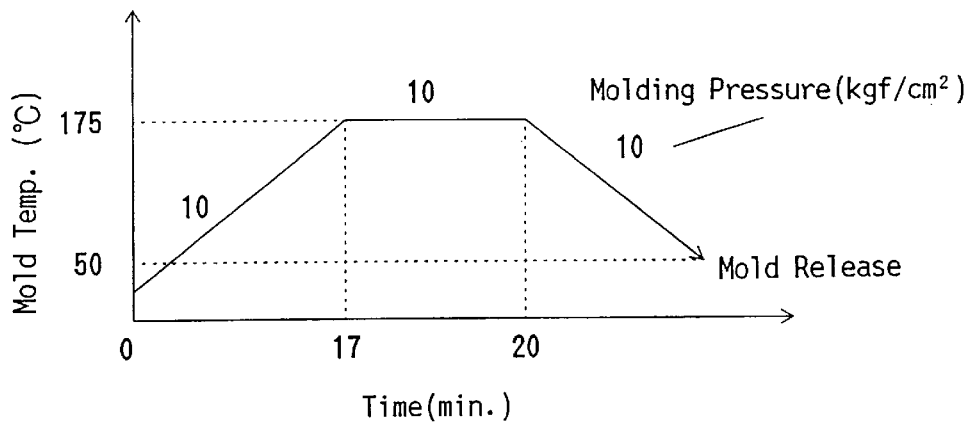
FIG. 25 is a graph showing a heating program in Comparative Example 5.
Figure 26:
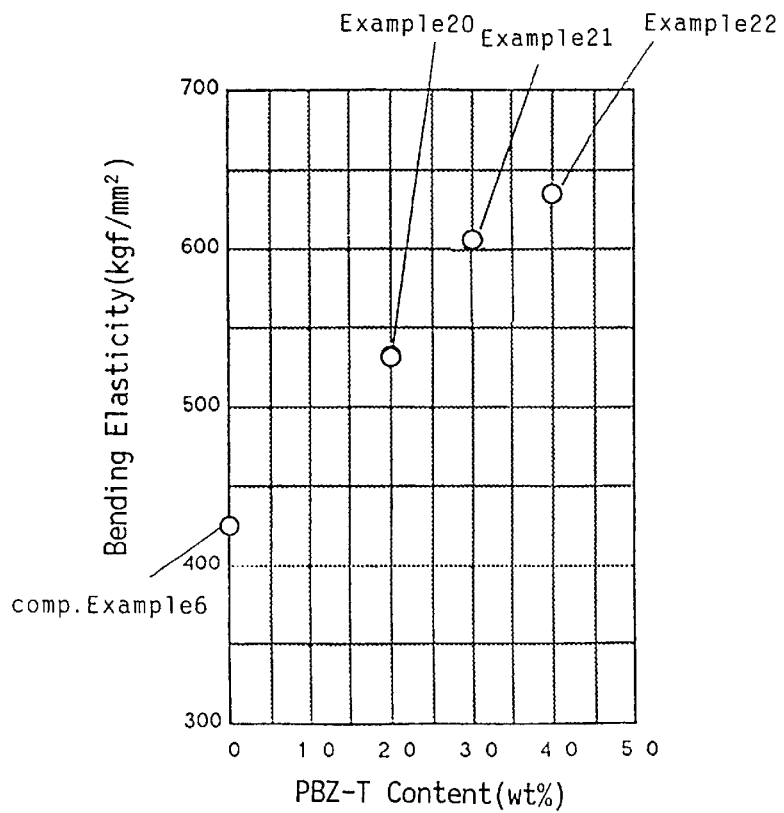
FIG. 26 is a graph showing the relationship between the PBT content and the bending elasticity in Examples 20 to 22.

As Comparative Example 5, only the matrix polymer was molded. In this case, the mold was heated according to a heating program shown in FIG. 25. The pressure was 10 kgf/cm². The bending properties of these formed articles are shown in Table 11. Further, the relationship between the PBZ-T content and the elasticity is shown in FIG. 26.

TABLE 11

| | Bending Elasticity (kgf/mm²) | Bending Strength (kgf/mm²) |
|---|---|---|
| Example 20 | 532 | 5.7 |
| Example 21 | 605 | 5.6 |
| Example 22 | 634 | 6.0 |
| Comparative Example 5 | 425 | 9.6 |

EXAMPLE 23

(1) Synthesis of Monomers

Fifty grams (0.357 mole) of 4,6-diaminoresorcin dihydrochloride represented by formula (11) described above was mixed with 123 ml (0.58 mole) of 1,1,1,3,3,3-hexamethyldisilazane in an argon atmosphere.

The mixture was refluxed at 130° C. for 6 hours to conduct the reaction. Then, the reaction product was distilled under reduced pressure to obtain a distillate at an oil bath temperature of 200° C. to 210° C. at 10 Torr. Thus, monomer A represented by formula (12) described above was obtained. The yield was 60%. In formula (12), Me represents a methyl group.

Ten grams (0.05 mole) of compound (b) represented by formula (16) described above was mixed with 50 ml (0.24 mole) of 1,1,1,3,3,3-hexamethyldisilazane in an argon atmosphere. The mixture was refluxed at 130° C. for 6 hours to conduct the reaction. Then, the reaction product was distilled under reduced pressure to obtain a distillate at an oil bath temperature of 200° C. at 10 Torr. Thus, monomer B represented by formula (17) described above was obtained. The yield was 70%. In formula (17), Me represents a methyl group.

(2) Synthesis of PBZ-O Random Copolymer Precursor

Sixteen millimoles of monomer A and 4 mmoles of monomer B obtained as described above were dissolved in 20 ml of NMP in an argon atmosphere. Then, 20 mmoles of 2-chloroterephthaloyl dichloride was added thereto with stirring under ice cooling, followed by stirring at a temperature of 0° C. to room temperature for 6 hours. The solvent was removed under reduced pressure at 80° C. to obtain a random copolymer precursor represented by the following formula (26). The intrinsic viscosity $\eta_{inh}$ of this polymer was 0.98. The intrinsic viscosity was measured at a polymer concentration in NMP of 0.5 g/dl at 30° C. by the Ubbelohde method. In this polymer, m:n is 8:2.

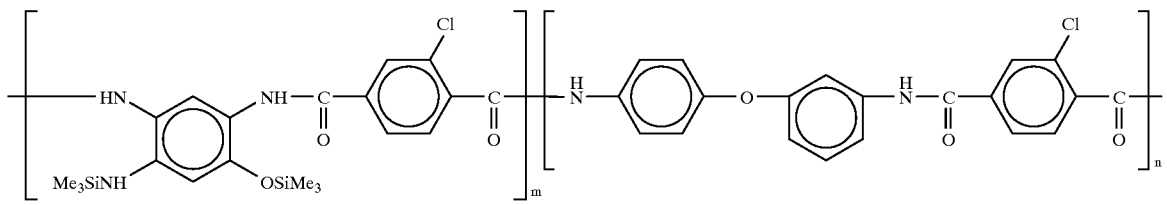

Formula (26)

Then, 5.56 g of the PBZ-O random copolymer precursor thus obtained and 6.14 g of the same matrix polymer as used in Example 5 were dissolved in 46.8 ml of NMP, followed by stirring at room temperature for 1 week. Thereafter, this solution was blown into a large amount of ethanol with a spray to obtain a rapidly coagulated powder. The coagulated powder was refluxed in a methanol/water (1:1) mixed solution for 2 hours to conduct desilylation. The resulting product was dried under vacuum at 100° C.

The structural formula of the resulting polymer after desilylation is represented by the following formula (27):

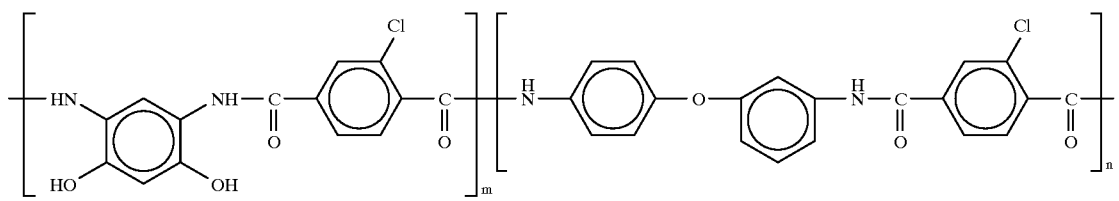

Formula (27)

The desilylated coagulated powder was heat treated under vacuum at 350° C. for 30 minutes to conduct the ring-closing reaction, thereby obtaining a PBZ-O copolymer.

A formed article of 50 mm×15 mm×2t mm was obtained by the mold hot pressing process in the same manner as with Example 5. For the bending properties of the formed article, the elasticity was 604 kgf/mm², and the strength was 2.5 kgf/mm².

EXAMPLE 24

The solution of the random copolymer precursor and the matrix polymer obtained in Example 23 was poured in the fiber form in a large amount of ethanol to cause coagulation, thereby obtaining a fibrous composite coagulum composed of the random copolymer precursor and the matrix polymer. The resulting fibrous coagulum was dried under vacuum at 100° C.

The fibrous coagulum dried under vacuum was heat treated while keeping the length thereof constant by clamping both ends thereof to cyclize the random copolymer precursor. A heating program used in this case is shown in FIG. 27.

The heat-treated fibrous material was cut to 0.5 to 5 mm, and placed in the mold shown in FIG. 1. Then, molding was carried out by the mold hot pressing process to obtain a tabular formed article of 15 mm×50 mm×2t mm. A heating program of the mold used in this case is shown in FIG. 28. The molding was conducted in an argon atmosphere. The bending properties of the formed article are shown in Table 12.

Further, a transmission electron micrograph (ultrathin sectioning method) of the formed article is shown in FIG. 29. The micrograph shows that the formed article has a structure in which a PBZ-T copolymer-rich phase is distributed in the matrix polymer in the three-dimensional mesh form, and the FBT-Z copolymer is also dispersed in the PBZ-T copolymer-rich phase as fine particles. The average size of the meshes was 0.5 $\mu$m or less, and the average size of the PBZ-T copolymer particles is about 50 nm.

EXAMPLE 25

A fibrous coagulum of the matrix polymer and the random copolymer precursor was obtained in the same manner as with Example 24, and dried under vacuum. The length of this fibrous coagulum was kept constant during temperature elevation to 250° C., and the fibrous material was drawn at a draw ratio of 1.5 during further temperature elevation to 330° C., followed by heat treatment while keeping the length thereof constant at 330° C. for 30 minutes. A heating program used in this case is shown in FIG. 30.

The heat-treated fibrous material was cut to 0.5 to 5 mm, and placed in the mold shown in FIG. 1. Then, molding was carried out by the mold hot pressing process to obtain a tabular formed article of 15 mm×50 mm×2t mm. A heating program of the mold used in this case is shown in FIG. 31. The molding was conducted in an argon atmosphere. The bending properties of the formed article are shown in Table 12.

COMPARATIVE EXAMPLE 6

Only the matrix polymer used in Example 24 was molded by the mold hot pressing process to obtain a formed article of 50 mm×15 mm×2t mm. A heating program is shown in FIG. 32. The bending properties of the formed article are shown in Table 12.

TABLE 12

|  | Bending Elasticity (kgf/mm$^2$) | Bending Strength (kgf/mm$^2$) |
| --- | --- | --- |
| Example 24 | 633 | 5.9 |
| Example 25 | 760 | 6.0 |
| Comparative Example 6 | 479 | 20.4 |

EXAMPLES 26 TO 28

The random copolymer precursor obtained in Example 24 described above and the aromatic polyamide represented by formula (23) described above as the matrix polymer were dissolved in specified amounts shown in Table 13 in 160 ml of NMP, followed by stirring at a temperature of room temperature to 80° C. for 1 week to obtaining homogeneous brown solutions.

Each of the solutions was sprayed in a large amount of ethanol to obtain a coagulated composite powder composed of the random copolymer precursor and the aromatic polyamide. This was filtered, and the resulting coagulated powder was dried under vacuum at 100° C.

Figure 33:
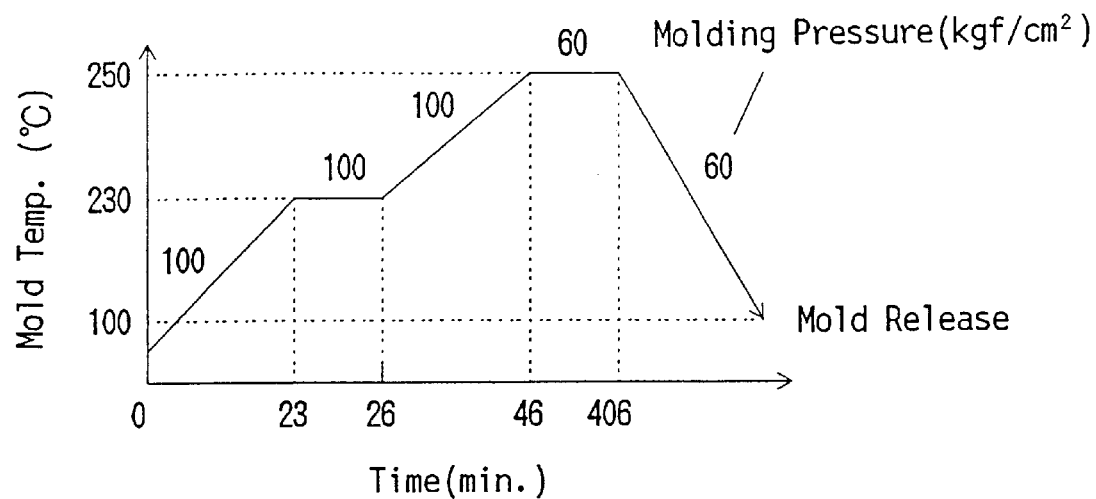
FIG. 33 is a graph showing a heating program in Examples 26 to 28.

The mold shown in FIG. 1 was filled with the powder dried under vacuum, and the mold hot pressing process was performed at 230° C. Then, the temperature of the mold was elevated as such, and the random copolymer precursor was cyclized at 250° C. by internal mold heat treatment. Thus, a test piece (T/P) of a tabular formed article of 15 mm×50 mm×2t mm was obtained. A heating program of the mold used in case is shown in FIG. 33. The pressure was 60 to 100 kgf/cm$^2$.

The amount of PBZ-T produced by heat treatment and the bending properties of these formed articles are shown in Table 13.

TABLE 13

| Example | Amount of Copolymer Precursor (g) | Amount of Matrix (g) | Amount of PBZ-T (wt %) | Bending Elasticity (kgf/mm$^2$) | Bending Strength (kgf/mm$^2$) |
| --- | --- | --- | --- | --- | --- |
| 26 | 12.79 | 27.21 | 9.3 | 702 | 3.0 |
| 27 | 18.35 | 21.64 | 13.2 | 1013 | 2.8 |
| 28 | 23.55 | 16.48 | 19.0 | 1120 | 4.7 |

COMPARATIVE EXAMPLE 7

Figure 34:
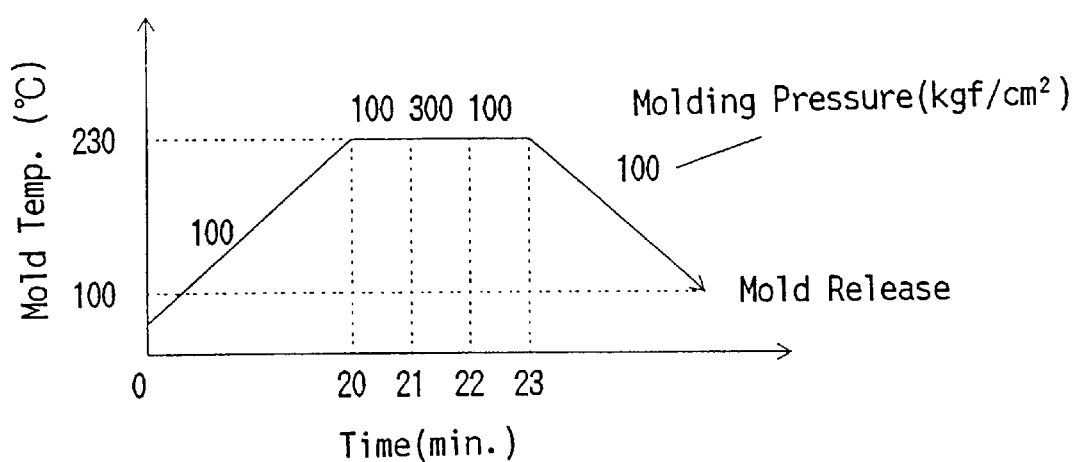
FIG. 34 is a graph showing a heating program in Comparative Example 7.

Only the matrix polymer used in Example 26 was molded at a pressure of 100 kgf/cm$^2$ to 300 kgf/cm$^2$ by the mold hot pressing process to obtain a test piece (T/P) of a tabular formed article of 50 mm×15 mm×2t mm. A heating program is shown in FIG. 34.

For the bending properties of the resulting formed article, the elasticity was 479 kgf/mm$^2$, and the strength was 20.4 kgf/mm$^2$.

EXAMPLE 29

A coagulated composite powder of the matrix polymer and the random copolymer precursor was obtained in the same manner as with Example 26, and dried under vacuum.

Figure 35:
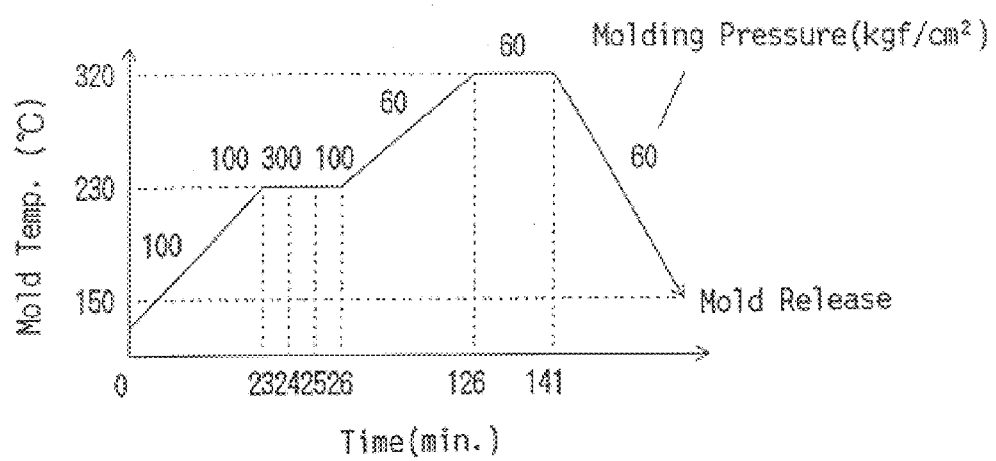
FIG. 35 is a graph showing a heating program in Example 29.

The mold shown in FIG. 2 was filled with the coagulated composite powder, and the mold hot pressing process was performed at 230° C. Then, the temperature of the mold was elevated as such, and the random copolymer precursor was cyclized at 320° C. by internal mold heat treatment. Thus, a test piece (T/P) of a tabular formed article of 15 mm×50 mm×2t mm was obtained. A heating program of the mold used in this case is shown in FIG. 35. The pressure was 60 to 300 kgf/cm$^2$. The molding was performed in a glove box in an argon atmosphere. Further, the heating was conducted in the mold with purging a gas produced by the ring-closing reaction.

For the bending properties of the resulting formed article, the elasticity was 1,215 kgf/mm$^2$, and the strength was 6.0 kgf/mm$^2$. The amount of PBZ-T produced by ring closure was 15.1% by weight.

Figure 36:
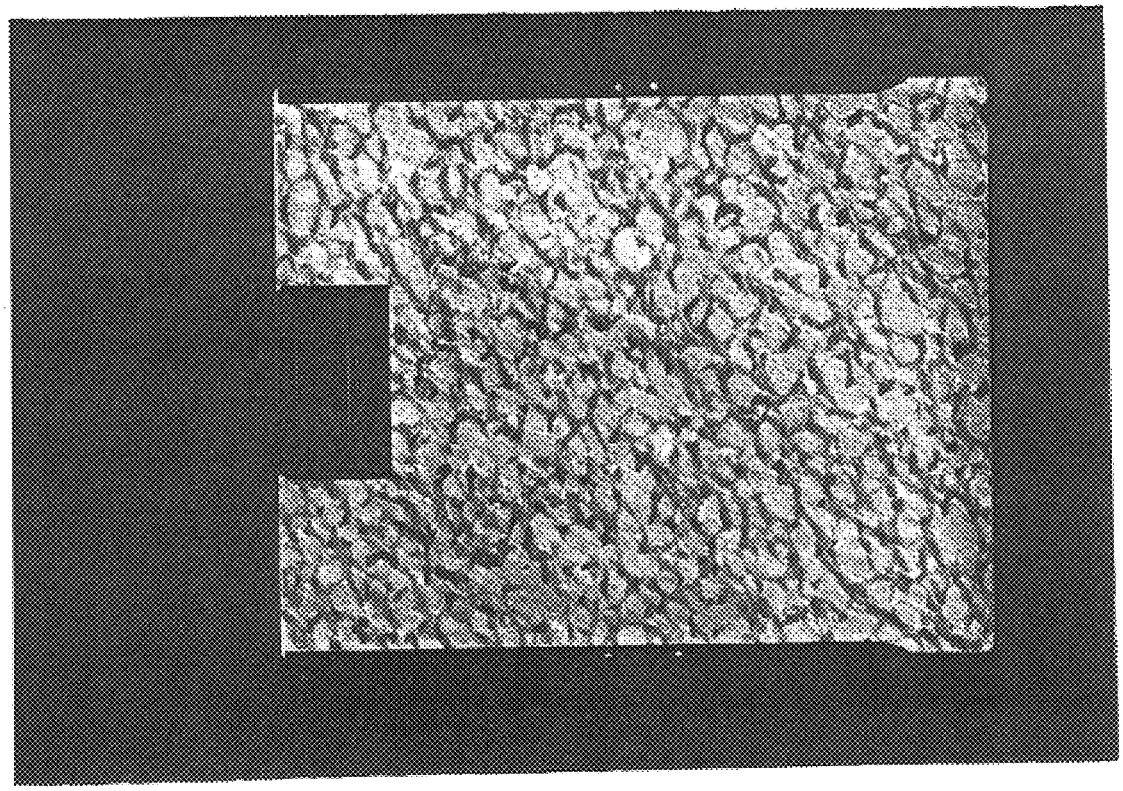
FIG. 36 is an electron micrograph (magnification: 8.500×) in Example 29.

A transmission electron micrograph (ultrathin sectioning method, magnification: 8,500×) of the resulting formed article is shown in FIG. 36.

The micrograph shows that the formed article comprises two phases of a portion having a three-dimensional mesh structure and the other portion.

Figure 37:
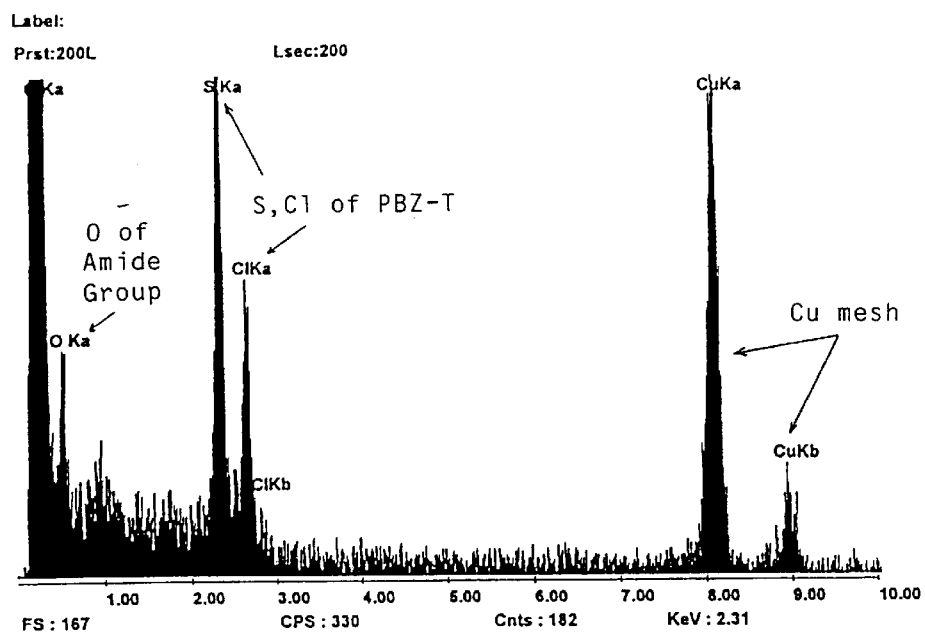
FIG. 37 is an EDX spectrum of a mesh portion of a formed article obtained in Example 29.
Figure 38:
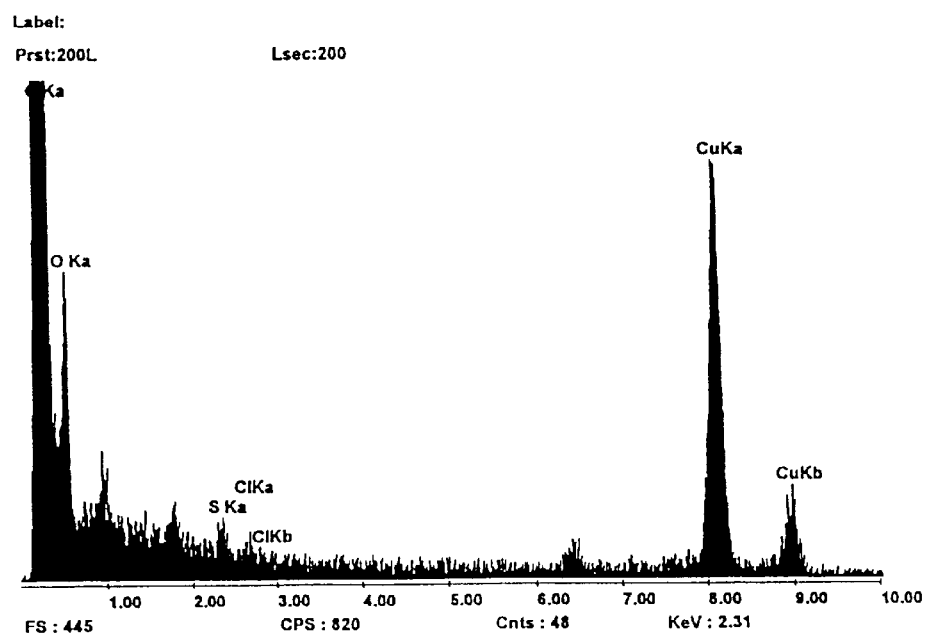
FIG. 38 is an EDX spectrum of a non-mesh portion of the formed article obtained in Example 29.

FIG. 6 is a schematic view of this micrograph. EDX spectra of the three-dimensional mesh portion (the portion high in contrast in the electron micrograph) and the other portion (the portion low in contrast in the electron micrograph) of this drawing was taken, and are shown in FIGS. 37 and 38, respectively.

The three-dimensional mesh portion high in contrast contains S and Cl, but the other portion does not contain them, which reveals that the three-dimensional mesh portion is a PBZ-T copolymer-rich phase and the other portion is a matrix-rich phase. Accordingly, this shows that the formed article has a structure in which the PBZ-T copolymer-rich phase homogeneously exists in the matrix polymer as the continuous three-dimensional mesh phase. The average size of the meshes was 0.5 μm or less, and the average size of the continuous phase of the PBZ-T copolymer particles is about 60 nm.

Results of Example 29 are shown in Table 14, in comparison with those of Comparative Example 7.

TABLE 14

|  | Example 29 | Comparative Example 7 |
| --- | --- | --- |
| Bending Elasticity (JIS K7203) (kgf/mm$^2$) | 1215 | 479 |
| Specific Gravity (JIS K7112) (g/cm$^3$) | 1.36 | 1.29 |
| Izod Impact Value (JIS K7113) (KJ/m$^2$) | 5.1 | 2.4 |
| Rockwell Hardness (JIS K7202) (HRL) | 12.7 | 120 |
| Thermal Decomposition Temperature (JIS K7120) in N$_2$ (° C.) | >400 | >400 |
| Coefficient of Linear Expansion (JIS K7197); 130° C. | 2.15 × 10$^{-5}$ | 6.16 × 10$^{-5}$ |
| 170° C. | 1.98 × 10$^{-5}$ | — |
| 200° C. | 1.83 × 10$^{-5}$ | — |
| 250° C. | 1.94 × 10$^{-5}$ | — |
| 300° C. | 2.17 × 10$^{-5}$ | — |
| Vicat Softening Point (JIS K7206) | Not observed (No sinking was observed) | 226° C. |

In Table 14, the Izod impact value was measured without a notch at room temperature.

The above results show that the fine three-dimensional mesh structure significantly improves the rigidity, the impact resistance, the hardness and the properties at high temperatures, and reduces the thermal expansion to a level of metals, even when the reinforcing components are added in small amounts.

EXAMPLE 30

A coagulated composite powder dried under vacuum of the matrix polymer and the random copolymer precursor was obtained in the same manner as with Example 29. The mold shown in FIG. 2 was filled with the powder, and the mold hot pressing process was performed at 230° C. Then, the temperature of the mold was elevated as such, and the random copolymer precursor was cyclized at 275° C. by internal mold heat treatment. Thus, a test piece (T/P) of a tabular formed article of 15 mm×50 mm×2t mm was obtained.

Figure 39:
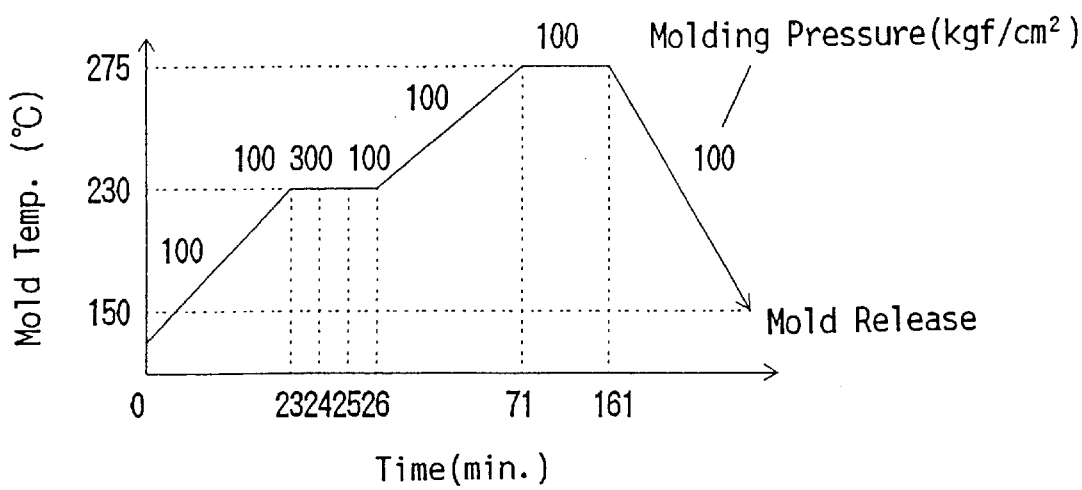
FIG. 39 is a graph showing a heating program in Example 30.

A heating program of the mold used in this case is shown in FIG. 39. The pressure was 60 to 300 kgf/cm$^2$. The molding was performed in a glove box in an argon atmosphere. Further, the heating was conducted in the mold with purging a gas produced by the ring-closing reaction.

For the bending properties of the resulting formed article, the elasticity was 1,055 kgf/mm$^2$, and the strength was 4.6 kgf/mm$^2$. The amount of PBZ-T produced by ring closure was 20.8% by weight.

EXAMPLE 31

A coagulated composite powder dried under vacuum was obtained in the same manner as with Example 26 with the exception that 24.36 g of the matrix polymer and 15.65 g of the random copolymer precursor were used. The mold shown in FIG. 2 was filled with the powder, and the mold hot pressing process was performed at 230° C. Then, the temperature of the mold was elevated as such, and the random copolymer precursor was cyclized at 300° C. by internal mold heat treatment. Thus, a test piece (T/P) of a tabular formed article of 15 mm×50 mm×2t mm was obtained.

Figure 40:
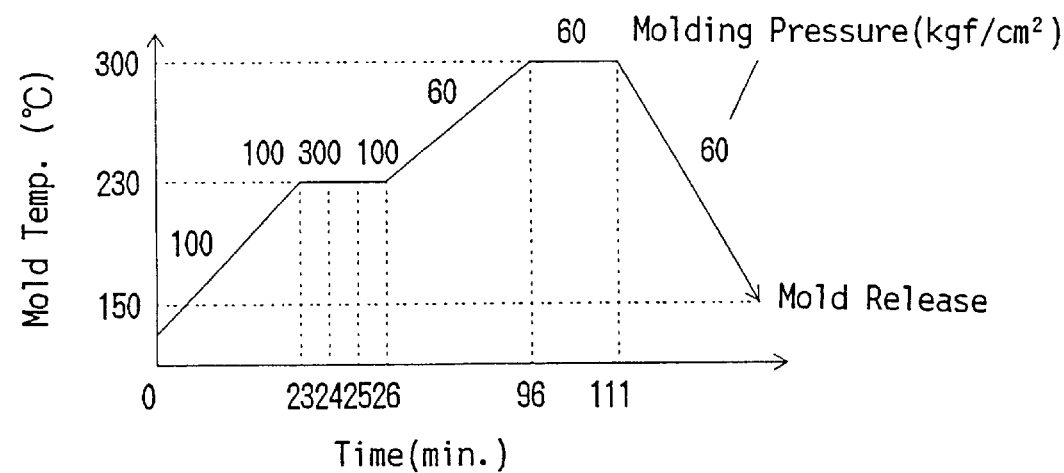
FIG. 40 is a graph showing a heating program in Examples 31, 32 and 34.

A heating program of the mold used in this case is shown in FIG. 40. The pressure was 60 to 300 kgf/cm$^2$. The molding was performed in a glove box in an argon atmosphere. Further, the heating was conducted in the mold with purging a gas produced by the ring-closing reaction.

For the bending properties of the resulting formed article, the elasticity was 952 kgf/mm$^2$, and the strength was 4.6 kgf/mm$^2$. The amount of PBZ-T produced by ring closure was 12.8% by weight.

EXAMPLE 32

A coagulated composite powder dried under vacuum of the matrix polymer and the random copolymer precursor was obtained in the same manner as with Example 26. The mold shown in FIG. 2 was filled with the powder, and the mold hot pressing process was performed at 230° C. Then, the temperature of the mold was elevated as such, and the random copolymer precursor was cyclized at 300° C. by internal mold heat treatment. Thus, a test piece (T/P) of a tabular formed article of 15 mm×50 mm×2t mm was obtained.

In this case, the mold was heated according to the heating program shown in FIG. 40. The pressure was 60 to 300 kgf/cm$^2$. The molding was performed in a glove box in an argon atmosphere. Further, the heating was conducted in the mold with purging a gas produced by the ring-closing reaction.

For the bending properties of the resulting formed article, the elasticity was 761 kgf/mm$^2$, and the strength was 4.2 kgf/mm$^2$. The amount of PBZ-T produced by ring closure was 11.2% by weight.

EXAMPLE 33

A random copolymer precursor was obtained in the same manner as with Example 26 with the exception that m is changed to 6 and n is changed to 4.

The intrinsic viscosity η$_{inh}$ of this polymer was 1.2. The intrinsic viscosity was measured at a polymer concentration in NMP of 0.5 g/dl at 30° C. by the Ubbelohde method.

Then, 8.0 g of the random copolymer precursor thus obtained and 5.34 g of the matrix polymer used in Example 26 were dissolved in 266 ml of NMP to obtain a coagulated composite powder dried under vacuum of the matrix polymer and the random copolymer precursor was obtained in the same manner as with Example 26.

The mold shown in FIG. 2 was filled with the powder, and the mold hot pressing process was performed at 230° C.

Then, the temperature of the mold was elevated as such, and the random copolymer precursor was cyclized at 320° C. by internal mold heat treatment. Thus, a test piece (T/P) of a formed article of 15 mm×50 mm×2t mm was obtained.

Figure 41:
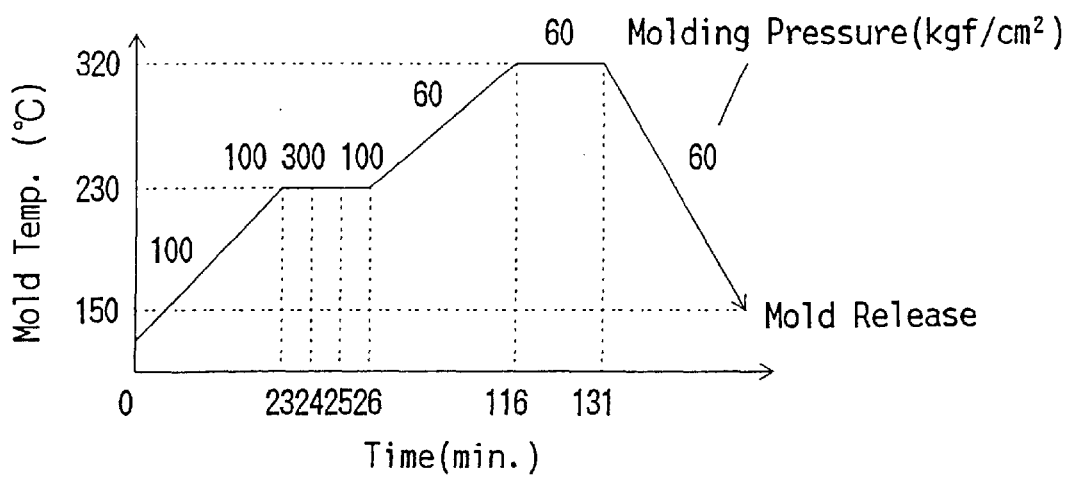
FIG. 41 is a graph showing a heating program in Examples 33 and 35.

A heating program of the mold used in this case is shown in FIG. 41. The pressure was 60 to 300 kgf/cm². The molding was performed in a glove box in an argon atmosphere. Further, the heating was conducted in the mold with purging a gas produced by the ring-closing reaction.

For the bending properties of the resulting formed article, the elasticity was 861 kgf/mm², and the strength was 4.8 kgf/mm². The amount of PBZ-T produced by ring closure was 17.6% by weight.

EXAMPLE 34

In 265 ml of NMP, 6.2 g of the block copolymer precursor obtained in Example 13 and 7.08 g of the matrix polymer used in Example 26 were dissolved t obtain a coagulated composite powder dried under vacuum of the matrix polymer and the block copolymer precursor was obtained in the same manner as with Example 26.

The mold shown in FIG. 2 was filled with the powder, and the mold hot pressing process was performed at 230° C. Then, the temperature of the mold was elevated as such, and the block copolymer precursor was cyclized at 300° C. by internal mold heat treatment. Thus, a test piece (T/P) of a formed article of 15 mm×50 mm×2t mm was obtained.

In this case, the mold was heated according to the heating program shown in FIG. 40. The pressure was 60 to 300 kgf/cm². The molding was performed in a glove box in an argon atmosphere. Further, the heating was conducted in the mold with purging a gas produced by the ring-closing reaction.

For the bending properties of the resulting formed article, the elasticity was 982 kgf/mm², and the strength was 5.1 kgf/mm². The amount of PBZ-T produced by ring closure was 15.7% by weight.

EXAMPLE 35

A test piece (T/P) of a formed article of 15 mm×50 mm×2t mm was obtained in the same manner as with Example 34 with the exception that the mold was heated according to the heating program shown in FIG. 41 and heat treatment was conducted at 320° C. The pressure was 60 to 300 kgf/cm².

For the bending properties of the resulting formed article, the elasticity was 1124 kgf/mm², and the strength was 6.7 kgf/mm². The amount of PBZ-T produced by ring closure was 14.3% by weight.

EXAMPLE 36

A solution of 18.35 g of the random copolymer precursor and 21.64 g of the matrix polymer in NMP was prepared in the same manner as with Example 27, and the resulting solution was poured in a large amount of ethanol to obtain a fibrous composite coagulum of the random copolymer precursor and the matrix polymer. Then, the fibrous coagulum was dried under vacuum at 80° C. The resulting fibrous material was drawn at a draw ratio of 1.5 at 250° C., and pulverized to 2 to 10 mm.

The mold shown in FIG. 2 was filled with the resulting powdery material, and the mold hot pressing process was performed at 230° C. Then, the temperature of the mold was elevated as such, and the random copolymer precursor was cyclized at 300° C. by internal mold heat treatment. Thus, a test piece (T/P) of a formed article of 15 mm×50 mm×2t mm was obtained.

Figure 42:
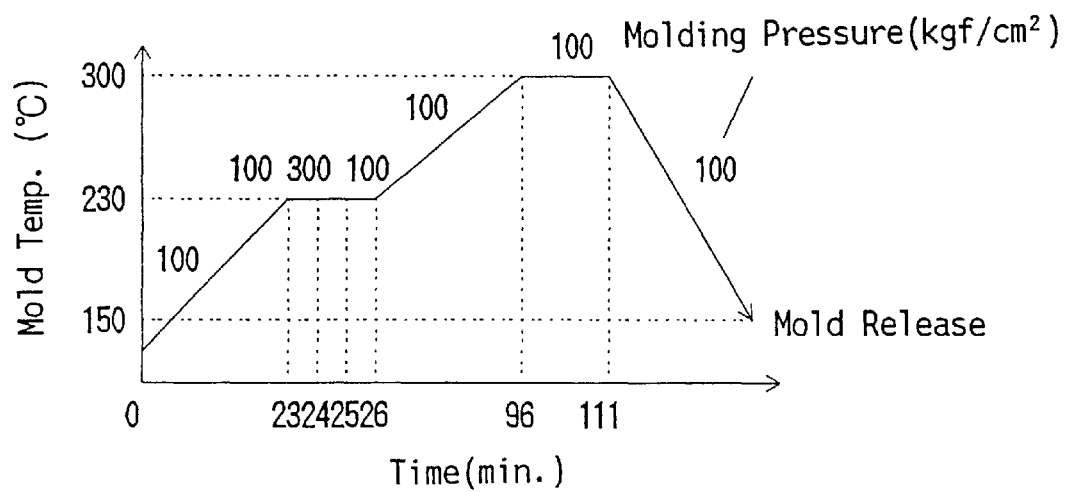
FIG. 42 is a graph showing a heating program in Example 36.

A heating program of the mold used in this case is shown in FIG. 42. The pressure was 100 to 300 kgf/cm². The molding was performed in a glove box in an argon atmosphere. Further, the heating was conducted in the mold with purging a gas produced by the ring-closing reaction.

For the bending properties of the resulting formed article, the elasticity was 1263 kgf/mm², and the strength was 4.7 kgf/mm². The amount of PBZ-T produced by ring closure was 14.5% by weight.

EXAMPLE 37

(1) Synthesis of Monomers

Fifty grams (0.357 mole) of 4,6-diaminoresorcin dihydrochloride represented by formula (11) described above was mixed with 123 ml (0.58 mole) of 1,1,1,3,3,3-hexamethyldisilazane in an argon atmosphere. The mixture was refluxed at 130° C. for 6 hours to conduct the reaction. Then, the reaction product was distilled under reduced pressure to obtain a distillate at an oil bath temperature of 200° C. to 210° C. at 10 Torr. Thus, monomer A represented by formula (12) described above was obtained. The yield was 60%. In formula (12), Me represents a methyl group.

Ten grams (0.05 mole) of compound (b) represented by formula (16) described above was mixed with 50 ml (0.24 mole) of 1,1,1,3,3,3-hexamethyldisilazane in an argon atmosphere. The mixture was refluxed at 130° C. for 6 hours to conduct the reaction. Then, the reaction product was distilled under reduced pressure to obtain a distillate at an oil bath temperature of 200° C. at 10 Torr. Thus, monomer B represented by formula (17) described above was obtained. The yield was 70%. In formula (17), Me represents a methyl group.

(2) Synthesis of PBZ-O Random Copolymer Precursor

Sixteen millimoles of monomer A and 4 mmoles of monomer B obtained as described above were dissolved in 20 ml of NMP in an argon atmosphere. Then, 20 mmoles of 2-chloroterephthaloyl dichloride was added thereto with stirring under ice cooling, followed by stirring at a temperature of 0° C. to room temperature for 6 hours. The solvent was removed under reduced pressure at 80° C. to obtain a random copolymer precursor represented by the following formula (26). The intrinsic viscosity $\eta_{inh}$ of this polymer was 1.0. The intrinsic viscosity was measured at a polymer concentration in NMP of 0.5 g/dl at 30° C. by the Ubbelohde method. In this polymer, m:n is 8:2.

(3) Production of Molecular Composite Material

Then, 5.56 g of the FBZ-0 random copolymer precursor thus obtained and 6.14 g of the same matrix polymer as used in Example 26 were dissolved in 46.8 ml of dimethyl sulfoxide (DMSO), followed by stirring at room temperature for 1 week. Thereafter, this solution was blown into a large amount of ethanol with a spray to obtain a rapidly coagulated powder. The coagulated powder was refluxed in a methanol/water (1:1) mixed solution for 2 hours to conduct desilylation. The resulting product was dried under vacuum at 100° C. The structural formula of the resulting polymer after desilylation is represented by formula (27) described above.

The mold shown in FIG. 2 was filled with the powder dried under vacuum, and the mold hot pressing process was performed. Then, the temperature of the mold was elevated as such, and the PBZ-O random copolymer precursor was cyclized by internal mold heat treatment. Thus, a test piece (T/P) of a tabular formed article of 15 mm×50 mm×2t mm was obtained.

Figure 43:
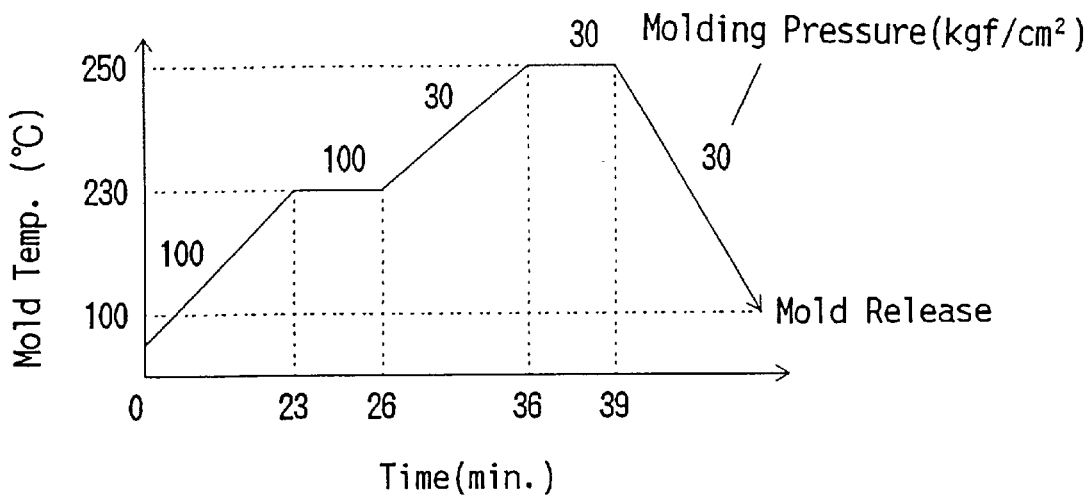
FIG. 43 is a graph showing a heating program in Example 37.

A heating program of the mold used in this case is shown in FIG. 43. The pressure was 30 to 100 kgf/cm². The molding was performed in a glove box in an argon atmosphere. Further, the heating was conducted in the mold with purging a gas produced by the ring-closing reaction.

For the bending properties of the resulting formed article, the elasticity was 686 kgf/mm², and the strength was 3.9 kgf/mm². The amount of PBZ-O produced by ring closure was 2.8% by weight.

EXAMPLE 38

Figure 44:
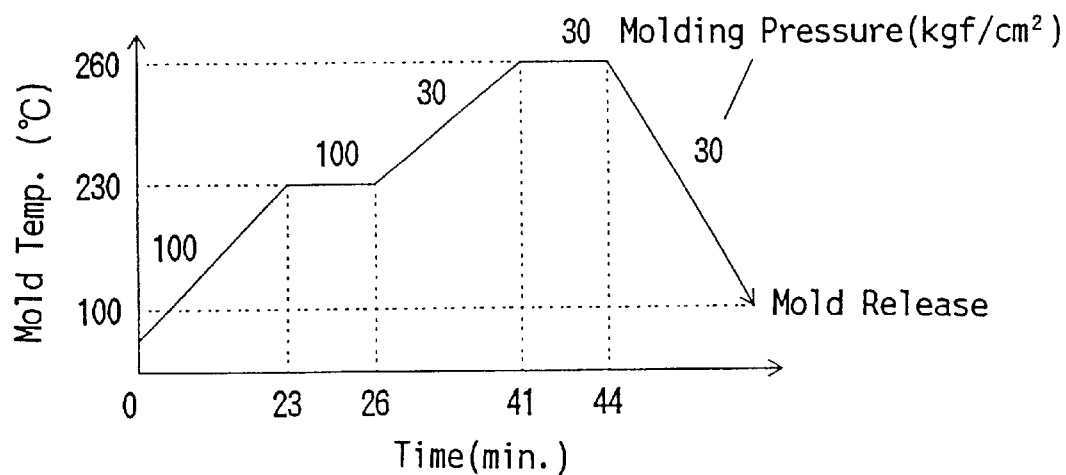
FIG. 44 is a graph showing a heating program in Example 38.

A test piece (T/P) of a formed article of 15 mm×50 mm×2t mm was obtained in the same manner as with Example 37 with the exception that the mold was heated according to a heating program shown in FIG. 44. The pressure was 30 to 100 kgf/cm².

For the bending properties of the resulting formed article, the elasticity was 703 kgf/mm², and the strength was 3.2 kgf/mm². The amount of PBZ-O produced by ring closure was 2.9 by weight.

EXAMPLES 39 TO 41

The solution of the aromatic heterocyclic copolymer and the matrix polymer obtained in Example 5 was sprayed in a large amount of ethanol to obtain a coagulated composite powder of the random copolymer precursor and the matrix polymer. This was filtered, and the resulting coagulated composite powder was dried under vacuum at 100° C.

The mold shown in FIG. 7 was filled with the powder dried under vacuum, and ultrasonic vibrations were applied thereto for a specified period of time shown in Table 15 under the following conditions to conduct molding and ring closure of the random copolymer precursor. In the mold shown in FIG. 7, the horn was made of aluminum, and the female mold was made of a resin.

Apparatus: 2100B Type Plastic Welder (manufactured by Seidensha Co.)
Output: 2,100 W
Horn Amplitude: 60 μm Horn Frequency: 15.15 kHz The state of formed articles and the degree of ring closure of PBZ-T are shown in Table 16.

TABLE 15

|  | Example 39 | Example 40 | Example 41 |
| --- | --- | --- | --- |
| Pressure (kgf/cm²) | 120 | 120 | 120 |
| Application Time (sec) | 1.0 | 1.5 | 2.0 |
| Hold Time (sec) | 30 | 30 | 30 |

TABLE 16

|  | Example 39 | Example 40 | Example 41 |
| --- | --- | --- | --- |
| Color of Formed Article | Green | Green | Dark brown |
| Ring Closure Degree of PBZ-T | 1.7 | 5.3 | 53.0 |

In all examples, good formed articles having no voids were obtained. The measurement of the Vicat softening point for the formed article obtained in Example 41 did not show sinking of a weight at all.

Figure 45:
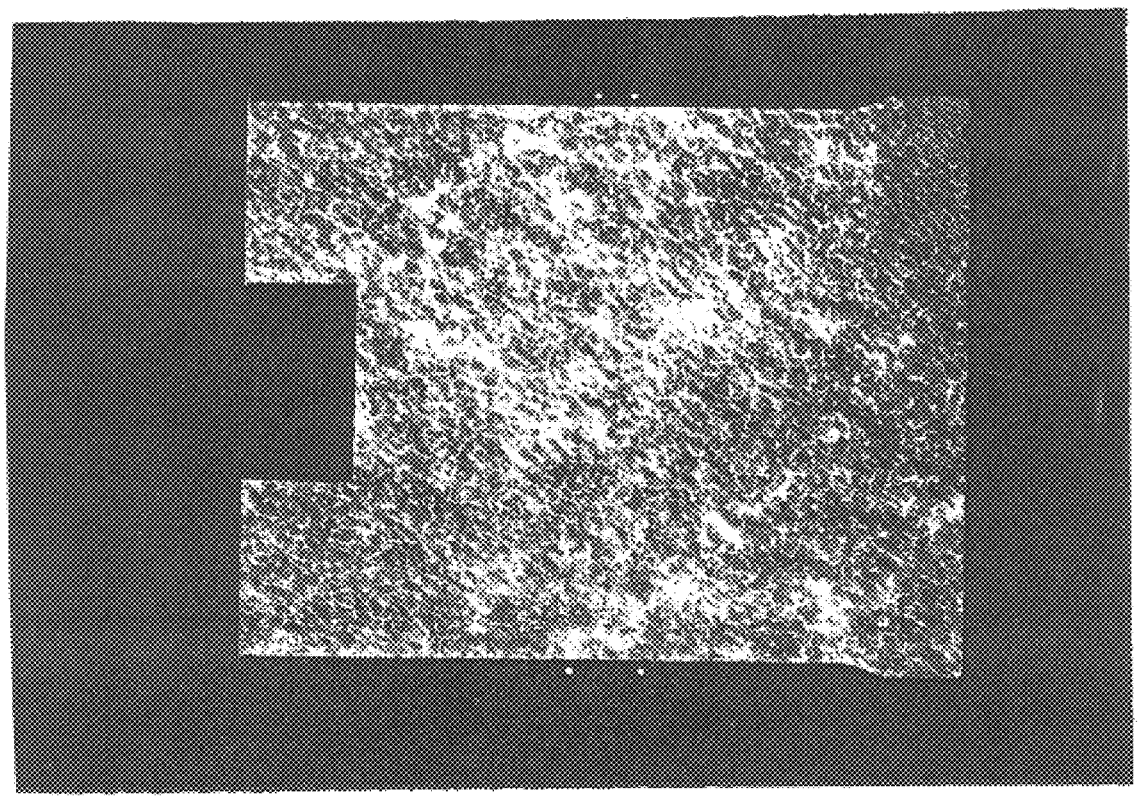
FIG. 45 is an electron micrograph (magnification: 11,000×) of a formed article obtained in Example 39.
Figure 46:
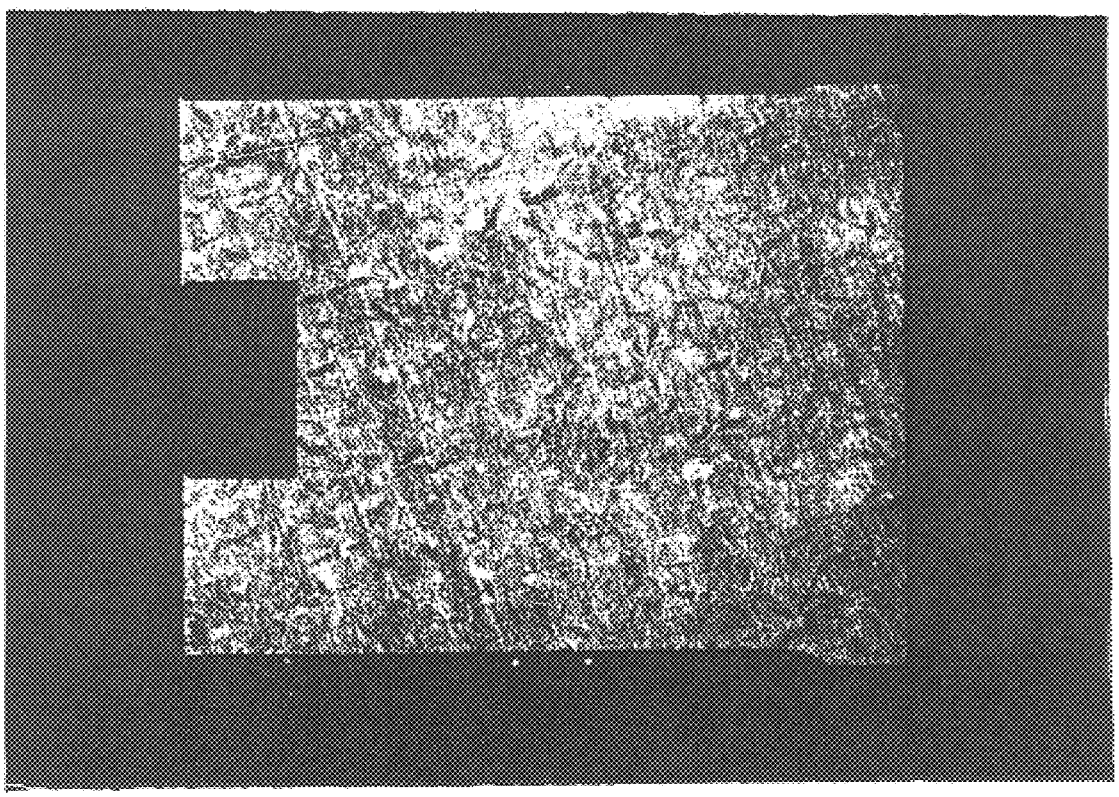
FIG. 46 is an electron micrograph (magnification: 14,000×) of a formed article obtained in Example 40.
Figure 47:
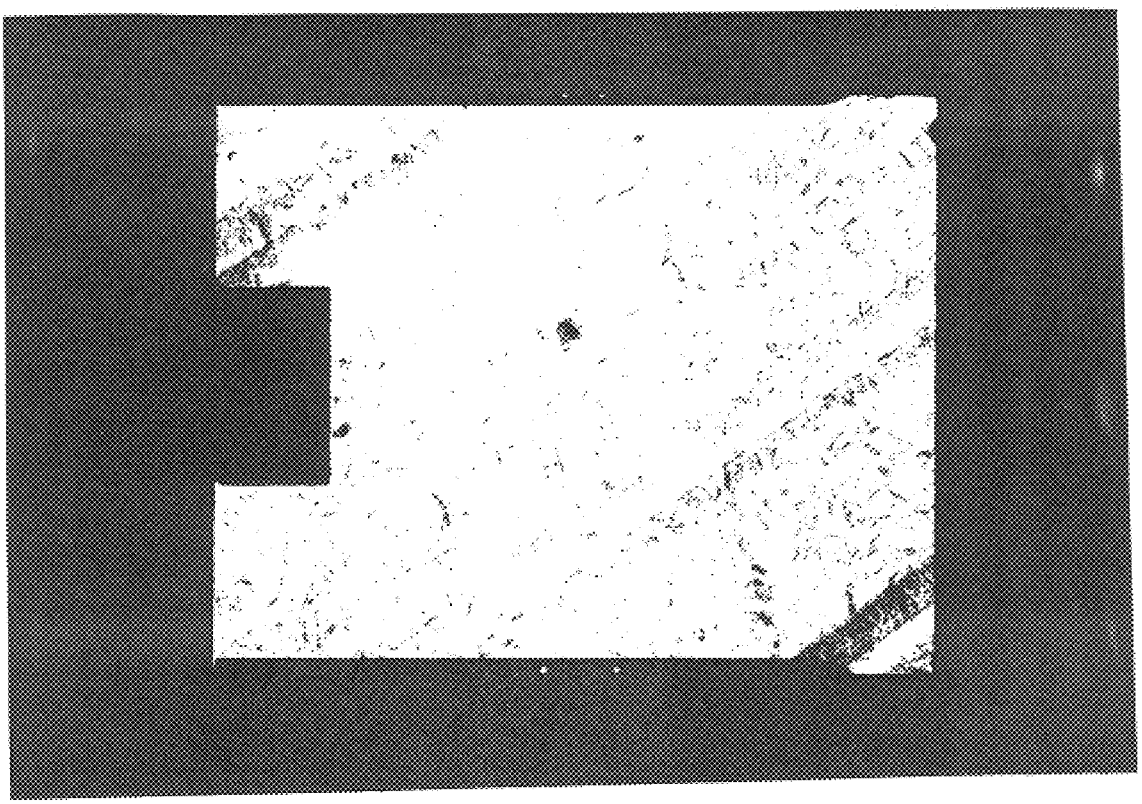
FIG. 47 is an electron micrograph (magnification: 11,000×) of a formed article obtained in Example 41.

Transmission electron micrographs (ultrathin sectioning method, magnification: 34,000X) of the formed articles obtained in Examples 39 to 41 are shown in FIGS. 45 to 47, respectively. The formed article obtained in Example 39 was nearly a single body of the matrix polymer, and a material having a shape was not observed. In the formed article of Example 40 in which the ring closure began to proceed, elongated materials began to be observed. In the formed article of Example 41 in which the ring closure more proceeded, needle-like materials having a diameter of about 30 nm were dispersed in the mesh form.

COMPARATIVE EXAMPLE 8

Only the matrix polymer used in Example 39 was molded in the same manner as with Example 39 using the apparatus used in Example 39. Ultrasonic vibrations were applied under the same conditions as with Example 39 with the exception that the application time is changed to 0.6 seconds. Thus, a good formed article having no void was obtained.

The Vicat softening point of the formed article was measured. As a result, the formed article softened at 240° C.

REFERENCE EXAMPLE 1

Five milliliters of NMP was placed in a well-dried 50-ml flask in a stream of dried argon, and 1 mmoles (1.3920 g) of compound (a$_t$) represented by formula (19) described above was dissolved therein to prepare a homogeneous NMP solution.

To this solution cooled with ice together with the flask, 5 mmoles (1.1873 g) of 2-chloroterephthaloyl dichloride was further added as compound (c), followed by stirring for 5 minutes to synthesize an aromatic heterocyclic polymer precursor. The intrinsic viscosity $\eta_{inh}$ of this polymer was 1.5. The intrinsic viscosity was measured at a polymer concentration in NMP of 0.5 g/dl at 30° C. by the Ubbelohde method. The structure of the resulting polymer is deduced to be as the following formula (28):

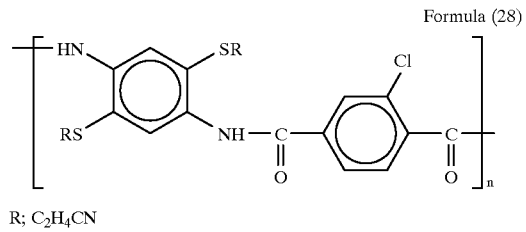

Formula (28)

R; C₂H₄CN

The resulting precursor polymer was dissolved in NMP to obtain a solution of the polymer having a concentration of 15% by weight. This solution was sprayed in ethanol to obtain a coagulated powder. This was filtered, and the resulting coagulated composite powder was dried under vacuum at 100° C.

The mold shown in FIG. 7 was filled with the resulting coagulated powder, and ultrasonic vibrations were applied thereto under the following conditions:

Apparatus: 2100B Type Plastic Welder (manufactured by Seidensha Co.)
Output: 2,100 W
Horn Amplitude: 60 μm
Horn Frequency: 15.15 kHz
Horn Pressure: 120 kgf/cm²
Application Time: 5.0 seconds A fibrous material spurted out of a clearance between the horn and the female mold by ultrasonic molding was collected. An SEM photograph of the fibrous material is shown in FIG. 48.

REFERENCE EXAMPLE 2

The same PBZ-T random copolymer precursor as used in Example 39 was dissolved in NMP to obtain a solution of the polymer having a concentration of 20% by weight. This solution was sprayed in ethanol to cause coagulation. This was filtered, and the resulting coagulated composite powder was dried under vacuum at 100° C.

For the resulting coagulated powder, a fibrous material spurted out of a clearance between the horn and the female mold by ultrasonic molding was collected in the same manner as with Reference Example 1. An SEM photograph thereof is shown in FIG. 49.

REFERENCE EXAMPLE 3

A block copolymer precursor represented by the same structural formula as that of the copolymer precursor in Example 5 was produced in the following manner.

(1) Synthesis of Oligomer (I) and Oligomer (II)

Five milliliters of NMP was placed in a well-dried 50-ml flask in a stream of dried argon, and 8 mmoles (2.227 g) of compound ($a_t$) represented by formula (19) described above was dissolved therein to prepare a homogeneous NMF solution.

To this solution cooled with ice together with the flask, 8.2 mmoles (1.947 g) of 2-chloroterephthaloyl dichloride was further added as compound (c), followed by stirring for 5 minutes to synthesize oligomer (I).

Concurrently with the above-mentioned synthesis of oligomer (I), 10 ml of NMP was placed in a well-dried 50-ml flask in a stream of dried argon, and 2 mmoles (0.4004 g) of compound (b) represented by formula (16) described above was dissolved therein to prepare a homogeneous NMP solution.

To this solution cooled with ice together with the flask, 1.8 mmoles (0.427 g) of 2-chloroterephthaloyl dichloride was further added as compound (c), followed by stirring for 5 minutes to synthesize oligomer (II).

(2) Synthesis of PBZ-T Block Copolymer Precursor

The solution of oligomer (I) in NMP obtained by the above-mentioned procedure was added to the solution of oligomer (II) in NMP. Thereafter, the flask used for the solution of oligomer (I) in NMP was further washed with 2 ml of NMP, and the washings were also added the solution of oligomer (II) in NMP.

The mixed polymer solution was stirred for 1 hour under ice cooling, and the temperature thereof was elevated to room temperature with stirring. Then, stirring was further continued while maintaining the temperature of the solution at room temperature.

The resulting solution was poured in a large amount of methanol. This procedure was conducted with stirring methanol.

Then, this methanol solution was filtered, and the resulting precipitated (polymer) was dried under vacuum at 100° C. for 24 hours. The yield was 99.8%.

The intrinsic viscosity $\eta_{inh}$ of this polymer was 1.7. The intrinsic viscosity was measured at a polymer concentration in NMP of 0.5 g/dl at 30° C. by the Ubbelohde method.

In this polymer, the ratio of the degree of polymerization m of a moiety derived from oligomer (I) and exhibiting the rigidity to the degree of polymerization n of a moiety derived from oligomer (II) and exhibiting the flexibility in the entire molecule (m:n) was 8:2.

The resulting block copolymer precursor was dissolved in NMP to obtain a solution of the polymer having a concentration of 20% by weight. This solution was sprayed in ethanol to obtain a coagulated powder. This was filtered, and the resulting coagulated powder was dried under vacuum at 100° C.

For the resulting coagulated powder, a fibrous material spurted out of a clearance between the horn and the female mold by ultrasonic molding was collected in the same manner as with Reference Example 1. An SEM photograph thereof is shown in FIG. 50.

REFERENCE EXAMPLE 4

In 160 ml of NMP, 18.35 g of the PBZ-T random copolymer and 21.64 g of the matrix polymer used in Reference Example 2 were dissolved to prepare a 25% (by weight) solution, and a coagulated composite powder dried under vacuum of the matrix polymer and the block copolymer precursor was obtained in the same manner as with Example 39.

For the resulting coagulated powder, a fibrous material spurted out of a clearance between the horn and the female mold by ultrasonic molding was collected in the same manner as with Reference Example 1. An SEM photograph thereof is shown in FIG. 51.

The fibrous materials obtained in Reference Examples 1 to 4 had a diameter of 3 μm to 10 μm, and were partially in the spiral form. The spurted materials contained spherical and massive ones.

The degree of ring closure of the fibrous materials obtained in Reference Examples 1 to 4 is shown in Table 17 given below.

TABLE 17

| | Reference Example 1 | Reference Example 2 | Reference Example 3 | Reference Example 4 |
|---|---|---|---|---|
| Degree of Ring Closure (%) | 15.0 | 13.9 | 27.8 | 30.7 |

Figure 52:
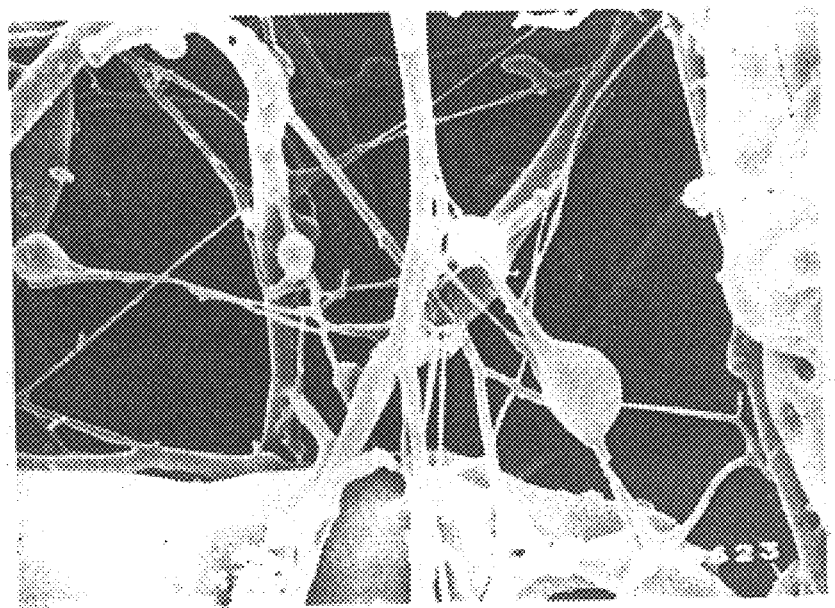
FIG. 52 is an SEM photograph (magnification: 350×) of a heat-treated fibrous material obtained in Reference Example 4.

It is also possible to increase the degree of ring closure of PBZ-T by further heating these fibrous materials. When the fibrous material obtained in Reference Example 4 was heat treated in nitrogen at 500° C., the degree of ring closure was increased to 98.2%. An SEM photograph thereof is shown in FIG. 52.

What is claimed is:

1. A formed article of an aromatic heterocyclic copolymer having a three dimensional mesh structure in which an aromatic heterocyclic compound and an aromatic diamino compound are random copolymerized or block copolymerized, and in which the aromatic heterocyclic copolymer is prepared by a process that comprises subjecting an uncyclized block copolymer precursor or random copolymer precursor to (i) mold hot pressing at a temperature around a melting point of the soft chain fragment in the copolymer precursor, followed by (ii) internal mold heat treatment to induce a ring-closing reaction of said block or random copolymer precursor by elevating said temperature; and wherein the three-dimensional mesh structure contains rigid chain blocks of the aromatic heterocyclic compound homogeneously and finely dispersed in matrix-like portions that are formed by the flexible chain moieties containing the aromatic residue derived from the aromatic diamino compound.

2. The formed article of an aromatic heterocyclic copolymer according to claim 1, in which an aromatic heterocycle contains an aromatic ring and a condensed ring in its main chain.

3. The formed article of an aromatic heterocyclic copolymer according to claim 2, in which said condensed ring is at least one selected from the group consisting of a thiazole ring, an oxazole ring, an imidazole ring and an oxazinone ring.

4. The formed article of an aromatic heterocyclic copolymer according to claim 3, in which said aromatic heterocyclic compound is an aromatic diaminodihydroxy compound in which hydrogen atoms of amino groups and hydroxyl groups are unsubstituted or substituted, and said aromatic diamino compound is an aromatic diamino compound in which hydrogen atoms of amino groups are unsubstituted or substituted.

5. The formed article of an aromatic heterocyclic copolymer according to claim 4, in which hydrogen atoms of said aromatic heterocyclic compound and said aromatic diamino compound are each silylated.

6. A method for producing a formed article of an aromatic heterocyclic copolymer comprising (i) allowing (a) an aromatic heterocyclic compound and (b) an aromatic diamino compound to separately react with (c) a dicarboxylic acid derivative in an organic solvent, thereby synthesizing two kinds of oligomers, and allowing these two kinds of oligomers to react with each other in an organic solvent to synthesize a block copolymer precursor, or allowing (a) an aromatic heterocyclic compound, (b) an aromatic diamino compound and (c) a dicarboxylic acid derivative to react in an organic solvent, thereby synthesizing a random copolymer precursor, and (ii) molding said block or random copolymer precursor by mold hot pressing at a temperature around a melting point of the soft chain fragment in the copolymer precursor, followed by internal mold heat treatment of said block or random copolymer precursor to induce a ring-closing reaction by elevating said temperature.

7. The method according to claim 6, in which said dicarboxylic acid derivative is an aromatic dicarboxylic acid derivative.

8. The method according to claim 7, in which said aromatic dicarboxylic acid derivative is unsubstituted or substituted terephthaloyl dichloride or isophthaloyl dichloride.

9. The method according to claim 6, further comprising the step of molding the uncyclized block or random copolymer precursor obtained according to step (i) in claim 6 by mold hot pressing at a temperature around a melting point of the soft chain fragment in the copolymer precursor, prior to carrying out step (ii) of heating said block or random copolymer precursor to induce a ring-closing reaction.

10. The method according to claim 7, further comprising the step of molding the uncyclized block or random copolymer precursor obtained according to step (i) in claim 6 by mold hot pressing at a temperature around a melting point of the soft chain fragment in the copolymer precursor, prior to carrying out step (ii) of heating said block or random copolymer precursor to induce a ring-closing reaction.

* * * * *